(12) United States Patent
Nishino et al.

(10) Patent No.: US 7,359,891 B2
(45) Date of Patent: Apr. 15, 2008

(54) HOT TOPIC EXTRACTION APPARATUS AND METHOD, STORAGE MEDIUM THEREFOR

(75) Inventors: Fumihito Nishino, Kawasaki (JP); Hiroshi Tsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 316 days.

(21) Appl. No.: 10/102,840

(22) Filed: Mar. 22, 2002

(65) Prior Publication Data

US 2003/0033333 A1 Feb. 13, 2003

(30) Foreign Application Priority Data

May 11, 2001 (JP) ............................ 2001-141746

(51) Int. Cl.
 *G06F 17/30* (2006.01)
(52) U.S. Cl. .............................. 707/3; 707/4; 715/531
(58) Field of Classification Search ................ 707/3, 707/4, 10; 715/531, 514, 501, 901, 907; 709/216, 217, 223
See application file for complete search history.

(56) References Cited

U.S. PATENT DOCUMENTS

| | | | | |
|---|---|---|---|---|
| 5,339,385 A * | 8/1994 | Higgins | ...................... | 704/246 |
| 5,845,278 A * | 12/1998 | Kirsch et al. | .................. | 707/3 |
| 5,873,107 A * | 2/1999 | Borovoy et al. | ......... | 715/501.1 |
| 5,893,114 A * | 4/1999 | Hashimoto et al. | ......... | 707/200 |
| 5,924,105 A * | 7/1999 | Punch et al. | ................ | 715/513 |
| 5,926,811 A * | 7/1999 | Miller et al. | .................... | 707/5 |
| 5,983,216 A * | 11/1999 | Kirsch et al. | ................... | 707/2 |
| 6,018,733 A * | 1/2000 | Kirsch et al. | .................. | 707/3 |
| 6,038,574 A * | 3/2000 | Pitkow et al. | .............. | 715/513 |
| 6,070,157 A * | 5/2000 | Jacobson et al. | ............... | 707/1 |
| 6,115,718 A * | 9/2000 | Huberman et al. | ......... | 707/102 |
| 6,338,058 B1 * | 1/2002 | Jacobson et al. | .............. | 707/3 |
| 6,466,935 B1 * | 10/2002 | Stuart | ......................... | 707/10 |
| 6,633,868 B1 * | 10/2003 | Min et al. | ...................... | 707/3 |
| 6,654,738 B2 * | 11/2003 | Nishioka et al. | ............... | 707/3 |
| 6,678,679 B1 * | 1/2004 | Bradford | ....................... | 707/5 |
| 6,691,108 B2 * | 2/2004 | Li | ................................. | 707/3 |
| 6,718,333 B1 * | 4/2004 | Matsuda | ..................... | 707/102 |

(Continued)

FOREIGN PATENT DOCUMENTS

JP 5-266072 10/1993

(Continued)

OTHER PUBLICATIONS

Tokunaga, "Information Searching and Language Processing", University of Tokyo Press, 1999, pp. 192-199.

(Continued)

*Primary Examiner*—Jean M. Corrielus
(74) *Attorney, Agent, or Firm*—Staas & Halsey LLP

(57) ABSTRACT

A hot topic extraction apparatus for extracting a hot topic from information includes an information collection unit, an information storage unit, and a hot topic extraction unit. The information collection unit collects a document from an information source. The information storage unit stores collected information. The hot topic extraction unit extracts a document from the information storage unit while the information collection unit collects the document, and retrieves a document from the retrieved document, thereby extracting a hot topic from information contained in various information sources, not extracting a hot topic from a given document.

12 Claims, 37 Drawing Sheets

U.S. PATENT DOCUMENTS

| | | | |
|---|---|---|---|
| 6,732,097 B1* | 5/2004 | Wakefield et al. | 707/5 |
| 6,963,830 B1* | 11/2005 | Nakao | 704/1 |
| 2002/0184267 A1* | 12/2002 | Nakao | 707/515 |
| 2004/0083211 A1* | 4/2004 | Bradford | 707/3 |

FOREIGN PATENT DOCUMENTS

| | | |
|---|---|---|
| JP | 9-106331 | 4/1997 |
| JP | 11-7447 | 1/1999 |
| JP | 11-259389 | 9/1999 |
| JP | 2000242656 | 9/2000 |

OTHER PUBLICATIONS

Ochitani et al., "Extraction of High Recognition Degree Information Using an Evaluation Expression" 6th Annual Conference 2000, the Associate for Natural Language Processing, Mar. 7, 2000 (with partial English Translation).

"Development of Document Reading Support System for Finding the Major Topics of a Document Database and Following up a Change thereof", Central Research Institute of Electric Power Industry, Aug. 2000 (with partial English Translation).

Imai et al., "Topic Spotting from Broadcast News Using a Topic Mixture Model", IEICE transactions, D-II vol. J81-DII, No. 9, Sep. 1998, pp. 1955-1964 (with partial English Translation).

Yamada et al., "Topic Extraction Using a News Manuscript and Study on Individualization of News Topic Selection", Natural Language Processing Knowledge Discovery Symposium, Nov. 15, 1999 (with partial English Translation).

Cheong, "Internet Agents: Spiders, Wanderers, Brokers, and Bots", New Riders Publishing, 1996, pp. i-xiv (with partial English Translation).

* cited by examiner

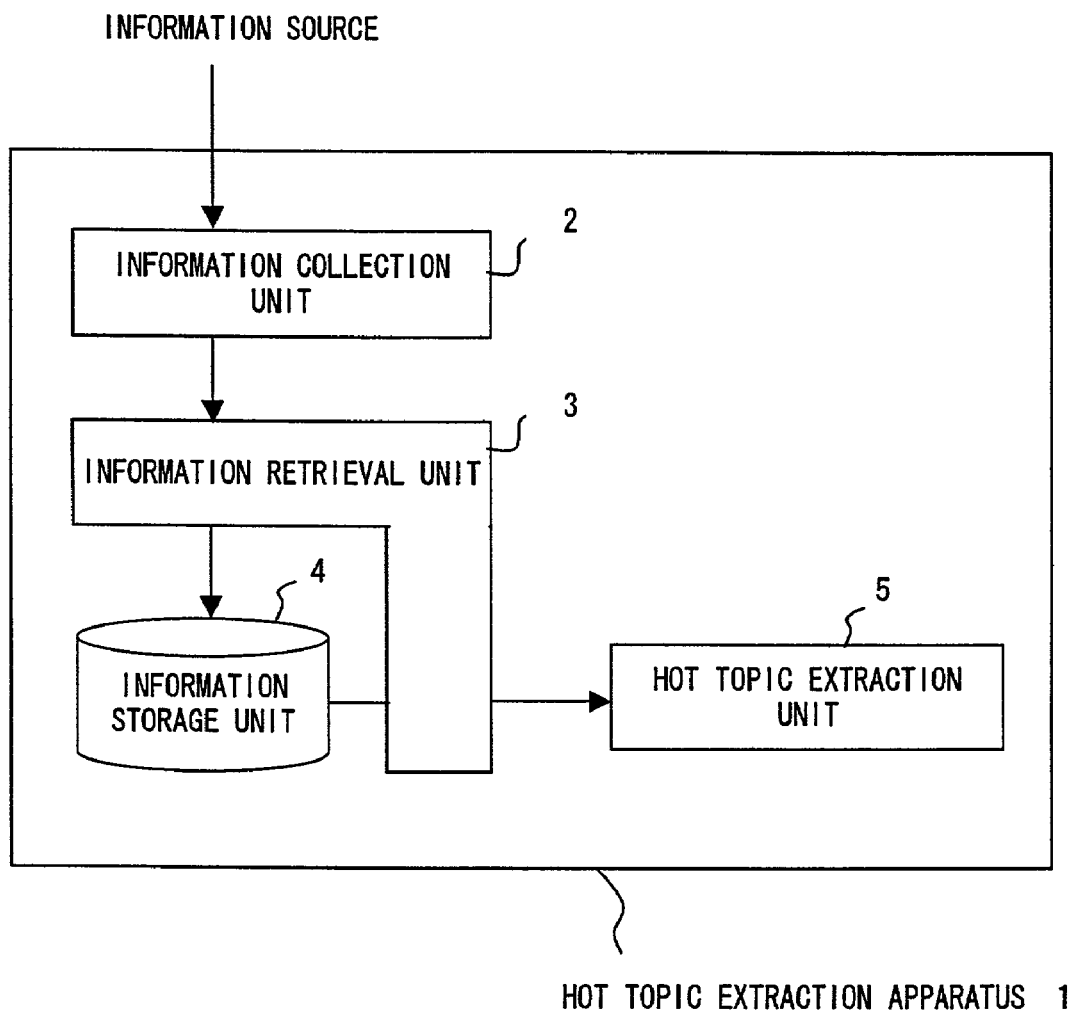
F I G. 1

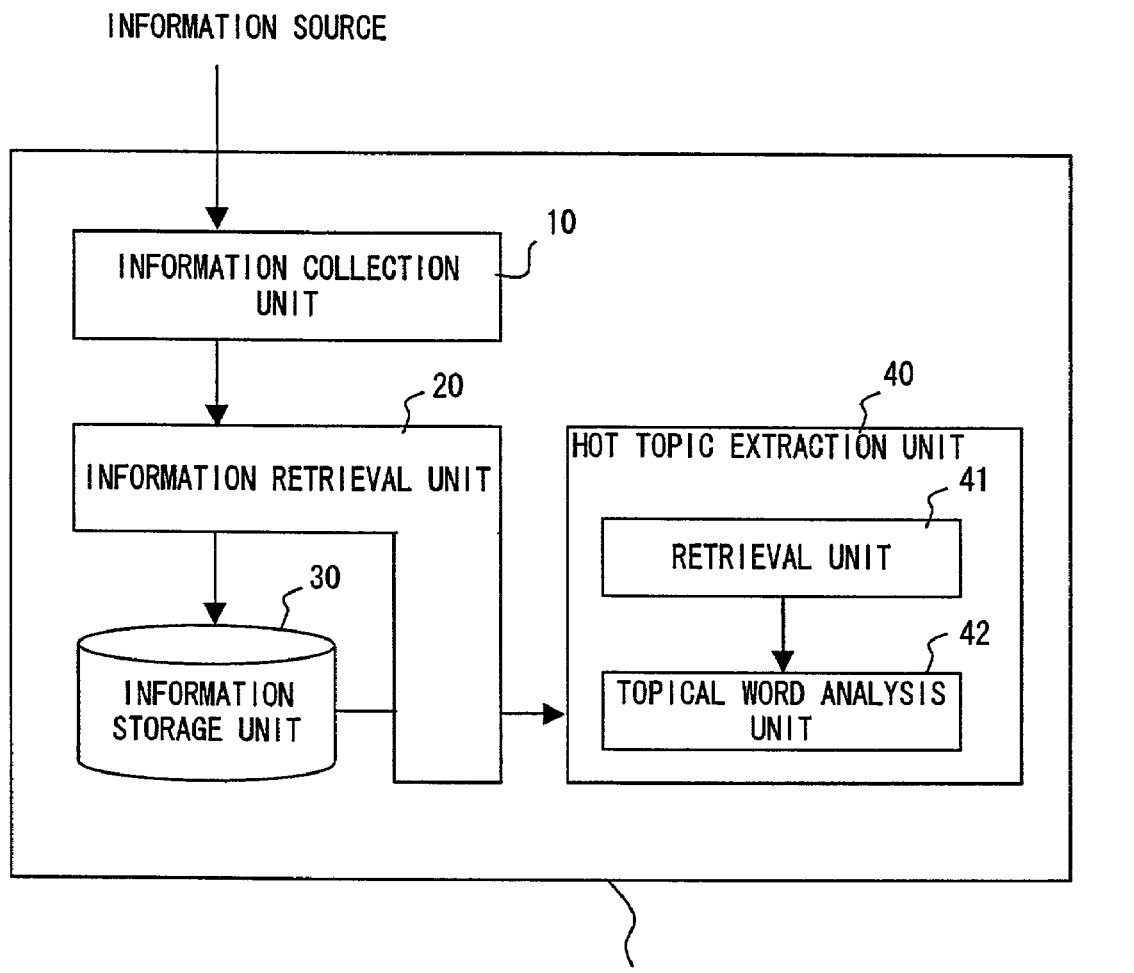
F I G. 2

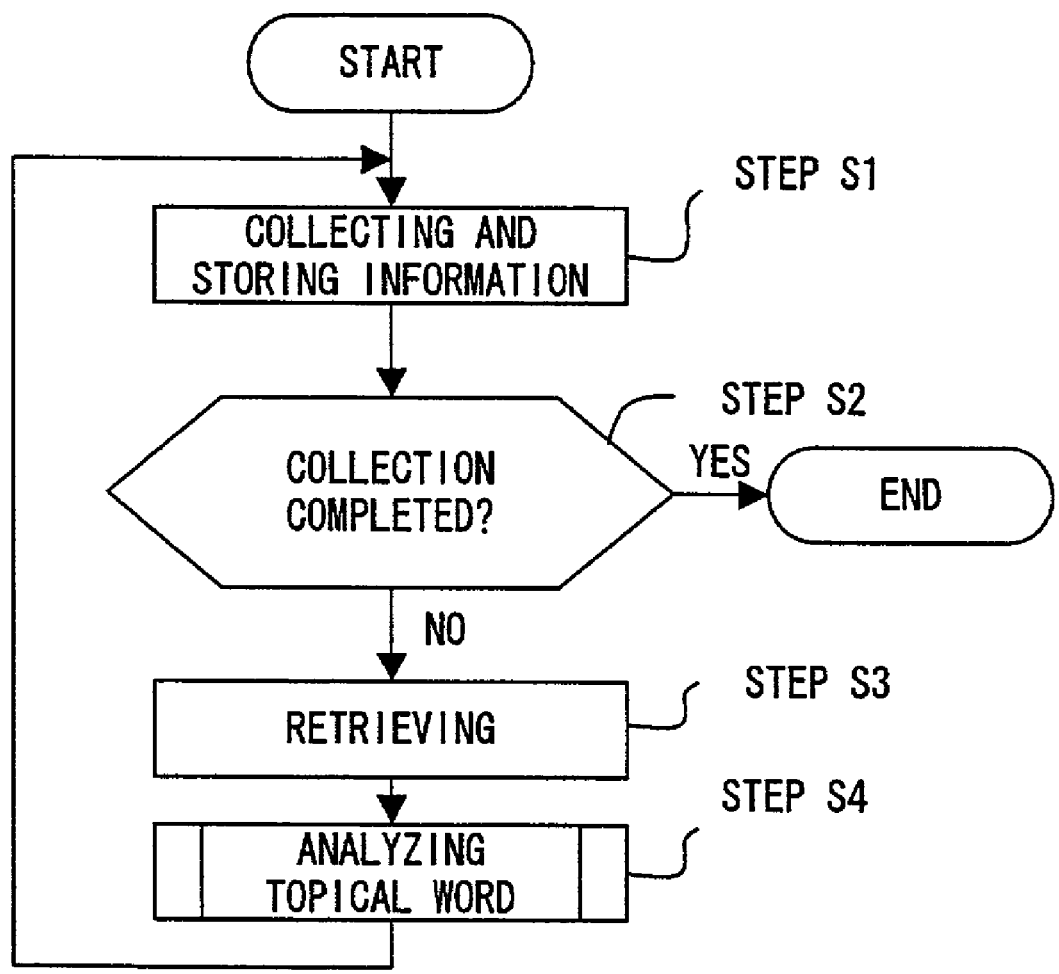
F I G. 3

| LINK SOURCE DOCUMENT ID | LINK DESTINATION DOCUMENT ID |
|---|---|
| doc1 | doc2, doc3, doc4 |
| doc2 | doc3, doc5 |
| ... | ... |

F I G. 7

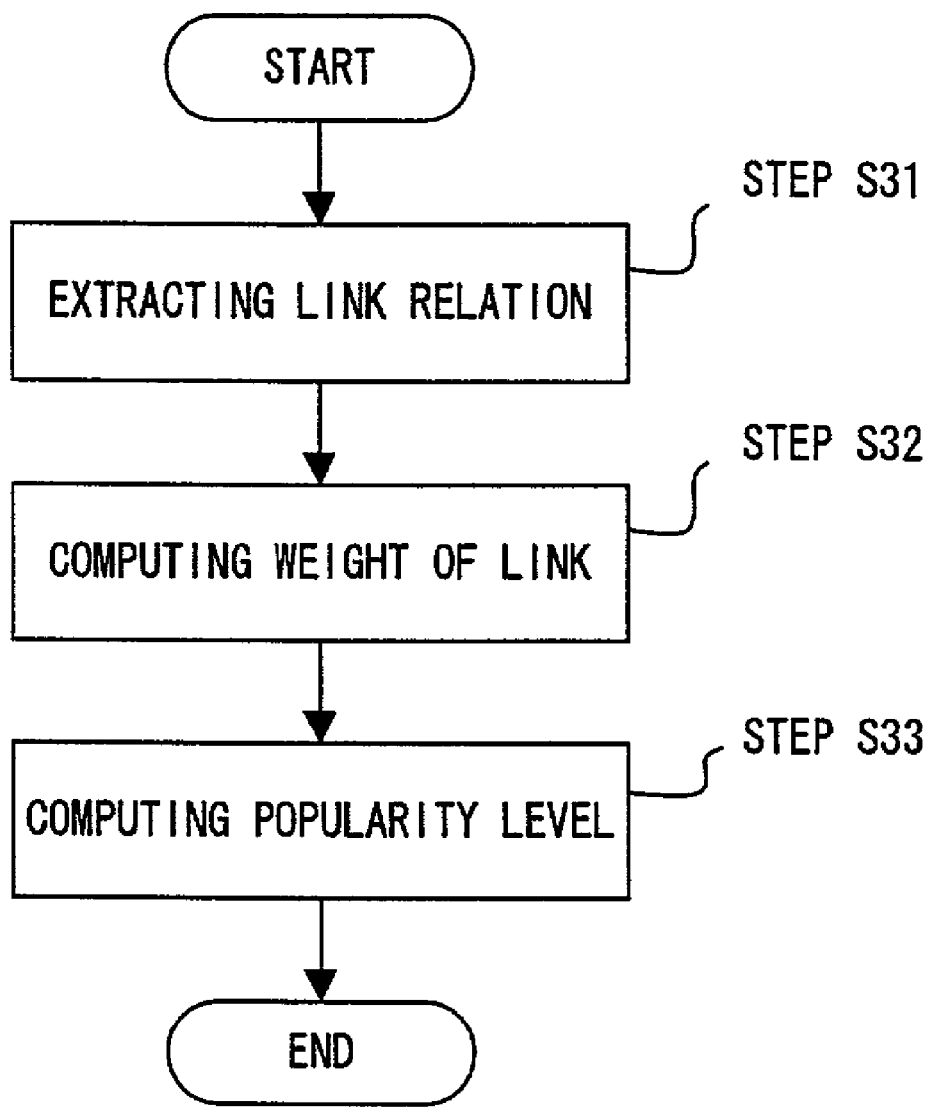
F I G. 8

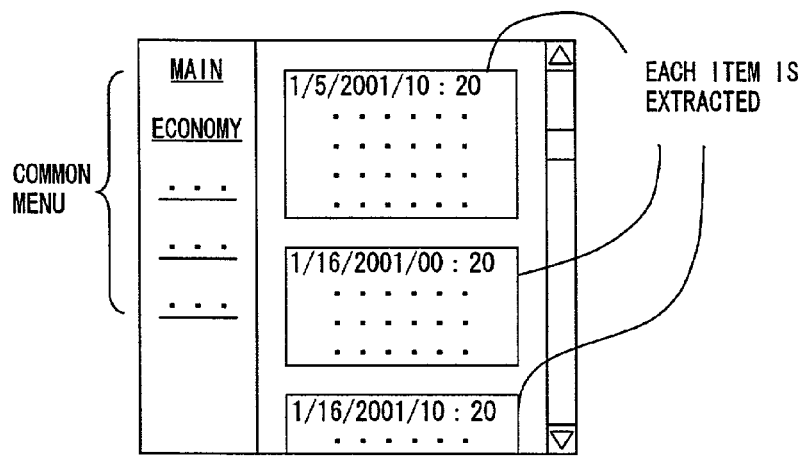
F I G. 9 A
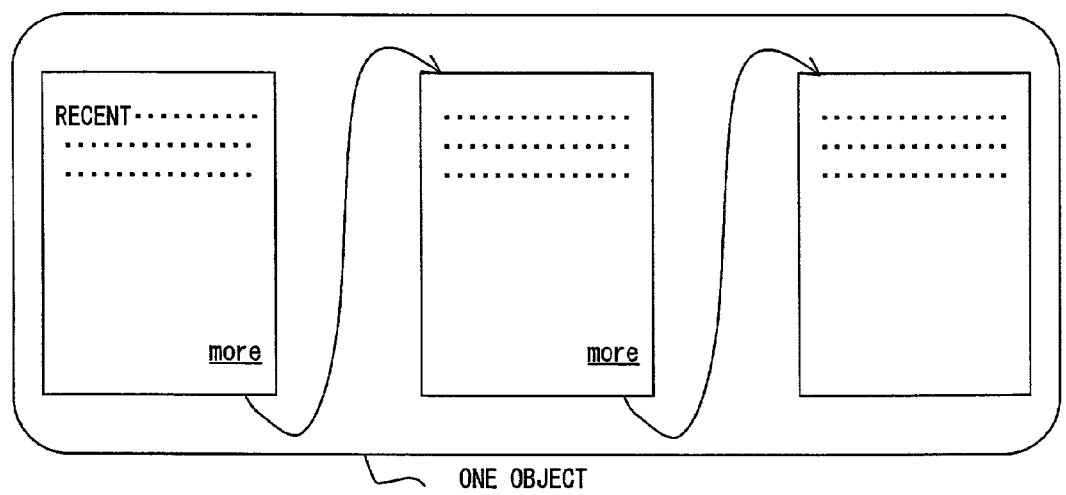
F I G. 9 B

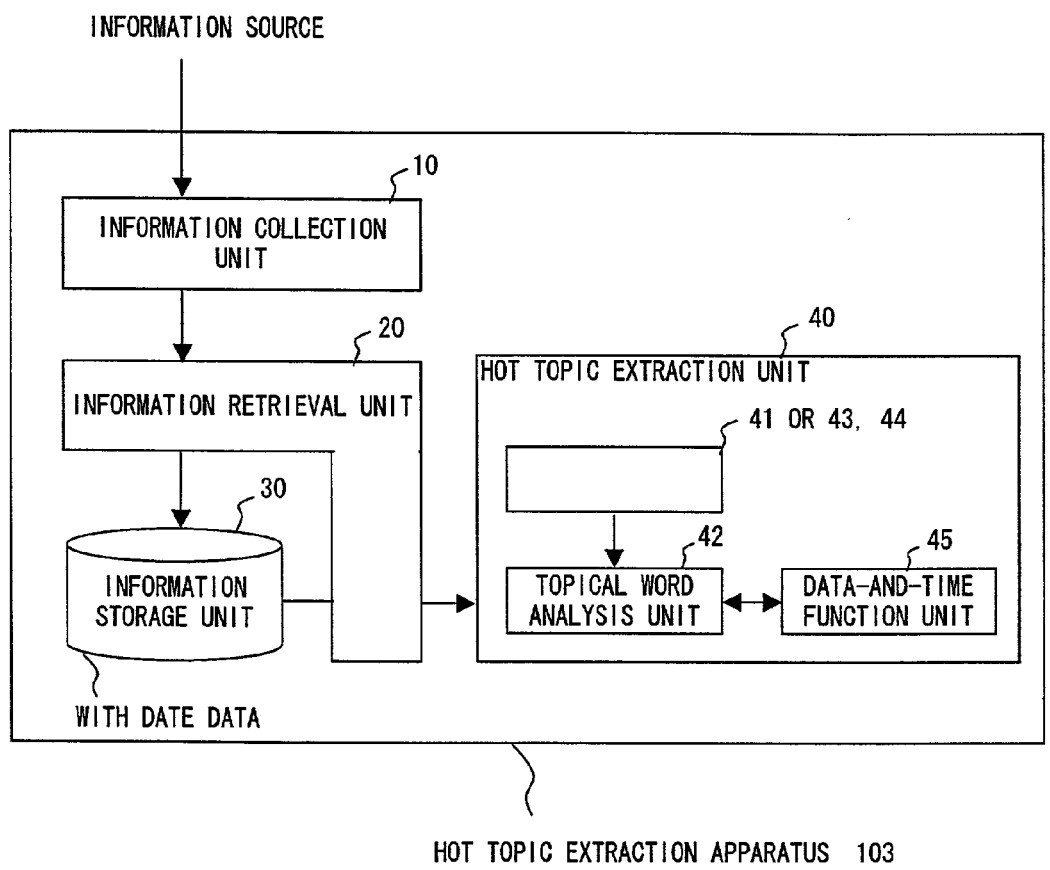
F I G. 1 0

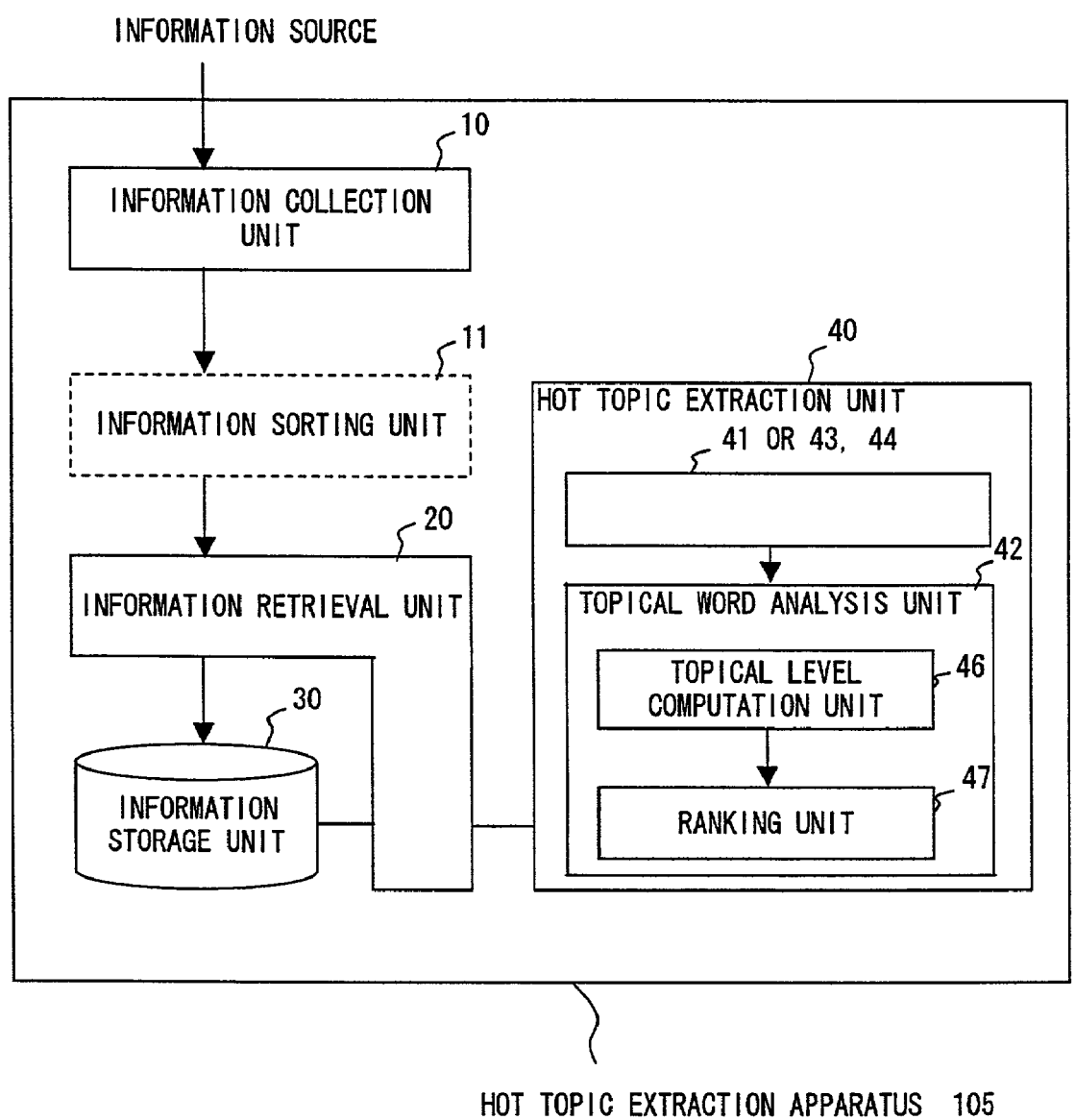
F I G. 1 2

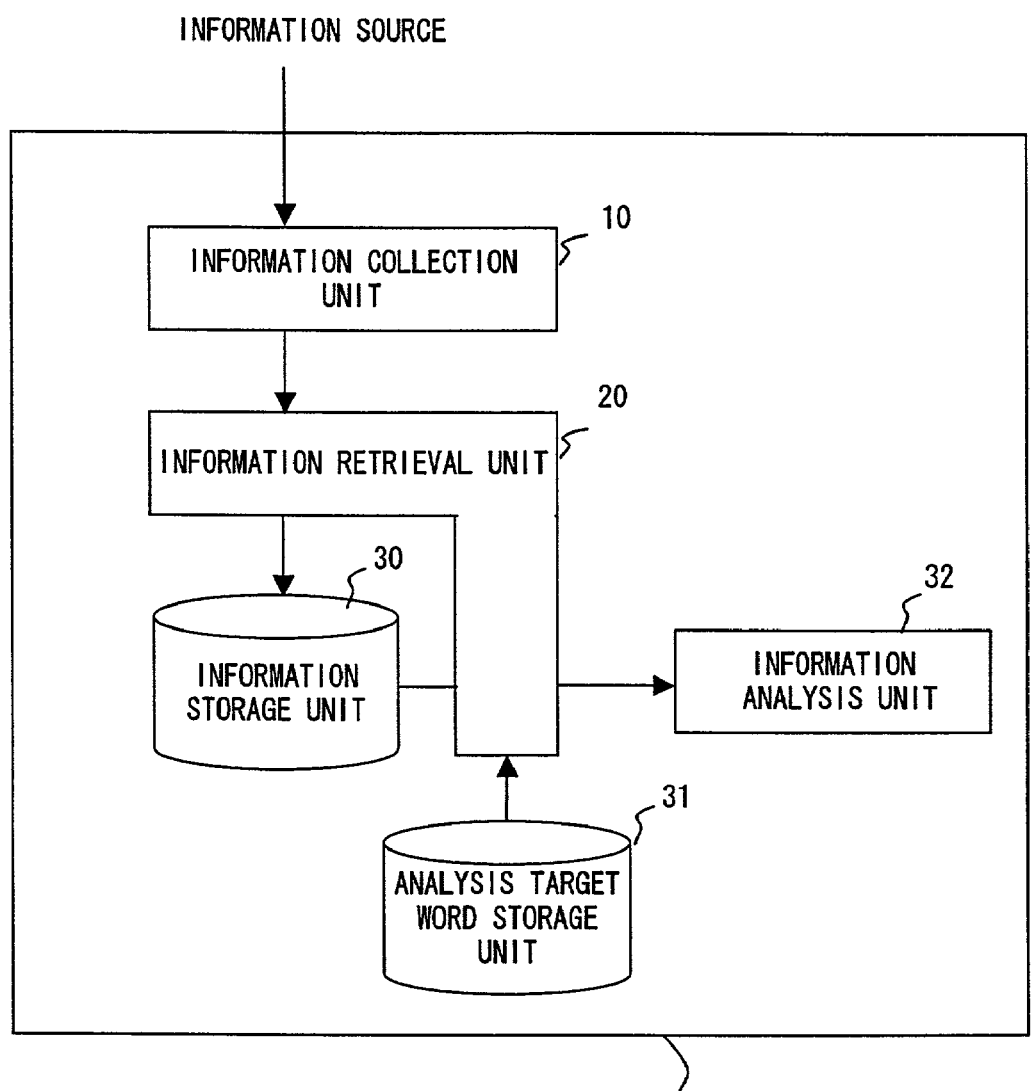
F I G. 1 3

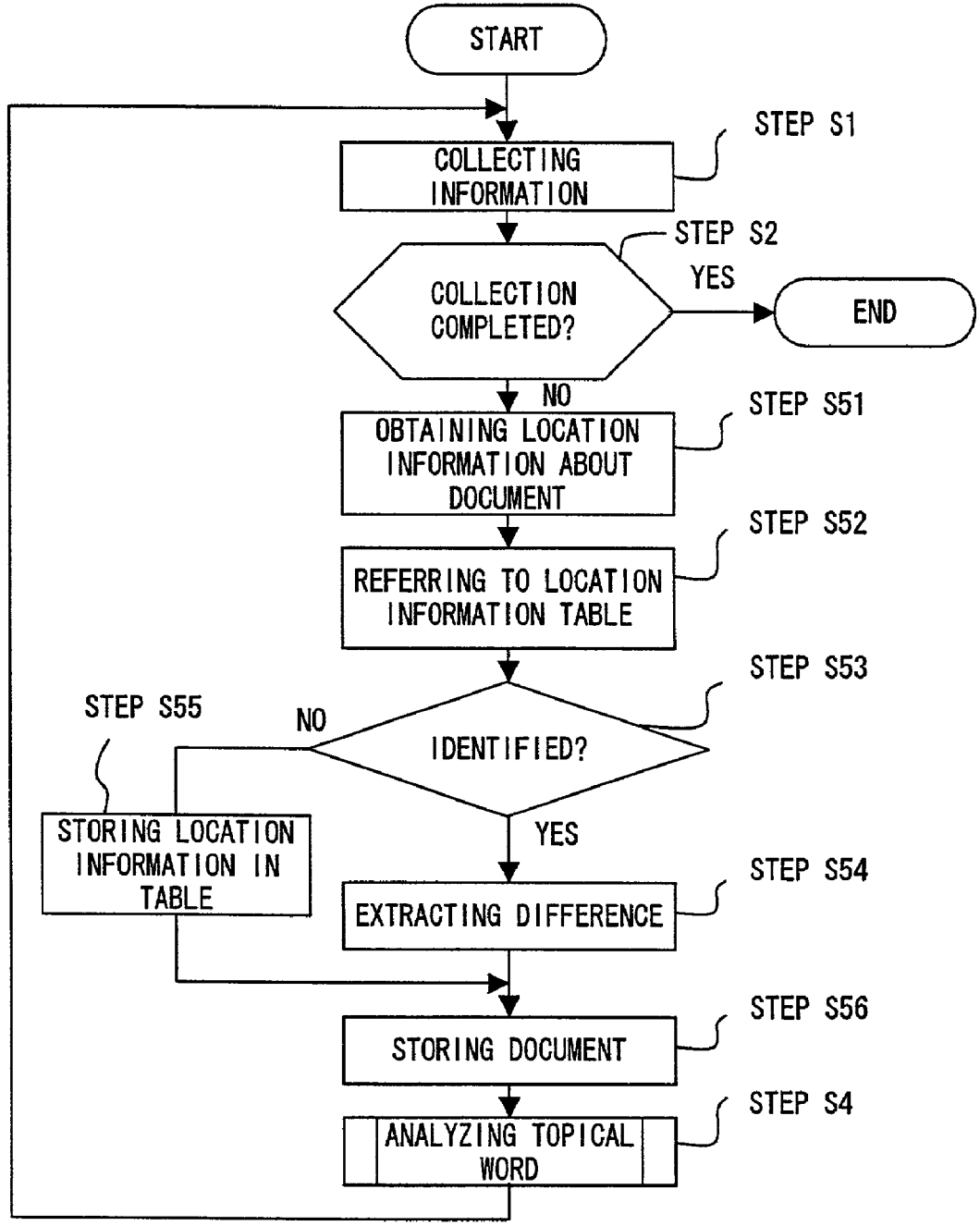
F I G. 1 7

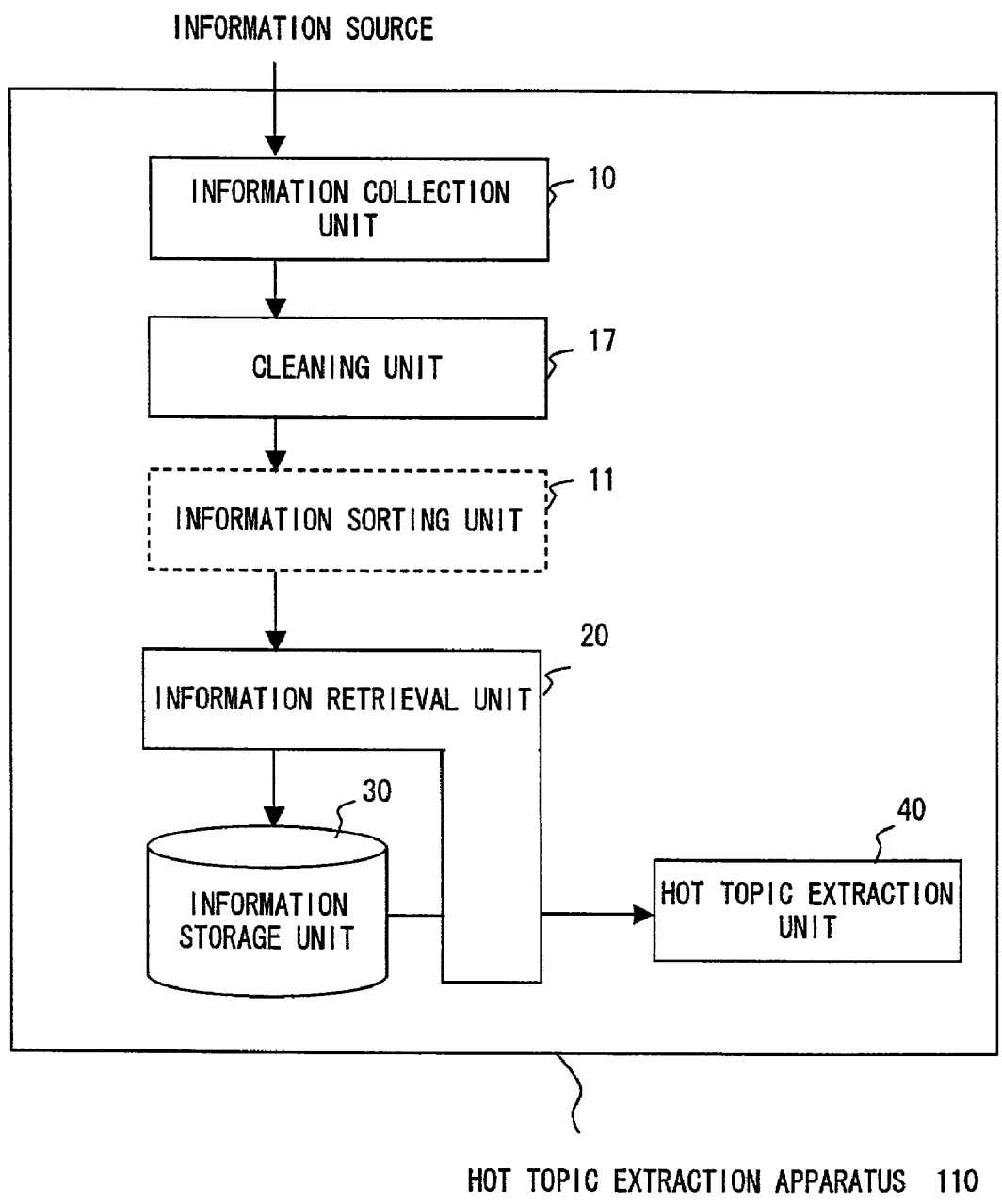
F I G. 1 9

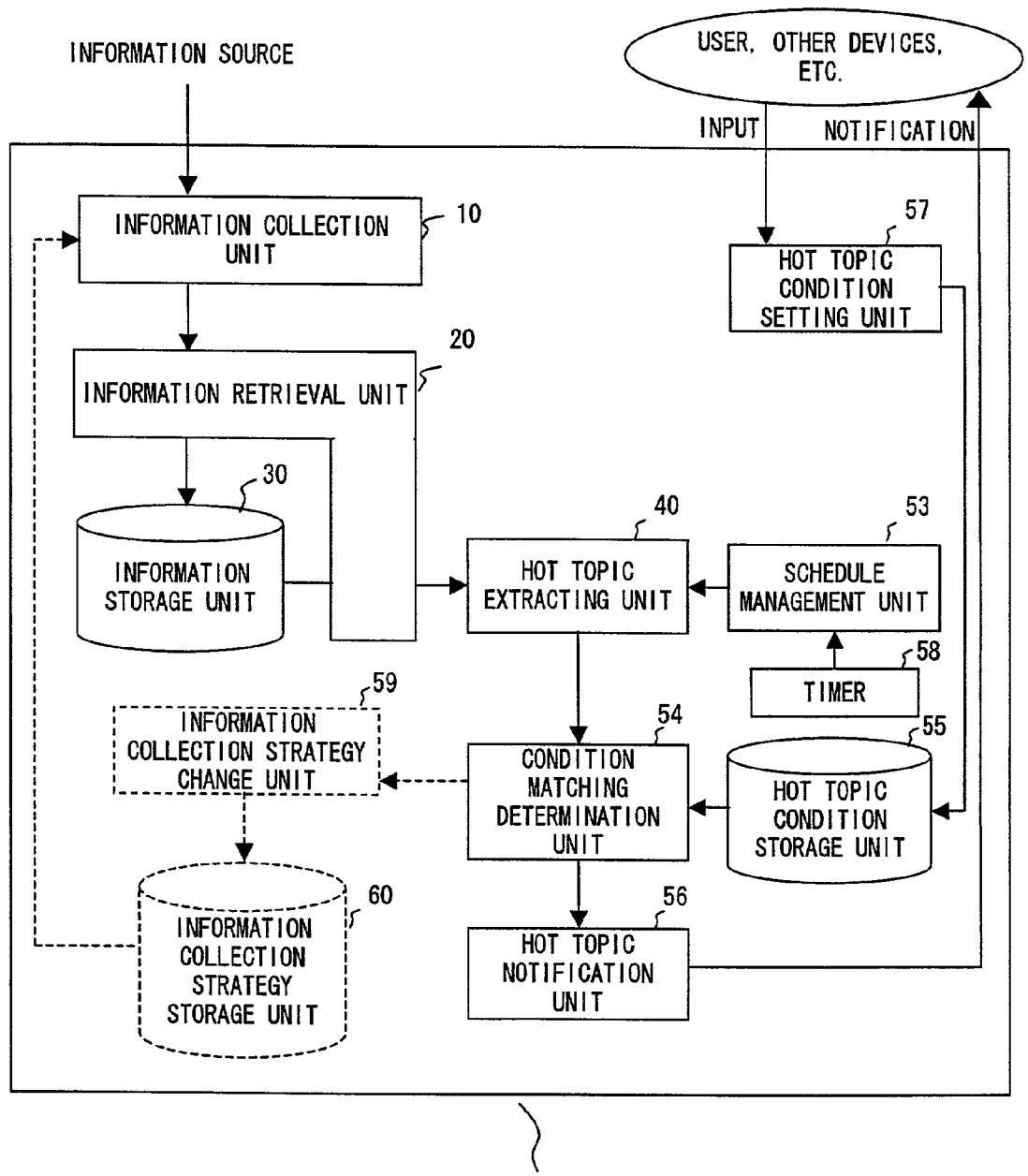
F I G. 2 4

☐ : INDICATING DOCUMENT

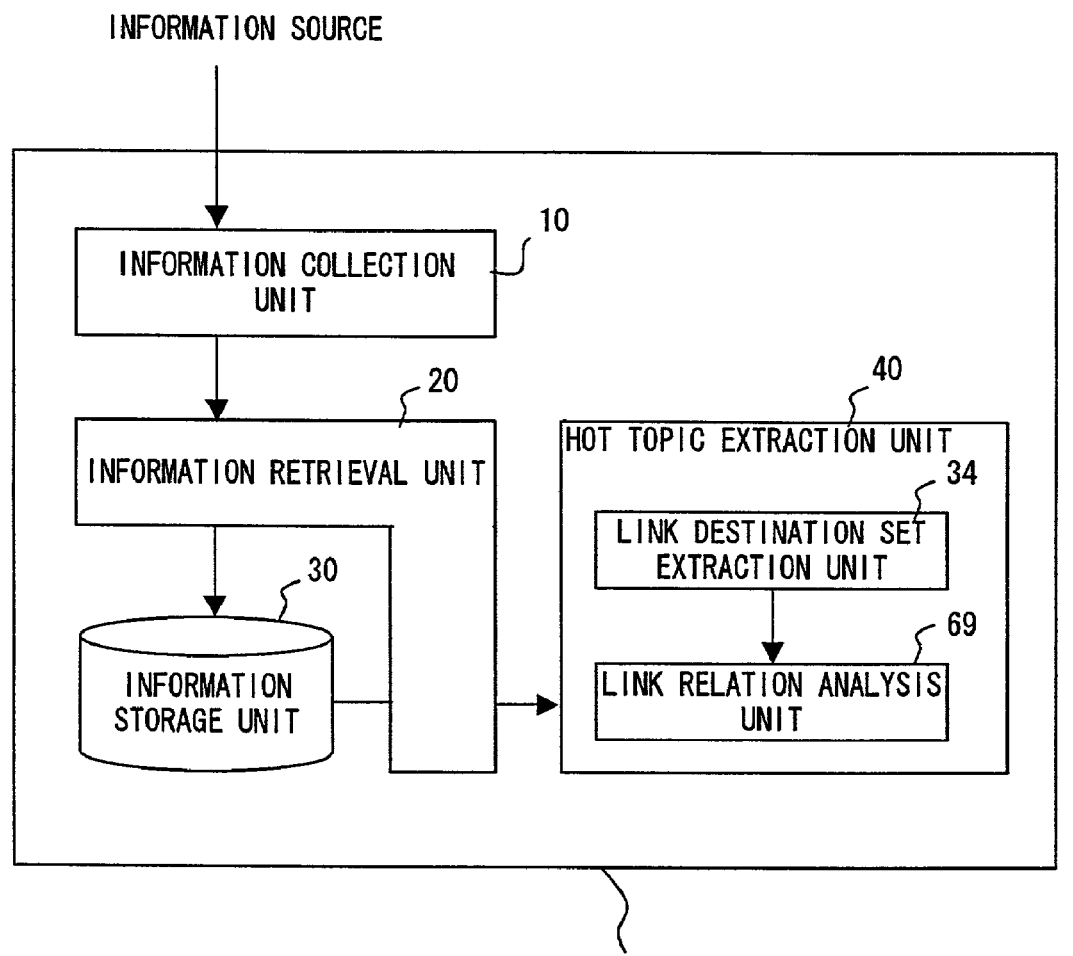
F I G. 3 3

```
<h2>PLAN FOR SEMICONDUCTOR PRODUCTION BASE?</h2>

<p> RECENTLY, WITH THE SLOW DOWN OF GROWTH RATE OF THE US ECONOMY, · · ·
<a href="http://.www.xxx.com/cc/cccnnn.html">FUJITSU</a>
DESCRIBES THE FUTURE DEMAND OF SEMICONDUCTOR · · · · · ·
BECAUSE </p>

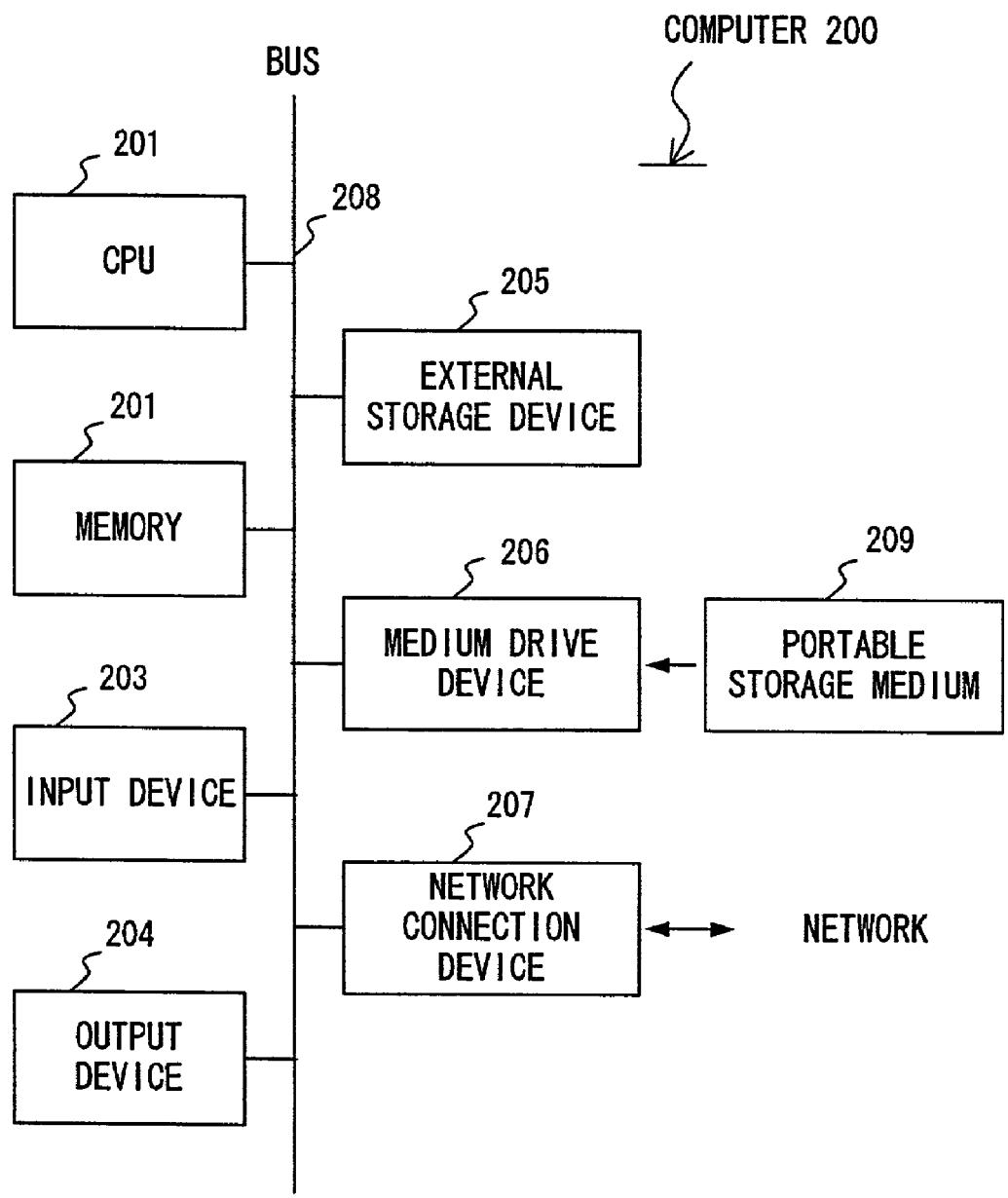
F I G. 3 6

HOT TOPIC EXTRACTION APPARATUS AND METHOD, STORAGE MEDIUM THEREFOR

BACKGROUND OF THE INVENTION

FIELD OF THE INVENTION

The present invention relates to the technology of extracting hot topics from among various information sources in a network.

For example, the inventions disclosed in Japanese Patent Publications No.5-266072, No.2000-242656, etc. are the technology of extracting a topic from a document. The invention described in Japanese Patent Publication No.5-266072 relates to an apparatus for extracting topics from a predetermined document with high precision although there are sentences not containing a requested topic or containing the representations not matching the topic. The invention described in Japanese Patent Publication No.2000-242656 relates to an apparatus for extracting a topic such as articles, advertisements, etc. from a document containing a plurality of topics including articles, advertisements, etc. Furthermore, the invention described in Japanese Patent Publication No.H09-106331 relates to an apparatus for extracting a topic from a series of contributions on an electronic bulletin board. The invention described in Japanese Patent Publication No.H11-7447 relates to an apparatus for extracting a topic from a number of newspaper articles. Technologically, these inventions extract a topic by analyzing a given document into morphemes and using the link structure among the contributions on the electronic bulletin board.

The technology of extracting such topics is used for several purposes. For example, the invention described in Japanese Patent Publication No.11-259389 uses the topic extracting technology in the process of checking contributions on an electronic bulletin board. Digital Arts Co. arranges the result of monitoring the specific information in a network, for example, the information about a company name, a user name, etc., and provides the information for clients as a service to users. In the U.S., as eWatch Co., various services of periodically monitoring the contents of Web, net news, mailing list, forum or electronic bulletin boards are provided. Some service companies have 800 or more client companies.

In the above mentioned topic extracting technology, a topic of a predetermined document is extracted. However, there are an enormous number and types of information sources in the world. With the conventional technology in which topics are to be extracted from predetermined documents, there has been the problem that the information about topical words and concepts in the world or specific communities cannot be correctly obtained.

SUMMARY OF THE INVENTION

The present invention aims at providing hot topic extracting technology for solving the above mentioned problem.

To solve the problem, according to an aspect of the present invention, a hot topic extraction apparatus for extracting a hot topic from information includes: an information collection unit for collecting documents from an information source; an information storage unit for storing collected documents; and a hot topic extraction unit for extracting hot topics from documents retrieved from the information storage unit parallel to a process of collecting documents.

Thus, the hot topic extraction apparatus does not extract a hot topic from given documents, but extracts hot topics by retrieving documents from the information storage unit while collecting documents from information sources and storing them in the information storage unit. Hot topics according to the present invention does not refer to a subject or a theme of a document or a document group, but to a trend (tendency), information such as trend key words and popularity factors derived from hyperlink information and user's access logs. Therefore, hot topics according to the present invention does not always match the 'topic' described as a 'subject or theme in a document' in the above mentioned conventional technology. Described below are other aspects of the present invention with the above mentioned configuration as a basic configuration.

With the basic configuration according to another aspect of the present invention, the hot topic extraction apparatus further includes a retrieval unit, and a topical word analysis unit. The retrieval unit retrieves documents from the information storage unit at random or on a predetermined condition. The topical word analysis unit extracts a plurality of words from the retrieved documents, and statistically analyzes the extracted words, thereby extracting from the plurality of words a word satisfying a predetermined condition as a hot topic.

With the basic configuration according to a further aspect of the present invention, the hot topic extraction unit can further include a popularity level analysis unit, a high popularity information extraction unit, and the topical word analysis unit (described above). The popularity level analysis unit computes popularity level for each document based on a link relation between documents. The high popularity information extraction unit extracts a popular document from the information storage unit based on the popularity level. The topical word analysis unit analyzes a topical word in the extracted document. Based on the definition that a document linked by a larger number of documents is more popular and more important than other documents, the popularity level analysis unit computes the popularity level of each document. More popular documents in the collected documents are retrieved by priority. Then, by extracting a hot topic from the retrieved document, hot topics can be efficiently extracted. The popularity level analysis unit can be designed to compute the popularity level according to, in addition to the link relation, the location information indicating the location of a document in the information source. The popularity level analysis unit can also be designed to compute the popularity level according to an access log.

Furthermore, the topical word analysis unit can include a topical level computation unit and a ranking unit. The topical level computation unit computes the topical level indicating level of the topicality for each word by statistically analyzing a plurality of words extracted from the extracted document. The ranking unit ranks the plurality of words based on the topical levels. Thus, the hot topic extraction apparatus can obtain ranked hot topics.

Furthermore, with the basic configuration according to a further aspect of the present invention, the information collection unit stores date and time data indicating the date and time of collecting a document. The hot topic extraction unit can further include a date-and-time function unit in addition to the retrieval unit and the topical word analysis unit. The date-and-time function unit adds weights to each retrieved document according to the date and time data. The topical word analysis unit considers the weight of each retrieved document when a topical word is analyzed. For example, the date-and-time function unit can add a weight to a document according to the date and time data such that a newer document can be assigned a larger weight. Thus, since a larger weight is assigned to a word extracted from a newer document, the hot topic extraction apparatus can extract a newer (up-to-date) hot topic having a smaller time difference between a document collecting time and a hot topic extracting time.

According to a further aspect of the present invention, the hot topic extraction apparatus can further include an information sorting unit between the information collection unit and the information storage unit with the basic configuration. The information sorting unit sorts by categories the documents collected by the information collection unit. A category can be, for example, a field of the contents of a document, a subject which issues or generates a document, etc. The information storage unit stores the sorted documents. The topical word analysis unit obtains information sorted by categories from the information storage unit, and extracts a hot topic. Thus, hot topics can be provided by categories.

According to a further aspect of the present invention, the hot topic extraction apparatus can further add an analysis target word storage unit to the basic configuration. The analysis target word storage unit stores an analysis target word to be extracted from a document as an analysis target. The hot topic extraction unit retrieves from the information storage unit a document containing the analysis target word stored in the analysis target word storage unit, and extracts a word co-occurring with the analysis target word from the retrieved document. Then, the extracted word is statistically analyzed, and the analysis result of the co-occurring word can be extracted as a hot topic. Thus, the hot topic extraction apparatus can obtain the information about the environment in which an analysis target word occurs.

According to a further aspect of the present invention, the hot topic extraction apparatus can also be designed to further include an identification unit between the information collection unit and the information storage unit in the basic configuration. The identification unit identifies a collection source where the collected document is collected from an information source. The information storage unit overwrites a first document with a second document whose collection source is the same as that of the first document, and is so identified by the identification unit, and stores the second document.

When information is collected from an information source a plurality of times, the same document can be collected from the same collection source. In this case, if a document obtained without identifying its collection source is stored in the information storage unit, the same document may be repeatedly stored in the information storage unit. If a document is retrieved in this state from the information storage unit to extract a hot topic, then the same process is repeatedly performed on the identical documents. The problem that the same document is repeatedly stored in the information storage unit can be solved by providing the identification unit.

According to a further aspect of the present invention, the hot topic extraction apparatus can add the identification unit and a difference extraction unit to the above mentioned basic configuration. The difference extraction unit extracts a difference between a previously collected document and a newly collected document for which the identification unit has identified the same collection source, and outputs the extracted difference to the hot topic extraction unit. The hot topic extraction unit extracts a hot topic from the input difference. Thus, since it is not necessary to extract a hot topic from the same document portion as the previously collected document from the documents identified by the identification unit, a new hot topic can be efficiently extracted from newly collected information, and simultaneously a hot topic can be extracted from new information.

According to a further aspect of the present invention, the hot topic extraction apparatus can further add to the above mentioned basic configuration between the information collection unit and the information storage unit an information type determination unit, an information storage strategy execution unit, and an information storage strategy storage unit. The information type determination unit determines an information type of the collected documents. An information type refers to the type of a document or the characteristic of a document, and is determined based on the subject which issues or generates the document, not on the contents of the document. The information storage strategy execution unit obtains the information storage strategy rules corresponding to the information type determined by the information type determination unit from the information storage strategy storage unit, and stores the document according to the information storage strategy rules. The information storage strategy storage unit stores the collected information storage strategy rules prescribing (describing) the method of storing a document corresponding to information type, thereby changing the method of storing information depending on the information type.

According a further aspect of the present invention, the hot topic extraction apparatus can be designed to further include a cleaning unit between the information collection unit and the information storage unit in the above mentioned basic configuration. Collected documents can contain information not suitable for a target from which a hot topic is to be extracted. For example, an advertisement, menu, contents, etc., of a banner, etc. The cleaning unit removes information not suitable for a target from which a hot topic is to be extracted from the collected documents. Thus, a hot topic can be extracted from a document with high precision.

According to a further aspect of the present invention, in addition to the above mentioned basic configuration, the hot topic extraction apparatus can also be designed to further include the analysis target word storage unit, an occurrence log generation unit, an occurrence log storage unit, and a log analysis unit. The analysis target word storage unit is described above. The occurrence log generation unit obtains a document including a predetermined word from the information storage unit. The occurrence log generation unit generates an occurrence log including a document ID identifying the obtained document, the collection date and time of the document, and a word ID identifying the word. The occurrence log storage unit stores the generated occurrence log. The log analysis unit analyzes the occurrence log stored for the predetermined word in the occurrence log storage unit. Thus, the environment of the history of the occurrences of the predetermined word can be checked.

According to a further aspect of the present invention, in addition to the above mentioned basic configuration, the hot topic extraction apparatus can further include a condition matching determination unit, a hot topic notification unit, and a hot topic condition storage unit. The hot topic extraction unit extracts a hot topic. The condition matching determination unit determines whether or not the extracted hot topic satisfies the topic condition which is a predetermined condition to be satisfied by a hot topic. The hot topic notification unit notifies a user, etc. of the hot topic determined to satisfy the hot topic condition. Thus, the hot topic extraction apparatus can notify a user, etc. of a hot topic satisfying the predetermined condition among the extracted hot topics. The hot topic extraction apparatus can further include an information collection strategy storage unit storing the information collection strategy rules prescribing (describing) the method or procedure of collecting information by the information collection unit, and an information collection strategy change unit changing the information collection strategy rules based on the determination result from the condition matching determination unit. The information collection unit collects documents from the information source according to the information collection strategy stored in the information collection strategy storage unit. Thus, a result of extracting a hot topic can be fed back to the process of collecting a document. To be more specific, the information collection strategy change unit can change the information collection strategy rules such that a document can be collected with, for example, the depth of a search set large for a document containing a hot topic satisfying the hot topic condition, and also can be collected with the depth of a search set small for a document not containing a hot topic satisfying the hot topic condition.

According to a further aspect of the present invention, in addition to the above mentioned basic configuration, the hot topic extraction apparatus further includes a noticed information description storage unit, and the hot topic extraction unit can include a noticed information analysis unit, an analysis result log storage unit, and an information change extraction unit. The noticed information description storage unit stores the noticed information description rules describing the condition of the noticed information which is a document from which a hot topic is to be extracted. The noticed information analysis unit retrieves noticed information from the information storage unit according to the noticed information description rules, and analyzes the hot topic of the noticed information in the same way as the topical word analysis unit. The analysis result log storage unit stores the analysis result of the noticed information analysis unit. The information change extraction unit extracts a difference between the current analysis result and the previous analysis result by referring to the previous analysis result stored in the analysis result log storage unit. Thus, it obtains noticed information from among arbitrarily collected document groups, and obtains an extraction result of a hot topic from the noticed information as compared with the result of the previous extraction.

According to a further aspect of the present invention, in addition to the above mentioned basic configuration, the hot topic extraction apparatus can further include a link source storage unit, a link destination set obtaining strategy storage unit, and a link destination set extraction unit. The link source storage unit stores document designation information for designation of a predetermined document. The link destination set obtaining strategy storage unit stores link destination set obtaining strategy rules prescribing (describing) the method of obtaining a link destination document linked by a predetermined document. The link destination set extraction unit extracts a link destination document of the document designated according to the document designation information based on the link destination set obtaining strategy rules. The hot topic extraction unit extracts a hot topic from the link destination document. Thus, a hot topic of a document which is a link destination of a predetermined document can be extracted.

According to a further aspect of the present invention, in addition to the above mentioned basic configuration, the hot topic extraction apparatus can further include a personal interest information extraction unit. The personal interest information extraction unit extracts information designating a document assumed to interest a person or a corporation from the information input by a user or from other devices, and retrieves the document from the information storage unit according to the extracted information. The hot topic extraction unit extracts a hot topic from the retrieved document. Thus, the hot topic extraction apparatus can extract a hot topic corresponding to the interest of a person or a corporation.

According to a further aspect of the present invention, with the above mentioned basic configuration, the hot topic extraction unit can also be designed to include the analysis target word storage unit, an analysis target word determination unit, a specific word storage unit, and a specific word determination unit. The analysis target word storage unit is described above. The specific word storage unit stores a specific word belonging to a specific category. The analysis target word determination unit obtains a document containing an analysis target word from the information storage unit. The specific word determination unit extracts a document containing the specific word as a hot topic from the document obtained by the retrieval. That is, with the configuration, a document containing the specific word in the documents containing analysis target words is defined as a hot topic. For example, when an analysis target word is a person's name and, a specific word is an abusive and slanderous word, an abusive and slanderous document about the person is extracted as a hot topic.

According to a further aspect of the present invention, with the above mentioned basic configuration, the hot topic extraction unit can also be designed to further include the above mentioned link destination set extraction unit and a link relation analysis unit. The link relation analysis unit analyzes the transition with time of a document having another document as a link destination based on the extracted link destination set, and outputs an analysis result as a hot topic. The contents of the document having another document as a link destination can be estimated to be related to the contents of the link destination document or the hot topic of the link destination document. For example, if the link destination document is linked by a document relating to sports, the link destination document is estimated to be related to the sports. Therefore, by analyzing the transition with time of the document having another document as a link destination, the transition with time of the contents of the link destination document or the hot topic of the link destination document can be obtained. That is, with the configuration, the information about the contents of the link destination document can be obtained as a hot topic by analyzing the link relation without analyzing the contents of the link destination document.

According to a further aspect of the present invention, with the above mentioned basic configuration, the hot topic extraction unit can be designed to further include an anchor extraction unit (link destination set extraction unit) and an anchor peripheral information analysis unit. The anchor extraction unit extracts a portion in which a link relation is embedded from the document retrieved from the information storage unit. Since the portion in which the link is embedded is referred to as an anchor in HTML, the portion in which a link is embedded can be referred to as an anchor. However, it is not intended that a language in which a document is described is limited to HTML. The anchor peripheral information analysis unit extracts the information in the vicinity of the anchor from a document, and extracts a hot topic from the extracted information about the vicinity of the anchor. Since the information in the vicinity of the anchor relates to the anchor in many cases, a hot topic relating to the anchor (or a person, a substance, etc. represented by the anchor) can be efficiently extracted by selectively analyzing the information around the anchor.

Furthermore, the above mentioned problem can be solved by the method including the steps of the process realized by the apparatus having each of the above mentioned configurations. For example, in the hot topic extracting method for extracting a hot topic from information according to an aspect of the present invention, the process including the steps of collecting a document from an information source, storing the collected document in a storage unit, and extracting a hot topic from the document retrieved from the storage unit is performed with the steps performed in parallel. This method can also solve the above mentioned problems.

The present invention can also be configured as a program for directing a computer to control the functions performed with each of the above mentioned configurations according to the present invention. It is also possible to solve the above mentioned problems by loading the program into the computer which executes the program. Loading the above mentioned program can be realized by allowing the computer to read the program from a storage medium storing the program. Loading the program can also be realized by a computer receiving a computer data signal embodied by a carrier wave representing a computer program.

BRIEF DESCRIPTION OF THE DRAWINGS

The features and advantages of the present invention will be more clearly appreciated from the following description taken in conjunction with the accompanying drawings in which like elements are denoted by like reference numerals and in which:

FIG. 1 shows the principle of the present invention;

FIG. 2 shows the configuration of the hot topic extraction apparatus according to the first embodiment of the present invention;

FIG. 3 is a flowchart of the process performed by the hot topic extraction apparatus according to the first embodiment of the present invention;

FIG. 7 shows an example of the data structure of the reference table;

FIG. 8 is a flowchart of the process of determining and collecting a document to be collected by priority according to the link relation and location information;

FIG. 9A shows an example of the case in which a plurality of objects are contained in information indicated by a piece of location information;

FIG. 9B shows an example of the case in which one object is represented in information indicated by plural pieces of location information;

FIG. 10 shows the configuration of the hot topic extraction apparatus according to the third embodiment of the present invention;

FIG. 12 shows the configuration of the hot topic extraction apparatus according to the fifth embodiment of the present invention;

FIG. 13 shows the configuration of the hot topic extraction apparatus according to the sixth embodiment of the present invention;

FIG. 17 is a flowchart of the process performed by the hot topic extraction apparatus according to the eighth embodiment of the present invention;

FIG. 19 shows the configuration of the topic extraction apparatus according to the tenth embodiment of the present invention;

FIG. 24 shows the configuration of the hot topic extraction apparatus according to the twelfth embodiment of the present invention;

FIG. 33 shows the configuration of the hot topic extraction apparatus according to the seventeenth embodiment of the present invention;

FIG. 35 shows anchor tag peripheral information;

FIG. 36 shows the configuration of a computer; and

DESCRIPTION OF THE PREFERRED EMBODIMENTS

Figure 4:
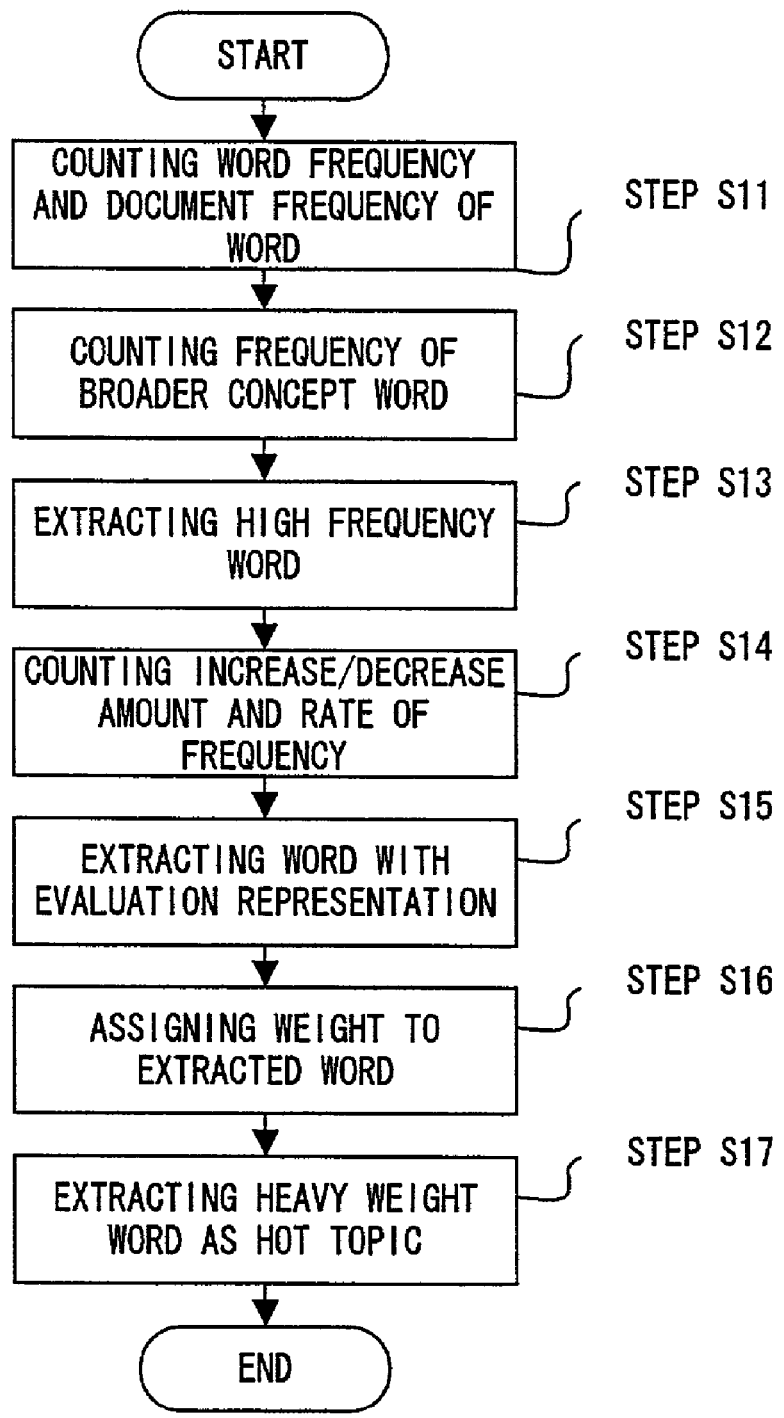
FIG. 4 is a flowchart of the process of analyzing a topical word.

The embodiments of the present invention are described below by referring to the attached drawings. In some examples, the HTML is used as an example of a language of describing a document, but the language is not limited to the HTML. Any markup language such as the XML (extensible markup language), the XSL (extensible style sheet language), etc. can be used.

FIG. 1 shows the principle of the present invention. As shown in FIG. 1, a hot topic extraction apparatus 1 is connected to an information source directly or indirectly through a network not shown in the attached drawings. An information source can be, for example, a Web page, an electronic bulletin board, netnews, a mailing list in a network such as Internet, etc., a newspaper database, TV news, radio, etc. and arbitrary combinations of them. Netnews refers to an electronic bulletin board system for exchanging information among users. The article contributed to the netnews is exchanged in relays using a protocol 'NNTP (Network News Transfer Protocol)'. In the netnews, each article is sorted according to themes, and sorted groups form a hierarchical structure.

The hot topic extraction apparatus 1 collects information from an information source, and extracts a hot topic from the collected document. A hot topic according to the present invention does not refer to the subject or theme of a document (information) or a document group (information group), but refer to a trend, a fashion, a noticed word, a concept, etc., which is extracted form a wide-ranging information source that is, a hot topic. For example, the hot topic according to the present invention corresponds to the title of a hit, a title of a probable hit, etc. in the field of music, the name of an actor or an actress to attract attention in the future in the show business, etc. Therefore, the 'hot topic' according to the present invention is not the same in concept as the commonly used 'topic'. The 'hot topic' according to the present invention can be used in, for example, generating an article of newspapers, magazines, etc. and developing a new product, etc.

In addition, the hot extraction apparatus according to the present invention can also be used by a person or a corporation to have the information as a 'hot topic' before a certain type of information such as an abuse, slander, etc., widely spreads. Networks have made remarkable progress these days, and information can be quickly transmitted through the networks. Accordingly, fast obtaining a 'hot topic' according to the present invention is in great demand.

The hot extraction apparatus 1 comprises an information collection unit 2, an information retrieval unit 3, an information storage unit 4, and a hot extraction unit 5. The information collection unit 2 collects information from an information source. The information retrieval unit 3 stores the collected information in the information storage unit 4, and retrieves the information stored in the information storage unit 4 based on conditions. The hot topic extraction unit 5 extracts a hot topic from the retrieved information. With this configuration, the hot topic extraction apparatus 1 extracts a hot topic from the collected information and in parallel collects information from an information source which is a large volume of information and cannot immediately or entirely be grasped.

Conventionally, a hot topic has been extracted from a predetermined document. With the hot topic extraction apparatus 1 according to the present invention, a hot topic is not extracted from a given document, but a hot topic can be extracted from collected information while collecting the information. It is one of the features of the present invention. Additionally, since a hot topic can be extracted while collecting information from a large volume of information, the time difference between the document collecting time and the hot topic extracting time can be reduced. As a result, the hot topic extracted by the hot topic extraction apparatus 1 can be new and fresh, which is significant in processing and generating a large volume of information.

Described below is each embodiment according to the present invention.

Described below is the first embodiment of the hot extraction apparatus according to the present invention. First, the configuration of the hot topic extraction apparatus according to the first embodiment is described by referring to FIG. 2. A hot topic extraction apparatus 101 according to the first embodiment comprises an information collection unit 10, an information retrieval unit 20, an information storage unit 30, and a hot topic extraction unit 40. The information collection unit 10 collects a document from an information source. Many kinds of methods for the information collection unit 10 to collect information are known. A document refers to various type of information contained in a network, a database, etc. For example, a document can be a Web page, information represented by a URI, a URL or a path, etc., an object contained in a document, etc.

The information retrieval unit 20 stores the document collected by the information collection unit 10 in the information storage unit 30, and retrieves the document stored in the information storage unit 30 based on conditions. Since the technology of retrieving a document has been widely known, the detailed explanation is omitted here.

The hot topic extraction unit 40 extracts a hot from the document retrieved from the information storage unit 30. The extracted hot topic is output from the output unit not shown in the attached drawings, or transmitted to another device through a network not shown in the attached drawings. The topic extraction unit 40 comprises a retrieval unit 41 and a topical word analysis unit 42.

The retrieval unit 41 retrieves the document stored in the information storage unit 30.

The topical word analysis unit 42 extracts a word or a phrase (hereinafter referred to commonly as a word) used in documents by analyzing the morpheme or further syntax, and counts the frequency of the occurrences of the extracted words. In addition, the topical word analysis unit 42 obtains a broader concept of the extracted word using the thesaurus, and also counts the frequency of the occurrences of the word of the broader concept. Furthermore, the topical word analysis unit 42 can extract a hot topic from documents with the result of the comparison between the previously and currently extracted topics taken into account.

Described below is the process performed by a hot topic extraction apparatus 101 by referring to FIG. 3. As shown in FIG. 3, the information collection unit 10 collects documents from an information source, and the information retrieval unit 20 stores the collected documents in the information storage unit 30 (step S1). The information collection unit 10 can collect information at random from an information source. Since the collecting method is widely know, the detailed explanation is omitted here.

If the information collection unit 10 collects all documents at random from an information source, a relatively long time can be required to collect the documents when they are collected from such a large volume of information source as Internet, etc. For example, several months may be required to search the entire documents on the same site. While the documents are being collected from the information source, some of the collected documents can be updated, or new documents can be added on the site. Therefore, the information collection unit 10 can have the function of determining the document to be collected by priority, and can be designed to collect a document from an information source based on a determination result. To provide the function of determining a document to be collected by priority, the information collection unit 10 can be designed to have the functions of the popularity level analysis unit and the high popularity information extraction unit described later by referring to the second embodiment of the present invention.

Then, the information collection unit 10 determines whether or not the information is to be completely collected (step S2). If the collection continues (NO on step S2), then the information collection unit 10 continues collecting documents while performing the processes in and after step S3. The retrieval unit 41 retrieves the collected document from the information storage unit 30 (step S3). If the connection terminates (YES in step S2), then the process terminates. The retrieval unit 41 can retrieve the documents in order from the information storage unit 30, or selectively retrieve the documents based on a predetermined condition. In the former method, according to the present invention, an extraction of a hot topic and collection of documents are performed in parallel. Therefore, it may be necessary to limit the number of documents to be processed by the topical word analysis unit 42, for example, to the documents collected in a predetermined period, or 100 documents from a predetermined document, etc.

The latter method is effective when the documents stored in the information storage unit 30 is too large in volume, and the documents requires a long time if they are processed in order by the topical word analysis unit 42. As the latter method, the retrieval unit 41 can assign a document ID (identification information) for identification of a document to each of the collected documents, and can retrieve the documents at random from the information storage unit 30 using a random number, etc. Furthermore, the retrieval unit 41 can retrieve a document from among 100 documents each time the 100 documents are collected. In addition, for example, the retrieval unit 41 can selectively retrieve documents using a specific attribute of each of the collected documents. To be more specific, for example, when the collection date of a document is used as an attribute, the retrieval unit 41 can selectively retrieve documents, etc. collected on and after a predetermined date and time or on every even number date. Additionally, for example, when the language of documents is used as the attribute of the document, the retrieval unit 41 can selectively retrieve documents in Japanese.

Then, the topical word analysis unit 42 extracts a hot topic from the retrieved documents by analyzing a topical word (step S4). The process of extracting a topical word is described later.

Each process in retrieving a document and in analyzing a topical word is not performed after completing each process on all documents before starting another process. That is, after the retrieving process is performed on a document, the analyzing process is performed on the document while retrieving another document. Thus, the processes are performing in parallel. Like the 'pipeline' in the UNIX operating system, each process is concurrently performed. The 'pipeline' in the UNIX operating system sequentially executes a plurality of commands by connecting the standard output of a command to the standard input of another command, thereby completing a job which cannot be performed by a single command.

Described below is the process of analyzing a topical word by referring to FIG. 4. The topical word analysis unit 42 retrieves words, phrases, etc., in documents by analyzing the morpheme (and by further analyzing the syntax) of each document, and counts the frequency of the occurrences of the words extracted by performing a statistic analysis (step S11). An example of a program module for counting the frequency of the occurrences of a word (word frequency or term frequency) is shown below.

```
foreach $document (%documents) {
    foreach $word (segment_word($document)) {
        $tf{$word}++; }}
``` where % documents indicates documents from which a hot topic is to be extracted.

In this module, the topical word analysis unit 42 retrieves a document '$document' one by one from the documents '%documents'. Then, the topical word analysis unit 42 retrieves words from the document using the function 'segment_word' for a word retrieving process (dividing a word), and stores the retrieved words '$word' in the word list not shown in the attached drawings. The topical word analysis unit 42 counts the word frequency '$tf{$word}' in the document '$document' for each word '$word' stored in the word list.

In counting the frequency of the occurrences of words, a stop word list (not shown in the attached drawings) for storing a word to be removed from the count can be further provided in the hot topic extraction unit 40 so that the topical word analysis unit 42 does not count the words in the stop word list among the words stored in the word list. Furthermore, the parts of speech of words whose occurrence frequency is to be counted can be limited. Thus, since a normal function word, etc., which is often used regardless of a hot topic, can be removed from the words to be counted, a storage capacity, etc. required for the hot topic extraction apparatus can be saved.

Furthermore, the topical word analysis unit 42 counts the number of documents, that is, the document frequency, in which a word occurs in documents from which a hot topic is to be extracted. Described below is an example of a program module for counting the document frequency.

```
foreach $document (%documents) {
    foreach $word (uniq(sort(segment_word($document))))
    {
        $tf{$word}++; }}
``` where 'sort' indicates a function for sorting a given word list, 'uniq' indicates a function for deleting a double entered element (entry) from the word list.

Since the module is almost the same as the module for counting the occurrence frequency except sort and uniq, the explanation of the module is omitted here. Documents having different location information can be used as a unit of counting a document frequency. When the location information is a URL, the site frequency can be counted by, for example, regarding documents contained in one site as one document.

Furthermore, by setting the function 'segment_word' in the above mentioned two modules as a function for retrieval of a phrase instead of a word, the phrase frequency or the phrase document frequency can be counted.

Then, the topical word analysis unit 42 obtains the broader concept word of each word stored in the word list using the thesaurus, and counts the word frequency and document frequency of the obtained broader concept word as in step S11 (step S12). The thesaurus can be, for example, the EDR dictionary (developed by Electronic Dictionary Research Institute), a thesaurus dictionary, a categorized thesaurus table, WordNet (an online dictionary developed by Cognitive Science Laboratory), etc.

The topical word analysis unit 42 extracts a word, a phrase, or a broader concept word (hereinafter referred to as a high frequency word) whose occurrence frequency and document frequency (the occurrence frequency and the document frequency are hereinafter referred to generally as a frequency) are equal to or higher than an average value or an expected value (step S13). Then, it compares frequencies of each of the extracted high frequency words with the result of the previous hot topic extraction, and computes the number of increases/decreases in frequencies, and/or the increase/decrease rate in frequencies (step S14). That is, it computes the increase/decrease amount '$tf\{\$word, \$t\}-\$tf\{\$word, \$T\}$' of the frequency '$\$tf\{\$word, \$t\}$' at the current t compared with the frequency '$\$tf\{\$word, \$T\}$' at a time point T, and the ratio '$\$tf\{\$word, \$t\}/\$tf\{\$word, \$T\}$' of the frequency '$\$tf\{\$word, \$t\}$' at current time t to the frequency '$\$tf\{\$word, \$T\}$' at the time point T.

The topical word analysis unit 42 further extracts a word used in a document together with an evaluation representation stored in an evaluation representation storage unit (not shown in the attached drawings) (step S15). The evaluation representation refers to a representation of an evaluation of the novelty, importance, popularity, etc., of a described word. An example of an evaluation representation can be a 'famous . . . ', 'topical . . . ', ' . . . is noticed', 'is known as . . . ', etc. An extracted word is used in the portion ' . . . ' in these examples.

The topical word analysis unit 42 assigns a weight (the topical level indicating the level of the topicality of a word) to the extracted word based on the frequency, the amount of an increase/decrease, and/or the increase/decrease rates, and the evaluation representation (step S16) When a weight is assigned to the extracted word, the topical word analysis unit 42 sets heavier weights for larger values of the frequency $\$tf\{\$word, \$t\}$, the amount of increase/decrease of the frequency $\$tf\{\$word, \$t\}-\$tf\{\$word, \$T\}$, and the ratio of the frequency $\$tf\{\$word, \$t\}/\$tf\{\$word, \$T\}$, and also sets a weight such that a heavier weight can be assigned to a word with an evaluation representation than a word without the evaluation representation.

The topical word analysis unit 42 ranks extracted words according to the weight, and a word ranked high is extracted as a hot topic (step S17).

The hot topic extraction apparatus 101 outputs the extracted hot topic through an output unit, or transmits it to another device through a network. The topical word analysis unit 42 can also output or transmit the extracted hot topic after ranking it according to the weight. The ranking process is described later by referring to the fifth embodiment.

Figure 5:
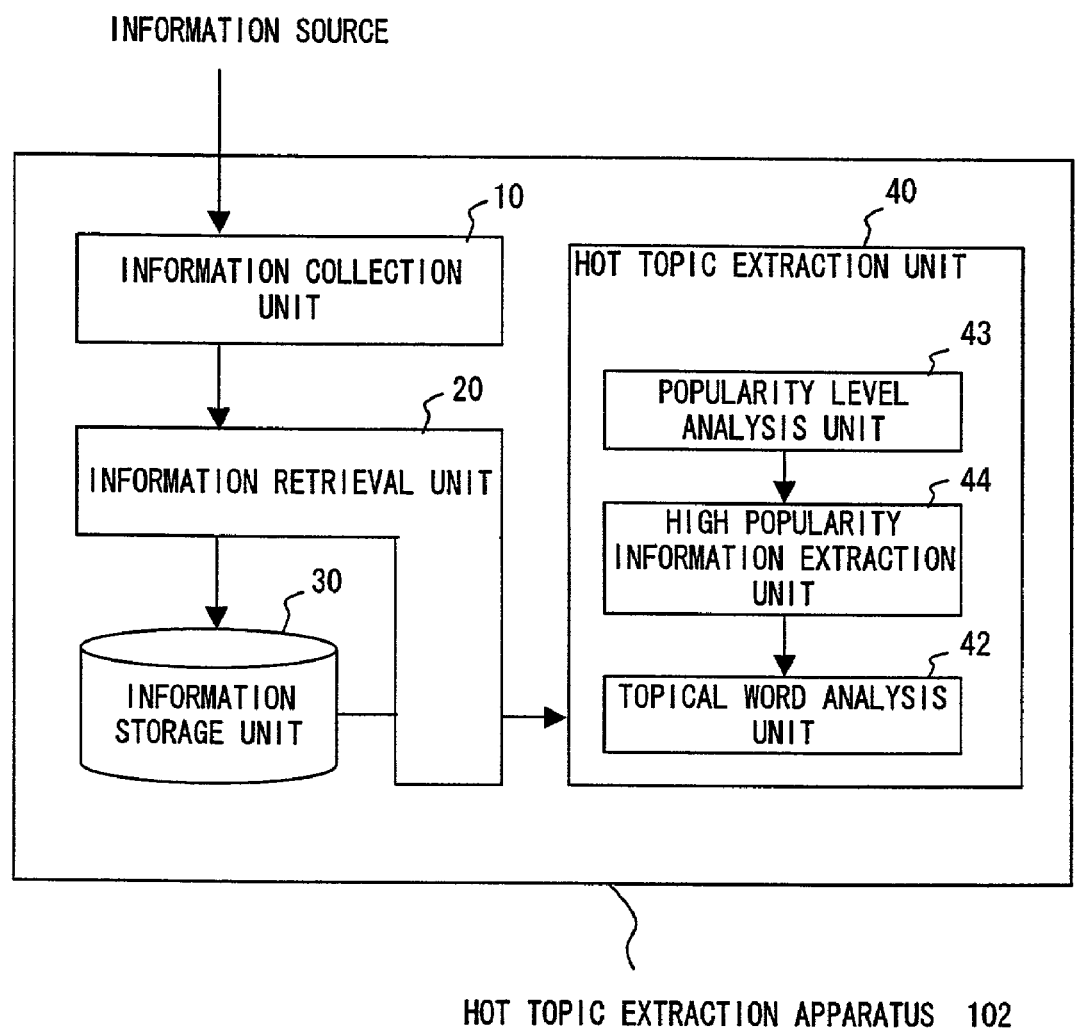
FIG. 5 shows the configuration of the hot topic extraction apparatus according to the second embodiment of the present invention.

Described below is the hot topic extraction apparatus according to the second embodiment. A hot topic extraction apparatus 102 according to the second embodiment retrieves popular documents from the information storage unit 30, and extracts a hot topic from the documents. FIG. 5 shows the configuration of the hot topic extraction apparatus 102 according to the second embodiment of the present invention. As shown in FIG. 5, the hot topic extraction apparatus 102 according to the second embodiment is different in configuration of the hot topic extraction unit 40 from the hot topic extraction apparatus 101 according to the first embodiment. Since the configurations and the operations of other units are the same as those according to the first embodiment, the detailed explanation is omitted here.

The hot topic extraction unit 40 according to the second embodiment comprises a popularity level analysis unit 43, a high popularity information extraction unit 44, and a topical word analysis unit 42. The popularity level analysis unit 43 analyzes the popularity level indicating the level of the popularity of a document stored in the information storage unit 30. The high popularity information extraction unit 44 extracts a document with a high popularity level (popular document) based on the popularity level analyzed by the popularity level analysis unit 43. The popularity level analysis unit 43 and the high popularity information extraction unit 44 correspond to the retrieval unit 41 according to the first embodiment. The information retrieval unit 20 retrieves the document extracted by the high popularity information extraction unit 44 from the information storage unit 30. The topical word analysis unit 42 extracts a hot topic by analyzing the topical word of the document retrieved by the information retrieval unit 30.

It is considered that a popular document is read by a number of users. Since the contents of a document read by a number of users possibly becomes topical by being widely spread. Therefore, it is considered to be more important by other documents. According to the second embodiment, the process can be efficiently performed by obtaining popular documents by priority from the information storage unit 30, and extracting a hot topic from the documents.

Figure 6:
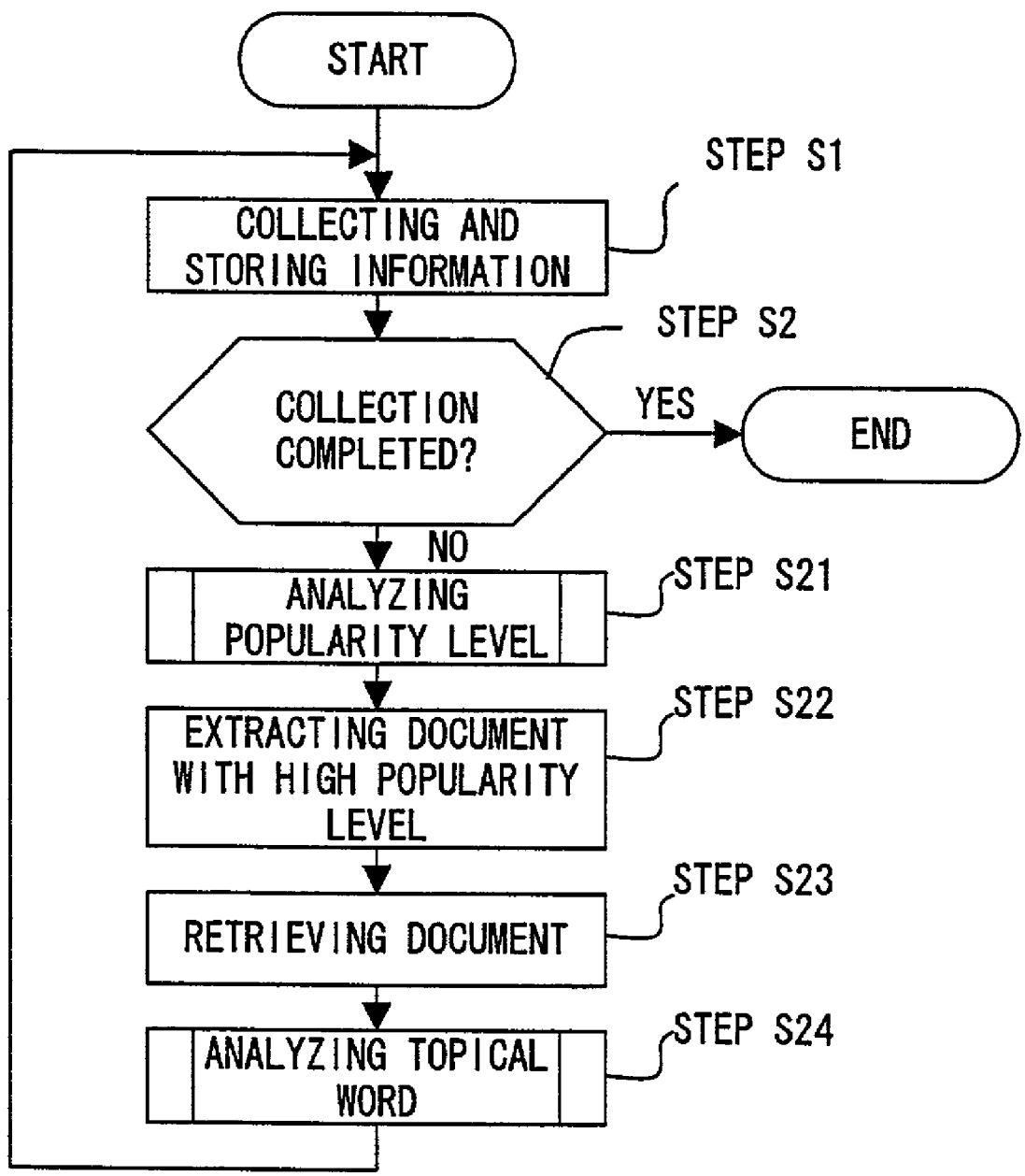
FIG. 6 is a flowchart of the process performed by the hot topic extraction apparatus according to the second embodiment of the present invention.

The process performed by the hot topic extraction apparatus 102 according to the second embodiment is described below by referring to FIG. 6. As shown in FIG. 6, the process performed by the hot topic extraction apparatus 102 according to the second embodiment is different from the process performed by the hot topic extraction apparatus 101 according to the first embodiment shown in FIG. 3 in that the processes in steps S21 through S23 are performed instead of the process in step S3 shown in FIG. 3. With the hot topic extraction apparatus 102 according to the second embodiment, after the processes in steps S1 and S2 shown in FIG. 3, the popularity level analysis unit 43 analyzes the popularity level of the document stored in the information storage unit 30 (step S21). The process of analyzing the popularity is described later in detail.

Then, the high popularity information extraction unit 44 extracts a popular document according to the analyzed popularity level (step S22). The high popularity information extraction unit 44 can extract n documents with higher popularity levels, and can extract documents having popularity levels higher than a predetermined level. The information retrieval unit 20 retrieves the extracted documents from the information storage unit 30 (step S23), and control is passed to step S4.

Described below is the process of analyzing the popularity of a document by the popularity level analysis unit 43. The process described below corresponds to the process in step S21 shown in FIG. 6. There can be several methods of analyzing the popularity as follows.

For example, a document in a network, a database, etc. often has a link relation to other documents. The popularity level analysis unit 43 can use the link relation to analyze the popularity of a document. Since a document linked by a number of documents, that is, a document having a large number of links from link source documents, are popular, it is considered to be read by a number of users. Thus, the popularity level analysis unit 43 assigns a weight, that is, the popularity level, to each document such that a document having a larger number of links from other documents can be assigned a heavier weight.

In the case of the WWW, the number of link destination documents can be easily obtained, but the number of link source documents cannot be directly obtained. Therefore, the popularity level analysis unit 43 can be designed to generate a reference table as shown in FIG. 7 for storing a pair of a link source document and a link destination document and count the number of link source documents which link to a link destination document. Described below is the program module for counting the number of link source documents which link to a link destination document.

```
foreach $document (get_document ( ) ) {
    foreach $linkto (get_link($document)) {
        $nlinked{$linkto}++; }}
``` where 'get_document' is a function for retrieval of a document from the information storage unit 30, and 'get_link' is a function for retrieval of a link relation from a document.

According to the module, the popularity level analysis unit 43 calls a function 'get_document' and retrieves a document from the information storage unit 30. Then, the popularity level analysis unit 43 calls the function 'get_link', and obtains a set of link destination documents of each document. The popularity level analysis unit 43 stores the obtained set of link destination documents in the reference table. Then, the popularity level analysis unit 43 counts the number of links of each link destination document of other documents, that is, the number of documents (number of link source documents) which are linking to the link destination documents, using the set of link destination documents stored in the reference table. For example, the link source documents of the document doc 3 are doc 1 and doc 2, and the number of links of the documents doc 3 by other documents is 2.

Further more, for example, according to the second record in the reference table shown in FOG. 7, the popularity level analysis unit 43 can also be designed to obtain the access frequency of each document, and assign a weight (popularity level) such that a document having a higher access frequency can be assigned a heavier weight. Because the access frequency of a document indicates the number of times the document is read, a document having a higher access frequency is considered to be more popular. In the case of WWW, it is generally difficult to obtain the access frequency on each site. However, by limiting the documents whose access frequencies are to be counted to the documents in a specific community or site, the popularity level analysis unit 43 can obtain the access frequencies. Additionally, the popularity level analysis unit 43 can receive a notification of the access frequency from each site. A community in this explanation refers to a community formed in a network. For example, a user group on an in-house site, an industry site, and in the network of a specific hot topic. For example, an in-house site can often be represented by Intranet. An industry site can be represented by Extranet comprising the systems of a plurality of companies.

Furthermore, for example, a document includes the location information indicating the location of each piece of information in a network or a system. The information about the location of a document in a network can be, for example, URIs (uniform resource identifiers) or URLs (uniform resource locators). The popularity level analysis unit 43 can also use the location information about the document in addition to the link relation to analyze the popularity level. To be more specific, the popularity level analysis unit 43 assigns a weight by introducing the following concept.

1. A document linked from a large number of documents having non-similar location information is important.

For example, a plurality of documents provided on a site are linked from other documents on the same site, but the location information about the documents, for example, the URIs, are similar to one another. Therefore, it is predicted that the link from the document having the location information which is similar to that of the link destination document at a high level (hereinafter referred to as similarity level) does not always indicate the height of the popularity level of the link destination document.

2. A document linked by a larger number of documents are more popular, and documents linked by popular documents having a low similarity level in location information are popular.

For example, a document linked by a large number of documents can be considered to be popular. However, for example, a document provided for a service (site) having a large number of documents and mirror sites is often linked from a document in the site, but the link from the document on the same site does not always indicate that the document is popular. By introducing this concept, mistakenly regarding a document on the site containing a large number of documents as a popular document can be avoided.

3. The similarity level of the location information is determined based on the description of the location information. For example, if the location information is a URL, then it is determined that URLs having a different server address, a different path, a different file name, etc., are the most different from each other.

The process of the popularity level analysis unit 43 analyzing the popularity level according to the link relation and the location information is described below by referring to FIG. 8. In the following description, it is assumed that the location information is an URL, but the present invention is not limited to this application.

First, the popularity level analysis unit 43 extracts the link relation as described above (step S31). Then, the popularity level analysis unit 43 computes the weight of the link based on the similarity level of the URLs between a link destination document and of a link source document (step S32). Generally, the URL of the document is configured by three types of information, that is, a server address, a path, and a file name. Therefore, the similarity level of the URLs between a link destination document and a link source document can be defined by the combination of the three types. The similarity sim(p,q) can be, for example, the following domain similarity level sim_domain(p,q) and merge similarity level sim_merge(p,q), for example.

The domain similarity level sim_domain(p,q) is computed based on the similarity of domains in location information. A domain refers to the latter portion of a server address, and indicates a company and an organization. In the case of a U.S. server, if a server address ends with .com, .edu, .org, etc., then the last two levels correspond to a domain. In the case a server of other countries, if a server address ends with .jp, .fr, etc., then the last three levels correspond to a domain.

The domain similarity level of the document p and the document q is defined by the following equation (1).

similarity level sim_domain(p,q)=1/α (when p and q belong to the same domain)=1 (when p and q belong to different domains) (1)

where α is a constant, and is assumed to be a real number larger than 0 and smaller than 1.

A merge similarity level sim_merge(p,q) can be used as similarity level sim(p,q). The merge similarity level can also be defined by the following equation (2).

$$\text{similarity level sim\_merge } (p, q) = \text{(similartiy level of server address)} + \text{(similarity level of path)} + \text{(similarity level of file name)} \quad (2)$$

Described below is the method of computing each term of the right side.

The similarity level of a server address is determined by checking the hierarchical level of the server address from the end, and defining the similarity as 1+n when the address matches up to the n-th level. For example, since 'www.fujitsu.co.jp' matches 'www.flab.fujitsu.co.jp' up to the third level, the similarity is 4. Since 'www.fujitsu.co.jp' does not match 'www.fujitsu.com' at all (0 level matching), the similarity is 1.

The similarity level of a path is determined by comparing elements of paths which are segmented into elements by '/' from the beginning of the paths, and determining the similarity level at the matching level. For example, since '/doc/patent/index.html' matches '/doc/patent/1999/2/file.html' up to the second level, the similarity level is 2.

When file names match each other, the similarity level of the file name is 1. The weight lw(p,q) of a link is defined by the following equation (3).

$$lw(p, q) = \frac{1}{sim(p, q) \sum_{u \in Ref(p)} \frac{1}{sim(p, i)}} \quad (3)$$

where Ref(p) indicates a set of link destination documents of the document p.

Then, the popularity level analysis unit 43 computes the popularity level based on the weight (step S33). The popularity level is defined as a solution of the simultaneous linear equations of the following equation (4). Since there are a number of algorithms for the method of solving simultaneous linear equations, the detailed explanation is omitted here.

$$Wq = Cq + \sum_{p \in Refed(q)} Wp * lw(p, q) \quad (4)$$

The above mentioned concept can be obtained from the equations (3) and (4).

Thus, according to the present invention, the popularity level can be computed with high precision based on the link relation between documents (reference), the access frequency, the location information about documents, etc. without analyzing the bodies of the documents. Since this method does not depend on the languages, the popularity level can be quickly computed.

In the explanation above, the popularity level analysis unit 43 and the high popularity information extraction unit 44 analyze the popularity level of documents, and extracts documents. The popularity level can be analyzed and documents can be extracted for each piece of information according to the location information, for each community (site), or for each object.

An object is described below by referring to FIG. 9. FIG. 9A shows an example of the case in which a plurality of objects are contained in information according to one piece of location information. The layout as shown in FIG. 9A is often detected on the site such as a newspaper company. In the case shown in FIG. 9A, each article corresponds to each object. FIG. 9B shows an example of the case in which one article is divided into plural portions. In FIG. 9B, three documents have link relations, and the three documents form one article. In this case, documents indicated by plural pieces of location information form one object.

Described below is the hot topic extraction apparatus according to the third embodiment of the present invention. A hot topic extraction apparatus 103 according to the third embodiment extracts a hot topic with a weight assigned to each document based on the novelty of information. FIG. 10 shows the configuration of the hot topic extraction apparatus 103 according to the third embodiment of the present invention. As shown in FIG. 10, the hot topic extraction apparatus 103 according to the third embodiment further comprises a date-and-time function unit 45 in the hot topic extraction unit 40 as compared with the hot topic extraction apparatus 101 or 102 according to the first or second embodiment. Since the configurations and operations of other units are the same as those according to the first or second embodiment, the detailed explanation is omitted here.

When the information storage unit 30 stores a document, the information collection unit 10 stores adds the collection date and time or date and time data (date and time information) indicating the latest update date and time of each document to each document. The date-and-time function unit 45 adds a weight to each document based on the date and time data such that a document having date and time data closer to the current time point can be assigned a heavier weight. The topical word analysis unit 42 counts frequencies based on the weight assigned by the date-and-time function unit 45.

The flow of the process of the hot topic extraction apparatus 103 according to the third embodiment extracting a topical word is substantially the same as that according to the first embodiment. However, the process of analyzing a topical word is somewhat different. The process of the topical word analysis unit 42 analyzing the topical word according to the weight based on the date and time data is described below by referring to FIG. 4.

Before step S11, the date-and-time function unit 45 assigns a weight to each document to be processed in the topical word analyzing unit such that a document having date and time data closer to the current time point can be assigned a heavier weight. Then, the topical word analysis unit 42 performs the processes in steps S11 and S12. The topical word analysis unit 42 counts the frequency according to the weight based on the date and time data. To be more specific, the topical word analysis unit 42 can also be designed to increment the document frequency by 1 (the weight of the document is 0) when a word appears in a relatively old document. If the word appears in a relatively new document, it can be designed to increment the document frequency by 1+α (α is a positive value indicating the weight of a document). Thus, when a word appears in a new document, the document frequency can be largely evaluated as compared with the case in which the word appears in a relatively old document. Therefore, since a word appearing in a new document is more easily extracted as a hot topic, the hot topic extraction apparatus 103 can extract a newer hot topic. Since the processes in and after step S13 is similar to the process shown in FIG. 4, the explanation is omitted here.

Figure 11:
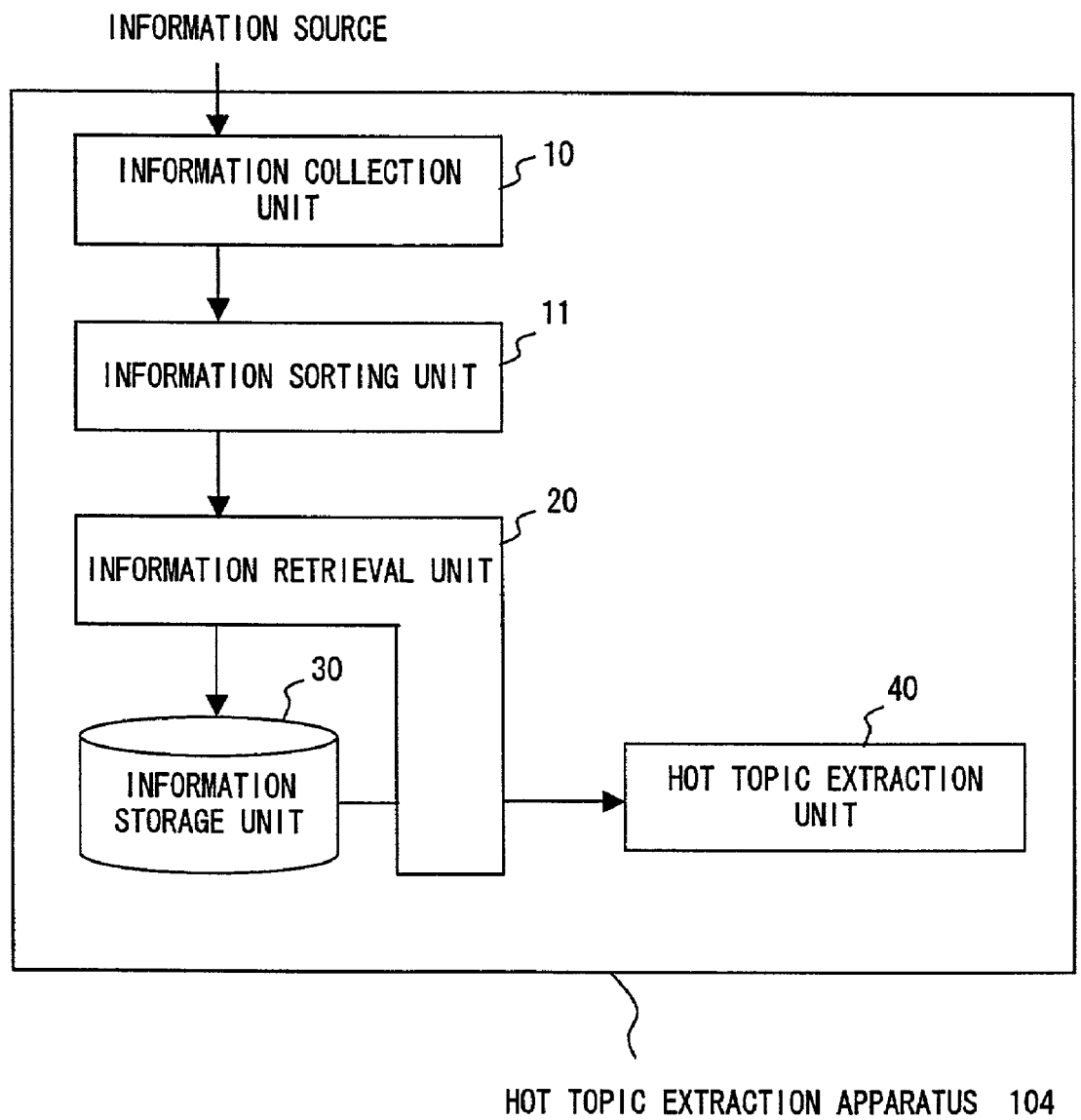
FIG. 11 shows the configuration of the hot topic extraction apparatus according to the fourth embodiment of the present invention.

Described below is a hot topic extraction apparatus 104 according to the fourth embodiment of the present invention. The hot topic extraction apparatus 104 according to the fourth embodiment sorts the documents collected by the information collection unit 10, and extracts a hot topic for each sort. FIG. 11 shows the configuration of the hot topic extraction apparatus 104 according to the fourth embodiment. As shown in FIG. 11, the hot topic extraction apparatus 104 further comprises an information sorting unit 11 between the information collection unit 10 and the information retrieval unit 20 of the hot topic extraction apparatus 101 according to the first embodiment. The information sorting unit 11 sorts the documents collected by the information collection unit 10 based on the category of the field to which the contents of the documents are related, or the grouping of issuers, etc., and assigns a code indicating the category to each of the sorted documents. As fields, for example, computers, cooking, optics, sports, etc., are cited. As groups of issuers, for example, newspaper companies, TV companies, publishers, academies, etc., are cited. Since there are a number of types of information sorting technology, the types of technology can be used for the information sorting unit 11. The information storage unit 30 stores documents each assigned a code indicating its category. Since the configurations and operations of the units other than the information sorting unit 11 are the same as those according to the first embodiment, the detailed explanation is omitted here.

The hot topic extraction unit 40 obtains the sorted documents from the information storage unit 30, and extracts hot topics. For example, when a hot topic relating to the 'computer' is extracted, the hot topic extraction unit 40 retrieves the documents sorted into the category of 'computer' from the information storage unit 30, and extracts hot topics from the retrieved document. Thus, hot topics can be provided for each category of a field or grouping of issuers, etc.

Described below is a hot topic extraction apparatus 105 according to the fifth embodiment. The hot topic extraction apparatus 105 according to the fifth embodiment ranks the results of extracting hot topics. FIG. 12 shows the configuration of the hot topic extraction apparatus 105 according to the fifth embodiment. As shown in FIG. 12, the hot topic extraction apparatus 105 according to the fifth embodiment further comprises a topical level computation unit 46 and a ranking unit 47 in the hot topic extraction unit 40 as compared with the configuration of the hot topic extraction apparatus according to the first or second embodiment.

Figure 14:
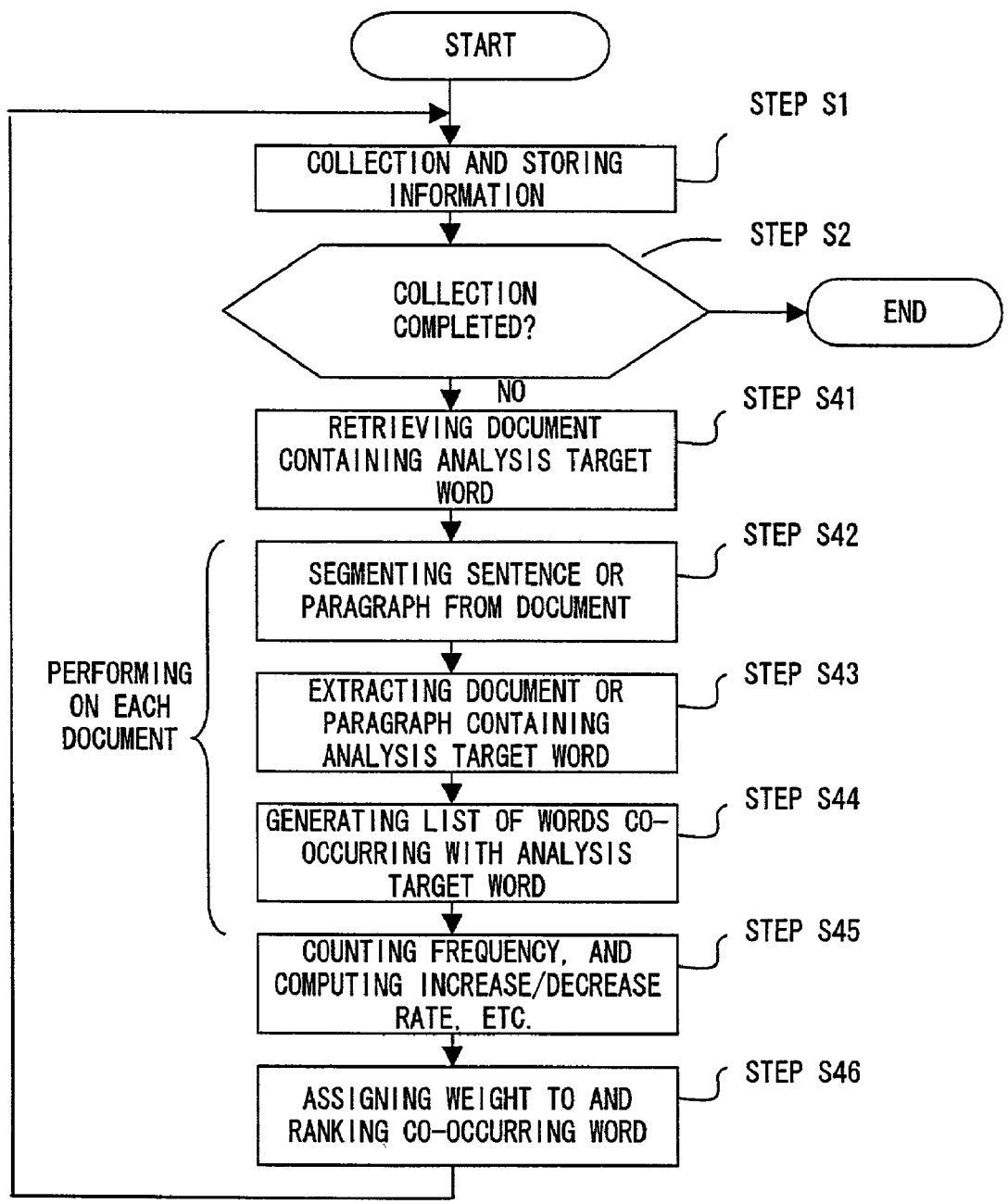
FIG. 14 is a flowchart of the process performed by the hot extraction apparatus according to the sixth embodiment of the present invention.

The topical level computation unit 46 performs the processes in steps S11 through S16 shown in FIG. 14 in the processes performed by the hot topic extraction unit 40. The weight computed in step S16 corresponds to the topical level. The ranking unit 47 ranks a high frequency word based on the weight (topical level) computed by the topical level computation unit 46.

In addition to the above mentioned configuration, the hot topic extraction apparatus 105 can also comprise the information sorting unit 11. After sorting the collected documents into categories such as business type, fields, areas, targets of documents, etc., by the information sorting unit 11, documents are stored in the information storage unit 30. Then, the hot topic extracting process is performed on the sorted documents by the hot topic extraction unit 40, and the documents are ranked. Thus, ranking result in the entire documents, and a ranking result for each category can be output.

Described below is a hot topic extraction apparatus 106 according to the sixth embodiment. The hot topic extraction apparatus 106 according to the sixth embodiment is given in advance a word to be analyzed (hereinafter referred to as an analysis target word), and analyzes documents for the given analysis target word. FIG. 13 shows the configuration of the hot topic extraction apparatus 106 according to the sixth embodiment. As shown in FIG. 13, the hot topic extraction apparatus 106 comprises an analysis target word storage unit 31 and an information analysis unit 32 instead of the hot topic extraction unit 40 as compared with the configuration of the hot topic extraction apparatus 101.

The analysis target word storage unit 31 stores an analysis target word, that is, a word, a phrase, a concept, etc. An analysis target word can be any of the above mentioned categories. The information retrieval unit 20 obtains a document containing an analysis target word by searching the information storage unit 30 using an analysis target word as a retrieval key. The information analysis unit 32 counts the frequencies of words co-occurring with an analysis target word for each of the obtained documents and analysis target words, computes the increase/decrease amount and the increase/decrease rate compared with the previously counted frequencies, and assigns a weight to each co-occurring word.

The process performed by the hot topic extraction apparatus 106 according to the sixth embodiment is described below by referring to FIG. 14. As shown in FIG. 14, the hot topic extraction apparatus 106 performs the processes in steps S41 through S46 after the steps S1 and S2 shown in FIG. 3.

After the processes in steps S1 and S2 shown in FIG. 3, the information retrieval unit 20 obtains an analysis target word from the analysis target word storage unit 31, and searches the information storage unit 30 using the obtained analysis target word as a retrieval key, thereby obtains documents containing an analysis target word (step S41). Instead of the information retrieval unit 20 obtaining documents containing an analysis target word using an analysis target word as a retrieval key, the information analysis unit 32 can be designed to retrieve documents stored in the information storage unit 30 and determine whether or not the documents contain an analysis target word.

The information analysis unit 32 segments a sentence or a paragraph from each of the obtained documents (step S42). Then, the information analysis unit 32 extracts a sentence or a paragraph containing an analysis target word (step S43), and generates a list of words co-occurring the analysis target word (step S44). The information analysis unit 32 counts the word frequency or the document frequency of a co-occurring word, and counts the increase/decrease amount and the increase/decrease rate of the counted frequencies (step S45). The information analysis unit 32 assigns a weight to a co-occurring word based on the increase/decrease amount and the increase/decrease rate of the frequencies, and ranks the co-occurring word (step S46), then terminating the process. The processes in S41 through S46 are performed by the information analysis unit 32 on a word co-occurring with an analysis target word. As for the other points, they are substantially the same as each process performed by the topical word analysis unit 42. Therefore, the detailed explanation is omitted here.

For example, when an analysis target word is 'Fujitsu', the hot topic extraction apparatus 106 searches a document containing 'Fujitsu', and extracts a word often co-occurring with 'Fujitsu'. Thus, the environment in which an analysis target word appears, for example, the information about evaluation, impression, and others can be obtained.

Furthermore, the hot topic extraction apparatus 106 can further comprise the information sorting unit 11. With the configuration, a document sorted by the information sorting unit 11 can be analyzed. Therefore, the information about the field to which a document containing an analysis target word belongs, the grouping of issuers, etc. can be provided. For example, the information that an analysis target word is often contained in a document belonging to the field of 'optics', a document provided by a newspaper company, etc. can be obtained.

Figure 15:
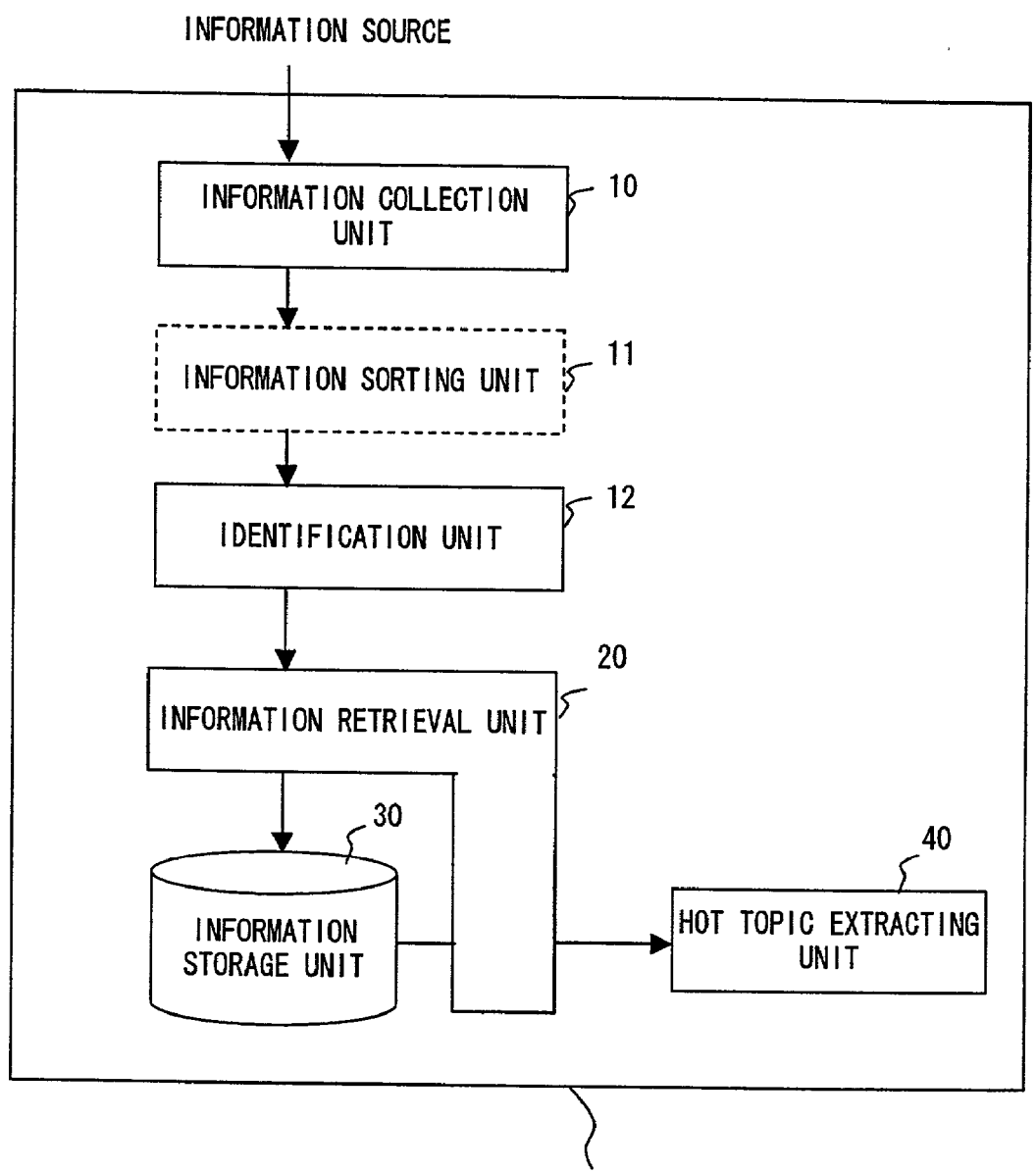
FIG. 15 shows the configuration of the hot topic extraction apparatus according to the seventh embodiment of the present invention.

Described below is a hot topic extraction apparatus 107 according to the seventh embodiment of the present invention. The hot topic extraction apparatus 107 identifies the collection source of a document collected before. FIG. 15 shows the configuration of the hot topic extraction apparatus 107 according to the seventh embodiment of the present invention. As shown in FIG. 15, the hot topic extraction apparatus 107 comprises an identification unit 12 and a location information table not shown in the attached drawings. The location information table stores the location information about a collected document.

The identification unit 12 identifies the collection source of a collected document. To be more specific, when the collected document is stored in the information storage unit 30, the identification unit 12 determines whether or not the location information table not shown in the attached drawings stores the same location information as the location information about the document. If it is determined that the same location information is not stored, then the identification unit 12 stores the location information about the document in the location information table, and the information retrieval unit 20 stores the collected document in the information storage unit 30. If it is determined that the same location information as the location information about the document collected by the identification unit 12 has already been stored in the location information table, then the document existing in the same position as the collected document has been previously collected. The information retrieval unit 20 overwrites and stores the newly collected document on the previously collected document. The identification unit 12 determines whether or not the location information is identical based on the character string of the location information. If the document is WWW and netnews, etc., then, for example, the URI or the URL can be considered as the location information. For example, the URL of the WWW is a character string starting with http://, and the URL of the netnews is a character string starting with news://.

Furthermore, the identification unit 12 performs the processes of a mirror site and a hanging link. A mirror site refers to a site having the same contents as a site (original site), and is provided to mitigate the concentration of access to the original site. In this case, plural pieces of information represented by different location information have the same contents. In this case, if a document in the mirror site is stored in the information storage unit 30 in the same way as a document in the original site is stored, then the documents having the same contents are double processed when a hot topic is extracted. To solve this problem, the information about the mirror site is stored in advance in the location information table. Based on the information, the identification unit 12 determines whether or not the collected document is a document in the mirror site. If it is determined that the collected document is a document in the mirror site, then the information retrieval unit 20 does not store the document in the information storage unit 30.

A hanging link refers to a link referring to, for example, a link embedded in a document having the contents 'This site has been transferred to http://xxxxxxx', and automatically and non-automatically referring the transfer destination. In this case, if a document in the transfer source site and a document in the transfer destination site are stored as is in the information storage unit 30, then the document in the transfer source site and the document in the transfer destination site are separately but double processed when a hot topic is extracted. In the case of a hanging link, the identification unit 12 updates the location information about the transfer source site stored in the location information table to the location information about the transfer destination site. The information retrieval unit 20 deletes the document in the transfer source site from the information storage unit 30, and stores the document in the transfer destination site. The above mentioned processes for the mirror site and the hanging link can also be performed when the number of links source documents is counted.

When documents are collected plural times from an information source, a plurality of documents collected from the same collection source can be stored in the information storage unit 30 by storing documents collected from the same collection source without managing them. Especially when the documents are not updated, the same documents coexist in the information storage unit 30. Thus, when a hot topic is extracted with documents stored, the frequency is actually double counted. Furthermore, there occurs the problem that the result of extracting a hot topic depends on the frequency of collecting documents. According to the seventh embodiment, the above mentioned problem can be solved by, for example, overwriting and storing in the information storage unit 30 a document whose collection source is identified. Furthermore, the hot topic extraction apparatus 107 can also comprise the information sorting unit 11, and sort and store information in the information storage unit 30.

Figure 16:
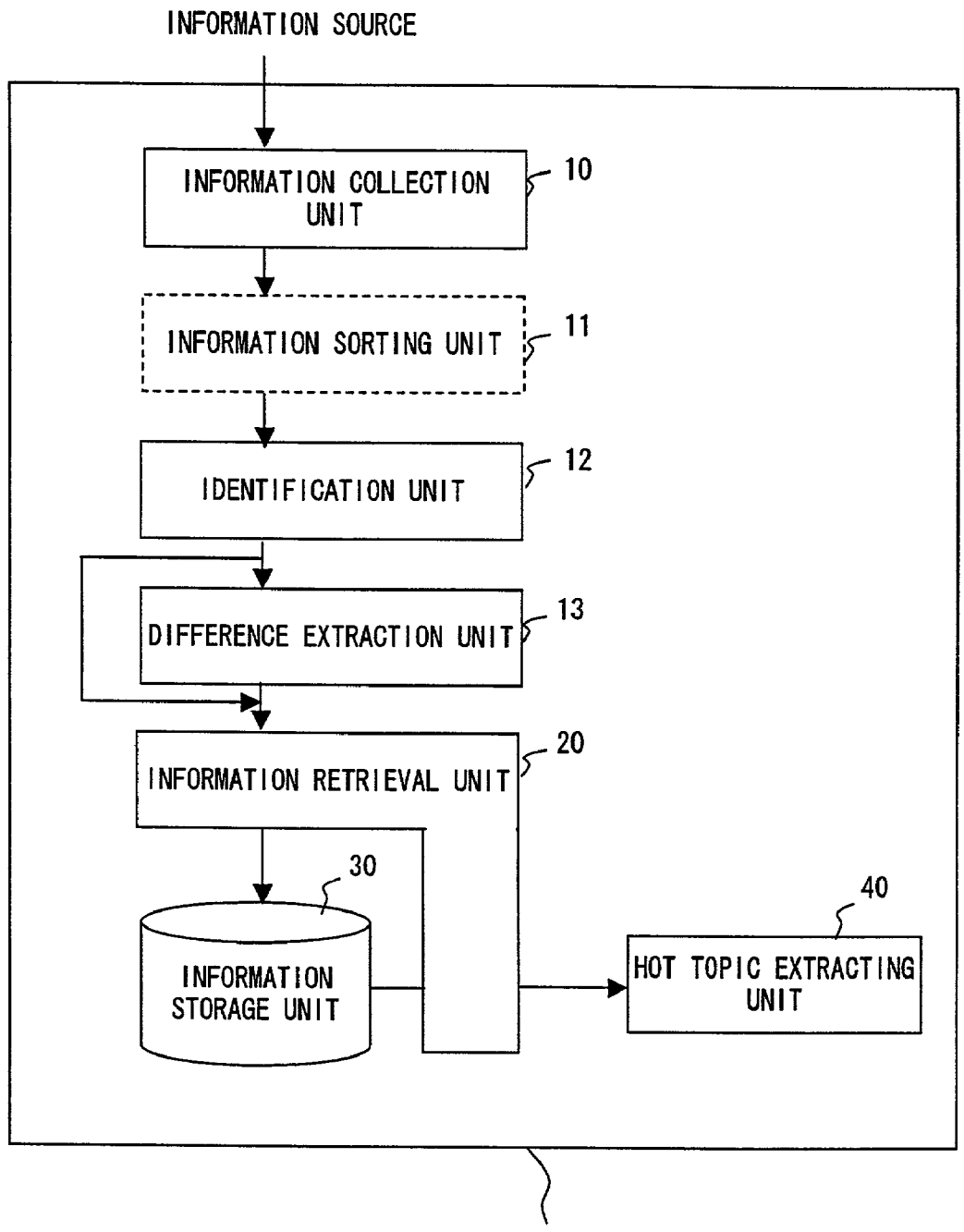
FIG. 16 shows the configuration of the hot topic extraction apparatus according to the eighth embodiment of the present invention.

Described below is a hot topic extraction apparatus 108 according to the eighth embodiment of the present invention. The hot topic extraction apparatus 108 performs a hot topic extracting process on the difference between a previously collected document and a newly collected document for the documents whose collection sources are identified. FIG. 16 shows the configuration of the hot topic extraction apparatus 108 according to the eighth embodiment. As shown in FIG. 16, the hot topic extraction apparatus 108 further comprises a difference extraction unit 13 in addition to the configuration of the hot topic extraction apparatus 107 according to the seventh embodiment.

When the identification unit 12 determines that the same location information as the location information about a collected document has already been stored in the location information table, the difference extraction unit 13 obtains a document having the same location information as the location information stored in the information storage unit 30, that is, the previously collected document, through the information retrieval unit 20, and extracts the difference between the previously collected document and the newly collected document. The difference extraction unit 13 outputs the extracted difference to the hot topic extraction unit 40, and outputs a newly collected document to the information retrieval unit 20. A command for extracting the difference can be, for example, a diff command, etc. of the UNIX operating system. Since it is not necessary to extract a difference from a document whose collection source is not identified by the identification unit 12, the document is output as is to the information retrieval unit 20.

The process performed by the hot topic extraction apparatus 108 according to the eighth embodiment is described below by referring to FIG. 17.

First, the information collection unit 10 collects documents from an information source as in step S1 shown in FIG. 3, and stores it in the information storage unit 30. Then, the identification unit 12 obtains location information from the collected document (step S51). The identification unit 12 then refers to the location information table (step S52). If the collection source of the collected document can be identified using the location information table (YES in step S53), then the identification unit 12 outputs the document to the difference extraction unit 13.

The difference extraction unit 13 obtains a document having the same location information as the output document from the information storage unit 30 through the information retrieval unit 20. The document output by the identification unit 12 is the newly collected document, and the document obtained from the information storage unit 30 of the previously collected document. The difference extraction unit 13 extracts the difference between the previously collected document and the newly collected document (step S54). The difference extraction unit 13 outputs the extracted difference to the hot topic extraction unit 40, and outputs the newly collected document to the information retrieval unit 20. The information retrieval unit 20 overwrites and stores in the information storage unit 30 the newly collected document on the previously collected document (step S56).

When the collection source of the collected document cannot be identified (NO in step S53), the identification unit 12 stores the location information of the document in the location information table (step S55), and outputs the document to the information retrieval unit 20. The information retrieval unit 20 stores the collected document in the information storage unit 30 (step S56).

The hot topic extraction unit 40 performs the process of extracting a hot topic on the difference of an identified document as in step S4 shown in FIG. 3. When a document is not identified, it performs the process of extracting a hot topic on the entire document. Then, the process terminates.

There can be the case in which documents are periodically or non-periodically collected from the same information source to extract a hot topic. In this case, all documents in the information source are not always new documents. The previously collected document can be the same as the newly collected document, or the newly collected document can be a document obtained by updating only a part of the previously collected document. In these cases, extracting a hot topic from the same document or the portion as the previously collected document may result in repeating the same process, thereby performing an inefficient process, and extracting an obsolete hot topic.

According to the present embodiment, the above mentioned problems can be solved by extracting a hot topic from a portion different between the previously collected document and the newly collected document. For example, when a document group which is to be monitored for a hot topic is given, it can be quickly checked how the hot topic in the document group in which a hot topic was previously collected has been changed when the documents are newly collected. The hot topic extraction apparatus 108 can be designed to also comprise the information sorting unit 11, and store information in the information storage unit 30 after sorting the information.

Described below is a hot topic extraction apparatus 109 according to the ninth embodiment of the present invention. The hot topic extraction apparatus 109 determines in advance the method of storing information corresponding to the information type of a collected document, and stores the collected document in the information storage unit 30 based on the determined method.

Figure 18:
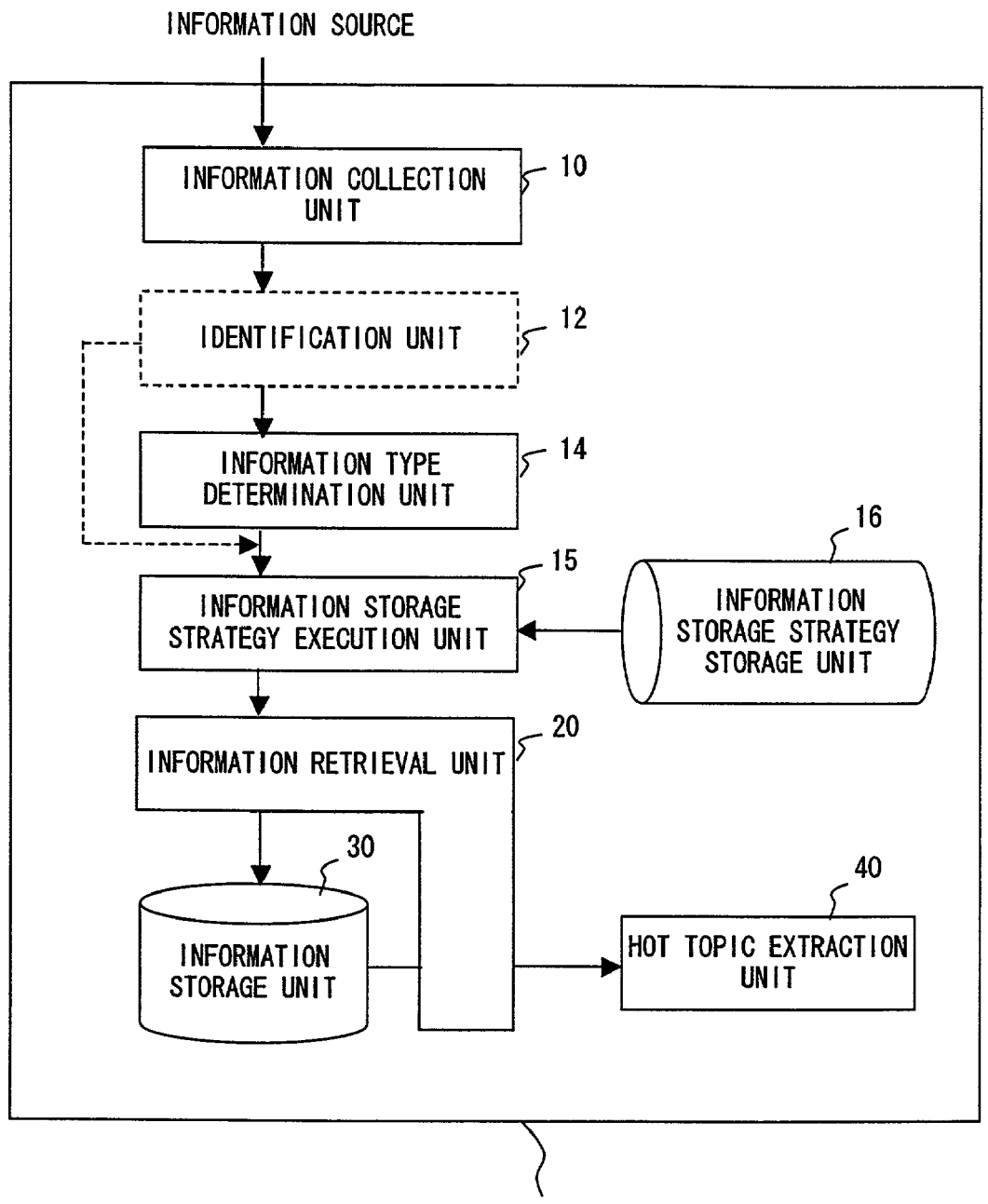
FIG. 18 shows the configuration of the hot topic extraction apparatus according to the ninth embodiment of the present invention.

FIG. 18 shows the configuration of the hot topic extraction apparatus 109 according to the ninth embodiment. As shown in FIG. 18, with the configuration of the hot topic extraction apparatus 101 according to the first embodiment, the hot topic extraction apparatus 109 according to the ninth embodiment further comprises an information type determination unit 14, an information storage strategy execution unit 15, and an information storage strategy storage unit 16 between the information collection unit 10 and the information retrieval unit 20.

The information type determination unit 14 determines the information type about a collected document, and outputs the determination result to the information storage strategy execution unit 15. The above mentioned sorting is different from the information type. In the description above, sorting is performed based on the contents of a document. However, the information type indicates the species of a document and the characteristic of the document, and is determined not by the contents of the document, but by the subject issuing or generating the document. An information type can be, for example, a document provided by an enterprise in a network, a document provided by a public organization, a document provided by a person, netnews, news in newspapers, etc. The information type determination unit 14 can be designed to, for example, determine an information type according to the location information. To be more specific, when a document is a WWW page, it can be determined whether a document is provided by an enterprise or a public organization based on the domain or server address contained in a URL. The information type determination unit 14 can also be designed to comprise a set of words (not shown in the attached drawings) storing words such as 'diary', 'recruiting information', etc., and determine an information type based on whether or not the word stored in the set of words is contained in the document as well as the location information.

The information storage strategy execution unit 15 obtains from the information storage strategy storage unit 16 the information storage strategy rules corresponding to the information type of a document determined by the information type determination unit 14, and stores the document in the information storage unit 30 according to the information storage strategy rules.

The hot topic extraction apparatus 109 shown in FIG. 18 can also be designed to comprise the identification unit 12 between the information collection unit 10 and the information type determination unit 14 as indicated by the dotted lines. Thus, since the information type of a document whose collection source is identified by the identification unit 12 has already been determined in the previous collecting process, the information type determining process can be omitted here.

The information storage strategy storage unit 16 stores the information storage strategy rules for determining whether or not information is to be stored corresponding to the information type, and in which method and format the information is to be stored. To be more specific, when a information type of the collected document is a personal diary, an information storage strategy can be 'the information is not stored'.

If the information type of the collected information is, for example, news in a newspaper, then the information storage strategy can be 'the information is stored in addition to the previously stored document. If information older than one month are stored in the information storage unit 30, the information can be deleted'. In this case, when the collected document is stored in the information storage unit 30, the information retrieval unit 20 can add to a document the date and time data indicating the collection date and time about the document.

If the information type of collected information does not refer to a personal diary or news in a newspaper, and the identification unit 12 determines that a document having the same location information is stored in the information storage unit 30, then 'overwriting and storing' can be determined as an information storage strategy.

Thus, according to the ninth embodiment of the present invention, all of the collected documents are not equally processed, but a storage strategy is prescribed such that a document is to be stored in the information storage unit 30 depending on the type of the information about a collected document, and a method, etc. for storing information can be reasonably processed, thereby efficiently extracting a hot topic.

Described below is a hot topic extraction apparatus 110 according to the tenth embodiment of the present invention. The hot topic extraction apparatus 110 according to the tenth embodiment removes from a collected document a portion from which a hot topic is not to be extracted, and stores the collected document in the information storage unit 30. FIG. 19 shows the configuration of the hot topic extraction apparatus 110 according to the tenth embodiment. As shown in FIG. 19, with the configuration of the hot topic extraction apparatus 101 according to the first embodiment, the hot topic extraction apparatus 110 according to the tenth embodiment further comprises a cleaning unit 17 between the information collection unit 10 and the information retrieval unit 20.

The cleaning unit 17 removes from the collected document a portion other than a potion from which a hot topic is to be extracted, and outputs a remaining portion to the information retrieval unit 20. The information retrieval unit 20 stores the portion from which a hot topic is to be extracted in the information storage unit 30.

Figure 20:
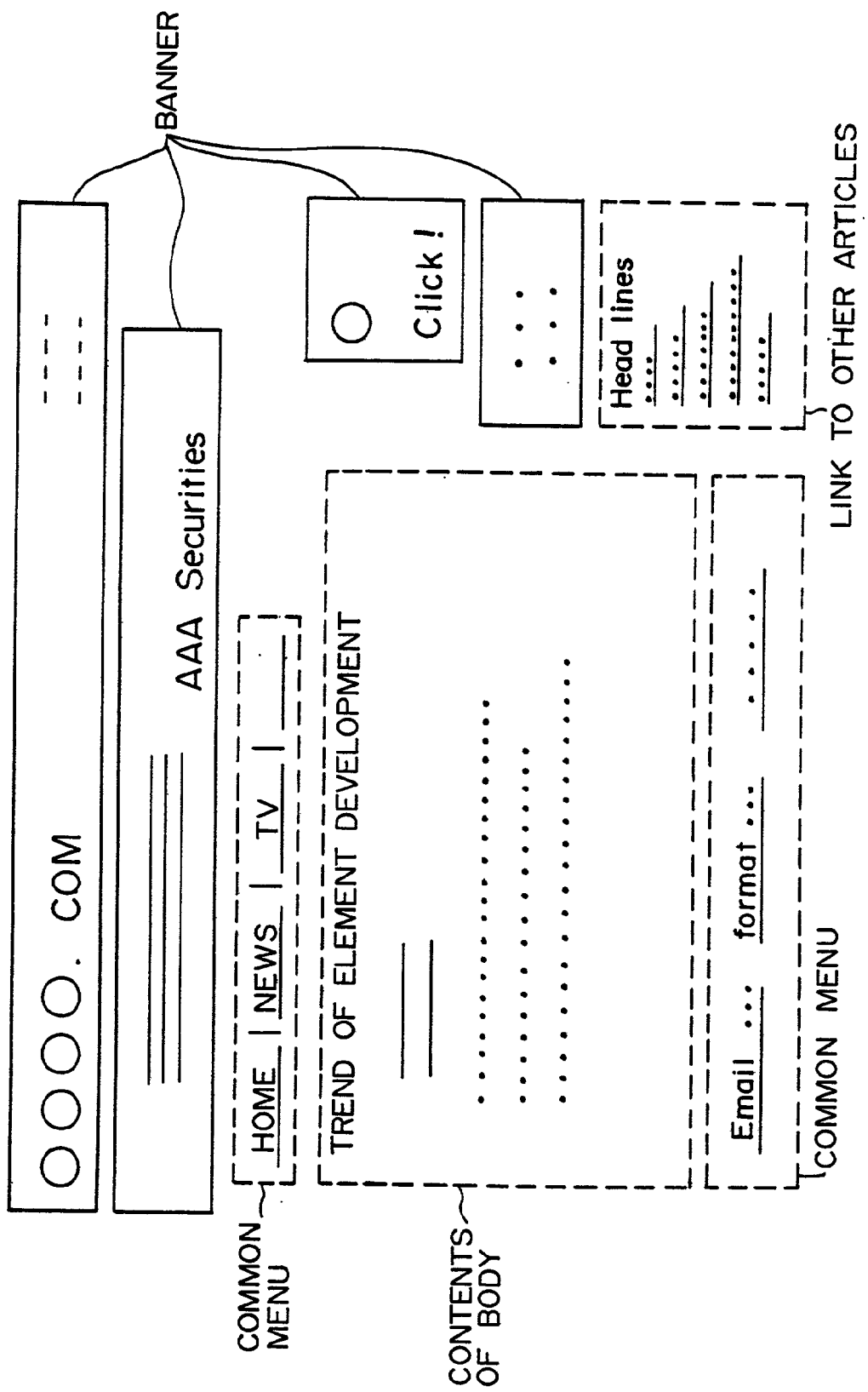
FIG. 20 shows an example of a collected document.

FIG. 20 shows an example of a document collected by the information collection unit 10. As shown in FIG. 20, a collected document often contains information other than the information from which a hot topic is to be extracted. The information from which a hot topic is to be extracted can be, for example, the contents (body) of a document. On the other hand, the information from which a hot topic is not to be extracted can be, for example, an advertisement (banner), a link commonly embedded in each document (hereinafter referred to as a common menu) regardless of the contents of a document, a link to other documents provided regardless of the contents of a document, etc.

For example, when a document is a Web page, the cleaning unit 17 determines information from which a hot topic is not to be extracted by analyzing a tag, or learning a characteristic of a portion to be removed. To be more specific, when a common menu is removed from a document having contents, the cleaning unit 17 can be designed to determine a common menu based on a character string (anchor) often used among anchor tags of a common menu, for example, 'news', 'sports', 'top', etc. Furthermore, it can be designed to regard as a common menu a portion in which a plurality of links are displayed continuously for more than a predetermined number of links in a document. Additionally, for example, an image can be often used as an anchor in a banner. Therefore, when a banner is removed from a document having contents, for example, in the case of the HTML, an image often functions as an anchor based on the representation such as <img src='http://www.xxx.com/pp-p.gif'>, etc. among anchor tags. Therefore, the cleaning unit 17 can determine whether or not a part of a document refers to a banner based on the representation.

According to the tenth embodiment, information such as a common menu, a banner, etc., from which a hot topic is not to be extracted because it is added to a document regardless of the contents of a document, is first removed from the document, and then the document is stored in the information storage unit 30. The hot topic extraction unit 40 retrieves the document from which unnecessary information has been removed from the information storage unit 30, and extracts a hot topic. Therefore, a hot topic can be extracted from the collected document with high precision.

In FIG. 19, the cleaning unit 17 is provided between the information collection unit 10 and the information retrieval unit 20. However, the cleaning unit 17 can also be designed to be provided between the information retrieval unit 20 and the hot topic extraction unit 40. In this case, the cleaning unit 17 removes unnecessary information from the document retrieved from the information storage unit 30 through the information retrieval unit 20, and outputs to the hot topic extraction unit 40 the document from which the unnecessary information has been removed.

The hot topic extraction apparatus 110 according to the tenth embodiment of the present invention can further comprise the information sorting unit 11 between the cleaning unit 17 and the information retrieval unit 20. Thus, the cleaning unit 17 can sort the document from which the unnecessary portion has been removed from the document, and store it in the information storage unit 30.

Figure 21:
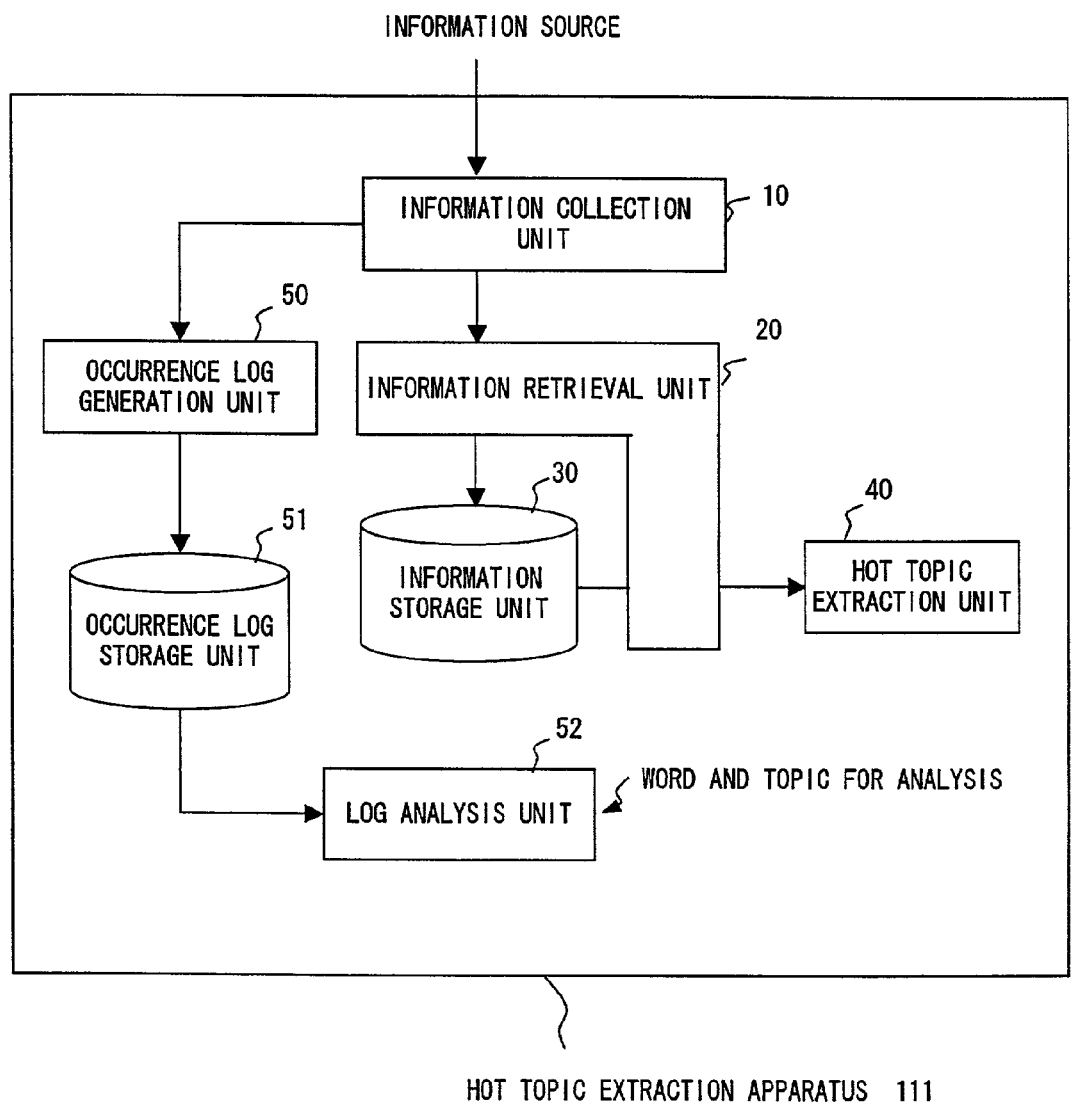
FIG. 21 shows the configuration of the hot topic extraction apparatus according to the eleventh embodiment of the present invention.

Described below is a hot topic extraction apparatus 111 according to the eleventh embodiment of the present invention. The hot topic extraction apparatus 111 according to the eleventh embodiment checks the previous analysis target word (topical word) by analyzing the log (history). FIG. 21 shows the configuration of the hot topic extraction apparatus 111 according to the eleventh embodiment. As shown in FIG. 21, with the configuration of the hot topic extraction apparatus 101 according to the first embodiment, the hot topic extraction apparatus 111 according to the eleventh embodiment further comprises an occurrence log generation unit 50, an occurrence log storage unit 51, and a log analysis unit 52.

Before storing the document collected by the information collection unit 10, the occurrence log generation unit 50 extracts from the collected document a word, a phrase, or a concept (hereinafter referred to as a predetermined word) such as the name of a person, the name of a company, etc.

given in advance. The occurrence log generation unit 50 generates an occurrence log of a document ID identifying the document from which the predetermined word has been extracted, the collection date and time of the document, and the 'predetermined word' extracted from the document. The occurrence log storage unit 51 stores the generated occurrence log.

The log analysis unit 52 analyzes the occurrence log stored in the occurrence log generation unit 50 through the input device not shown in the attached drawings for a specified and predetermined word.

Figure 22:
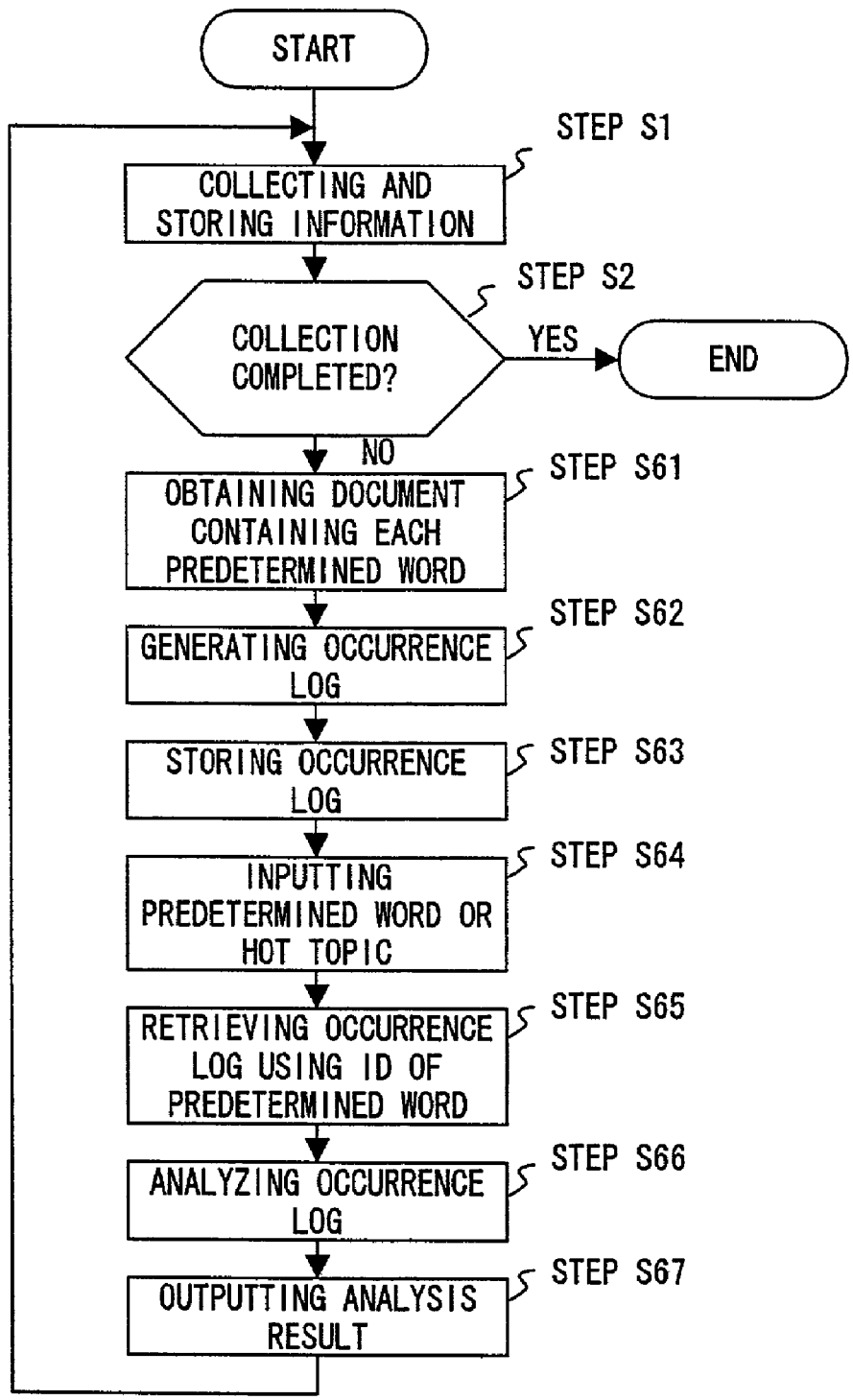
FIG. 22 is a flowchart of the process of generating and analyzing an occurrence log.

The process of generating and analyzing an occurrence log is described below by referring to FIG. 22. First, as in step S1 shown in FIG. 3, the information collection unit 10 collects a document from an information source. Then, the occurrence log generation unit 50 obtains a document containing each predetermined word from the information storage unit 30 through the information retrieval unit 20 (step S61). The occurrence log generation unit 50 generates for each document containing a predetermined word an occurrence log containing a document ID for identification of the document, the collection date and time of the document, and an ID for identification of the predetermined word extracted from the document (step S62). Using the occurrence log, the user can be informed when and where the predetermined word has appeared. The occurrence log storage unit 51 stores the generated occurrence log (step S63). The processes in steps S61 through S63 can be performed each time a document is collected.

The log analysis unit 52 has a predetermined word specified through the input device not shown in the attached drawings, or receives an extracted hot topic from the hot topic extraction unit 40 (step S64). The log analysis unit 52 searches the occurrence log storage unit 51 using the ID of the specified predetermined word or the input word as a retrieval key (step S65). The log analysis unit 52 analyzes the predetermined word using the occurrence log obtained as an analysis result (step S66). To be more specific, the log analysis unit 52 counts the word frequency and the document frequency of the predetermined word, and generates statistic data indicating the relationship between the collection period and the frequencies based on the count result and the collection date and time of each document. Finally, the log analysis unit 52 outputs the analysis result to the user or other devices (step S67), thereby terminating the process.

Figure 23:
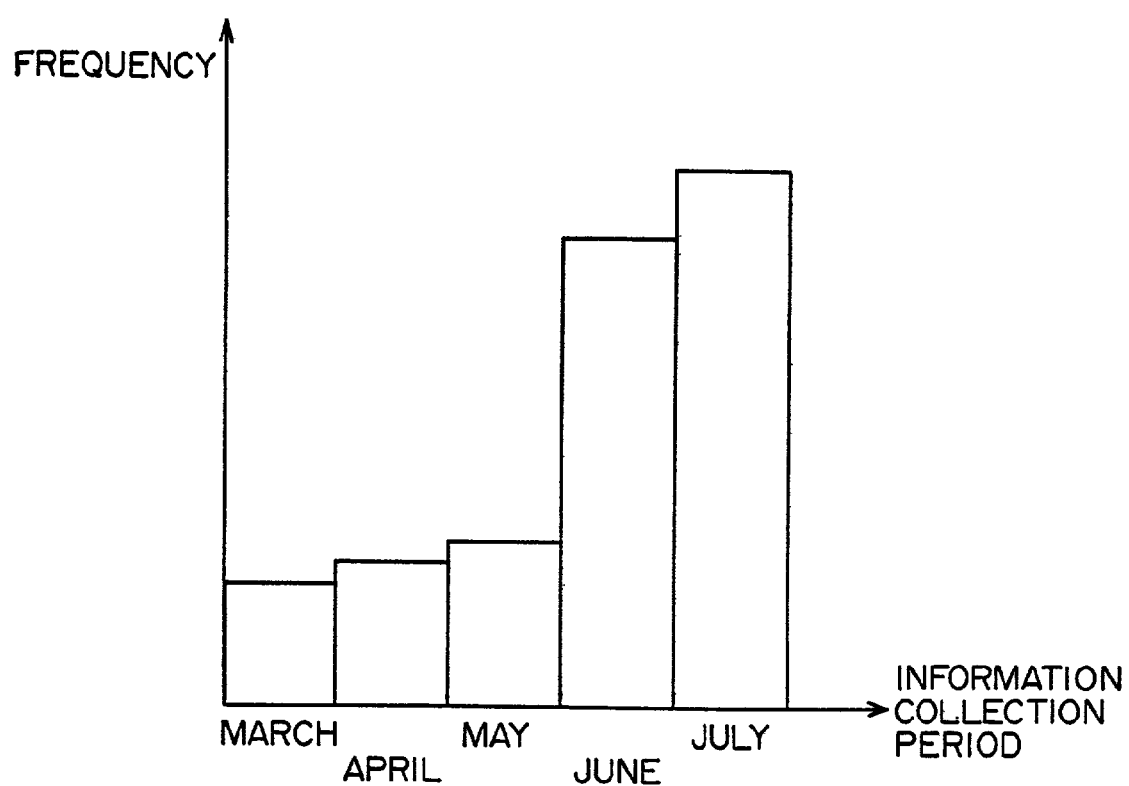
FIG. 23 shows an example of an analysis result of an occurrence log.

FIG. 23 shows an example of a screen for outputting an analysis result by the log analysis unit 52. FIG. 23 is a bar graph showing the relationship between the information collection period and the frequency of a word. In the graph, the horizontal axis indicates the information collection period while the vertical axis indicates a change in frequency of a word. In FIG. 23, the frequency of the word is not so high in March through May, but the frequency becomes very high in June. Thus, according to the eleventh embodiment, the past data of a word can be analyzed.

Described below is the a hot topic extraction apparatus 112 according to the twelfth embodiment of the present invention. The hot topic extraction apparatus 112 according to the twelfth embodiment notifies the user who input the condition or other devices of the hot topic satisfying the given condition among the extracted hot topics. FIG. 24 shows the configuration of the hot topic extraction apparatus 112 according to the twelfth embodiment. As shown in FIG. 24, the hot topic extraction apparatus 112 according to the twelfth embodiment further comprises in addition to the configuration of the hot topic extraction apparatus 101 according to the first embodiment a schedule management unit 53, a condition matching determination unit 54, a hot topic condition storage unit 55, a hot topic notification unit 56, a hot topic condition setting unit 57, and a timer 58.

The schedule management unit 53 activates the hot topic extraction unit 40 at predetermined timing using the timer 58. For example, the schedule management unit 53 can be designed to activate the hot topic extraction unit 40 at 9:00 a.m. on every Monday. The hot topic extraction unit 40 outputs the result of extracting a hot topic to the condition matching determination unit 54.

The hot topic condition storage unit 55 stores a hot topic condition. A hot topic condition refers to a condition of a hot topic set based on the input by the user of other devices, and given to the user who input the condition or other devices. A hot topic condition can be, for example, a word (word, phrase, concept, etc.), a category to which a hot topic belongs, etc.

The condition matching determination unit 54 determines whether or not the hot topic extracted by the hot topic extraction unit 40 satisfies the hot topic condition based on the hot topic condition stored in the hot topic condition storage unit 55, and outputs the determination result to the hot topic notification unit 56. The hot topic notification unit 56 notifies the user who input the hot topic condition or other devices of the hot topic determined as matching the hot topic condition.

The hot topic condition setting unit 57 sets the hot topic condition for each user or each of the other devices based on the input from the user or the other devices, and stores the set hot topic condition in the hot topic condition storage unit 55. The hot topic condition is stored in the hot topic condition storage unit 55 before extracting a hot topic, and updated at any time.

Figure 25:
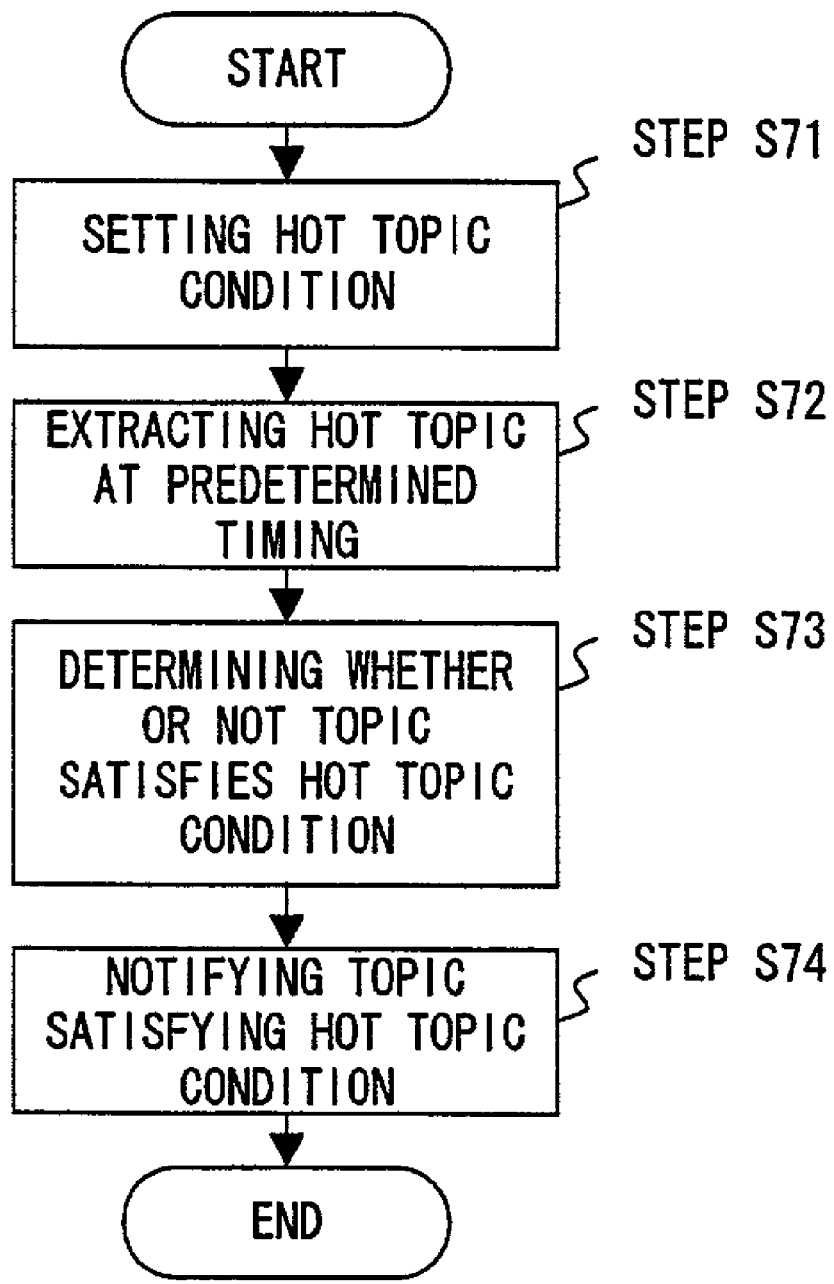
FIG. 25 is a flowchart of the hot topic extraction process performed by the hot topic extraction apparatus according to the twelfth embodiment of the present invention.

The process performed by the hot topic extraction apparatus 112 according to the twelfth embodiment is described below by referring to FIG. 25. Each process of collecting and retrieving information, and extracting a hot topic is substantially the same as in the first embodiment. Therefore, the detailed explanation is omitted here, and the following explanation centers on the process with the unique configuration according to the twelfth embodiment.

First, before extracting a hot topic, the user or other devices input a field about which a result of extracting a hot topic is to be output, or a analysis target word to be analyzed (not shown in the attached drawings). The hot topic condition can be a field to which the hot topics of sports, optics, communications, entertainment, etc. The hot topic condition can also be a analysis target word such as the name of a person, a stage name, the title of a work, the name of a company, etc. The hot topic condition setting unit 57 sets a hot topic condition for each user or each of other devices (step S71).

The schedule management unit 53 activates the hot topic extraction unit 40 at predetermined timing according to the information about the date and time output by the timer 58. The hot topic extraction unit 40 performs the above mentioned hot topic extracting process, and output the process result to the condition matching determination unit 54 (step S72). The condition matching determination unit 54 determines whether or not each of the extracted hot topics matches each hot topic condition input by each user or each of the other devices, and output the determination result to the hot topic notification unit 56 (step S73).

For example, it is assumed that the name of a person in the show business, JAVA (a programming language developed by Sun Microsystems), and a stock price are extracted as hot topics. On the other hand, it is assumed that 'entertainment', 'computer news', and the name of a home electric appliance are given as hot topic conditions by a user. In this case, as a determination result, the condition matching determination unit 54 selects from among the extracted hot topics the name of the person in the show business and JAVA as the hot topics satisfying the hot topic condition of the user. Then, the hot topic notification unit 56 notifies each user or the other devices of the hot topics satisfying the input hot topic condition based on the determination result (step S74).

Figure 26:
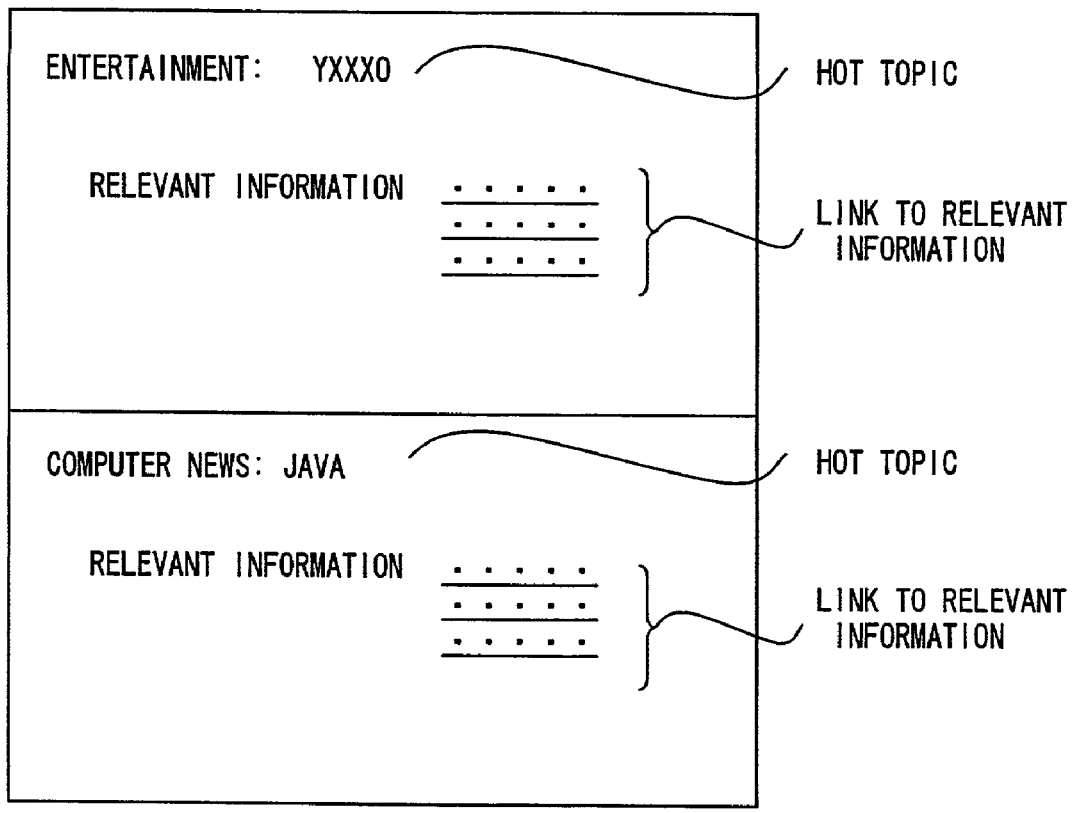
FIG. 26 shows an example of the screen displaying a hot topic matching the hot topic condition.

FIG. 26 shows an example of a screen on which a hot topic satisfying a hot topic condition is output. In FIG. 26, it is assumed that a user has input as hot topic conditions the categories of hot topics 'entertainment' and 'computer news'. As shown in FIG. 26, the name of a person in the show business 'YxxxO', and the link to the information relevant to the hot topic are displayed as a hot topic belonging to the category 'entertainment'. Similarly, 'JAVA' and the link to the information relevant to the hot topic are displayed as a hot topic belonging to the category 'computer news'. The relevant information can be, for example, a document from which the hot topic has been extracted.

When an analysis target word is set as a hot topic condition, the condition matching determination unit 54 selects an analysis result relating to the analysis target word as a hot topic satisfying the hot topic condition from among the frequency and the weight analyzed by the hot topic extraction unit 40. The hot topic notification unit 56 notifies the user who has input the hot topic condition, etc., of the analysis result of the analysis target word, that is, the word frequency, the document frequency, the increase/decrease rate of the frequency, the weight, etc. of the analysis target word. Thus, each user or other devices can obtain a hot topic extraction result about a requested category and analysis target word at predetermined timing, for example, at a predetermined time every day.

Described below is a variation of the twelfth embodiment of the present invention. According to a variation of the twelfth embodiment, the hot topic extraction apparatus 112 further comprises, in addition to each unit indicated by the solid lines shown in FIG. 25, an information collection strategy change unit 59 and an information collection strategy storage unit 60 as indicated by broken lines. The information collection strategy storage unit 60 stores information collection strategy rules prescribing the method of the information collection unit 10 collecting information.

The information collection strategy rules regulate the depth level of search on each site when tracing a link from a document contained in a collected document or a community (site or site group) as a method of collecting information. In the information collection strategy rules, if the depth of search of a community is limited to l level, then the information collection unit 10 searches the link destination in the site up to the level. To be more specific, the information collection unit 10 does not search the link destination document if the current depth of search is the 1 level when the link destination document is in the same site as the link source document. If the current depth of search is lower than the 1 level, the link destination document is searched, and the current depth of search is incremented by 1, thereby continuing the collection.

The information collection strategy change unit 59 changes the information collection strategy rules based on the determination result by the condition matching determination unit 54. Thus, a hot topic matching result can be fed back to the process of the information collection unit 10 collecting a document. For example, the information collection strategy change unit 59 changes the depth of search from the level l to the level m (m>l) for the community to which a number of documents including hot topics satisfying a hot topic condition belong, and collects documents with the depth of search set larger, or changes the depth of search from the level l to the level n (l>n) for the community to which no documents containing the hot topics satisfying the hot topic condition belong, thereby changing the information collection strategy rules such that documents can be collected with the depth of search set smaller.

Furthermore, for example, the values of the depth of search can be set to l, m, and n in advance in the information collection strategy rules, and the information collection unit 10 can store in advance the flags corresponding the values l, m, and n. In this case, the information collection strategy change unit 59 sets the flags based on the determination result by the condition matching determination unit 54. The information collection unit 10 collects document up to the depth of search corresponding to the set flag. The levels are not limited to the three values of l, m, and n, but can be two, four, or more values.

Figure 27:
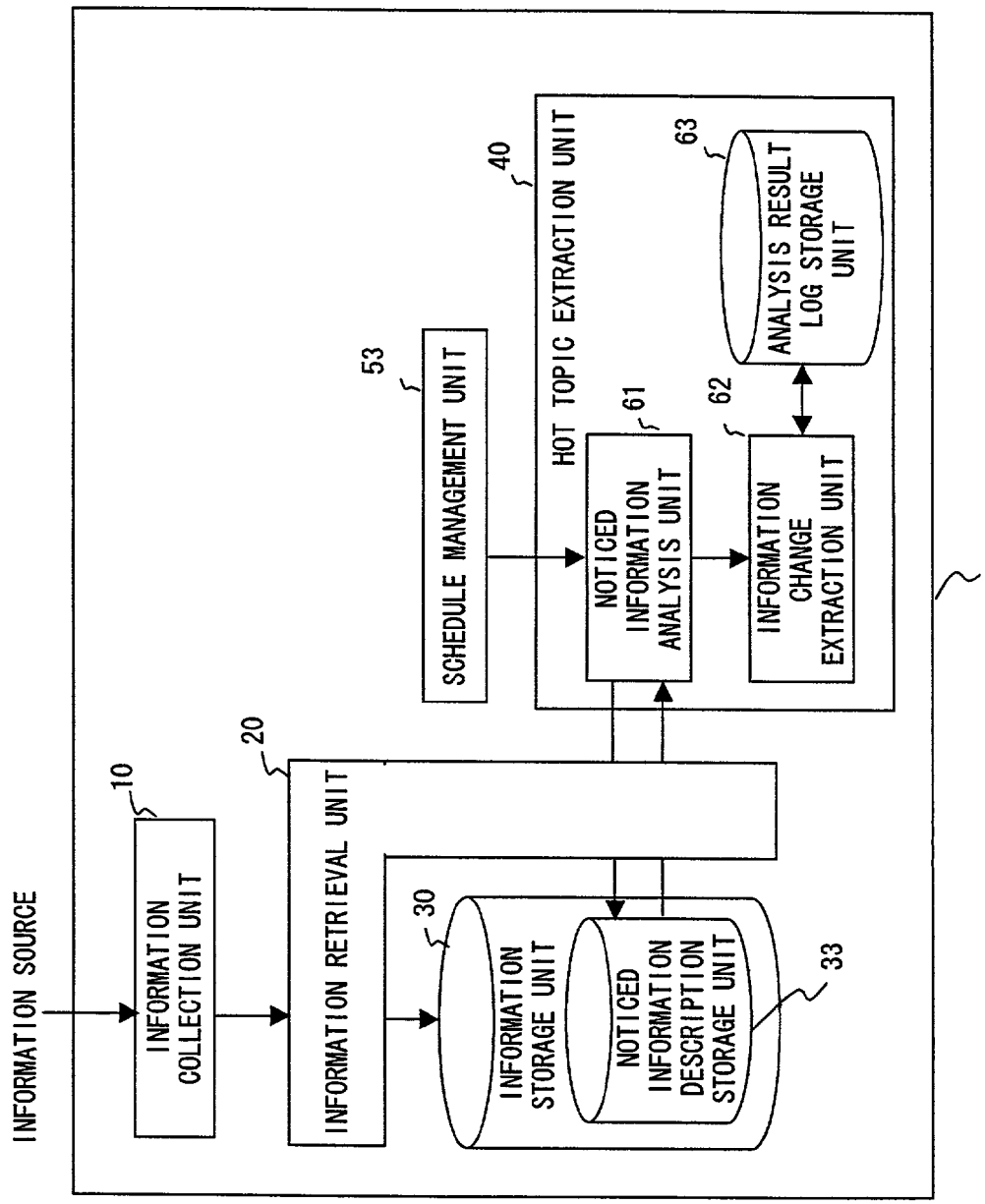
FIG. 27 shows the configuration of the hot topic extraction apparatus according to the thirteenth embodiment of the present invention.

Described below is a hot topic extraction apparatus 113 according to the thirteenth embodiment of the present invention. The hot topic extraction apparatus 113 according to the thirteenth embodiment is assigned in advance a document which is to be noticed, and analyzes the document. FIG. 27 shows the configuration of the hot topic extraction apparatus 113 according to the thirteenth embodiment. As shown in FIG. 27, the hot topic extraction apparatus 113 according to the thirteenth embodiment further comprises, in addition to the configuration of the hot topic extraction apparatus 101, the schedule management unit 53, a noticed information description storage unit 33, a noticed information analysis unit 61, an information change extraction unit 62, and an analysis result log storage unit 63. The schedule management unit 53 has been described by referring to the twelfth embodiment. In the thirteenth embodiment, the noticed information analysis unit 61 and the information change extraction unit 62 correspond to the hot topic extraction unit 40.

The noticed information description storage unit 33 stores the noticed information description describing the condition of the noticed information, that is, the document from which a hot topic is to be extracted. The noticed information description can be the location information about the noticed information, a server name (site name), a domain name, a information type, etc. or the logical combination of them. In FIG. 27, the noticed information description storage unit 33 is provided in the information storage unit 30, but can also be provided outside the information storage unit 30. The noticed information description storage unit 33 can contain a tag.

The noticed information analysis unit 61 is activated at predetermined timing, for example, every time by the schedule management unit 53. The noticed information analysis unit 61 retrieves noticed information from the information storage unit 30 through the information retrieval unit 20, analyzes the hot topic of the noticed information in the same way as the topical word analysis unit 42, and outputs the analysis result to the information change extraction unit 62.

The information change extraction unit 62 stores the input analysis result in the analysis result log storage unit 63. In addition, the information change extraction unit 62 extracts a change from the current analysis result to the past analysis result by referring to the past analysis result stored in the analysis result log storage unit 63. The analysis result log storage unit 63 accumulates the past analysis results. The past analysis results include an analysis date and time, the word frequency, the document frequency, etc. of an analysis target word.

Figure 28:
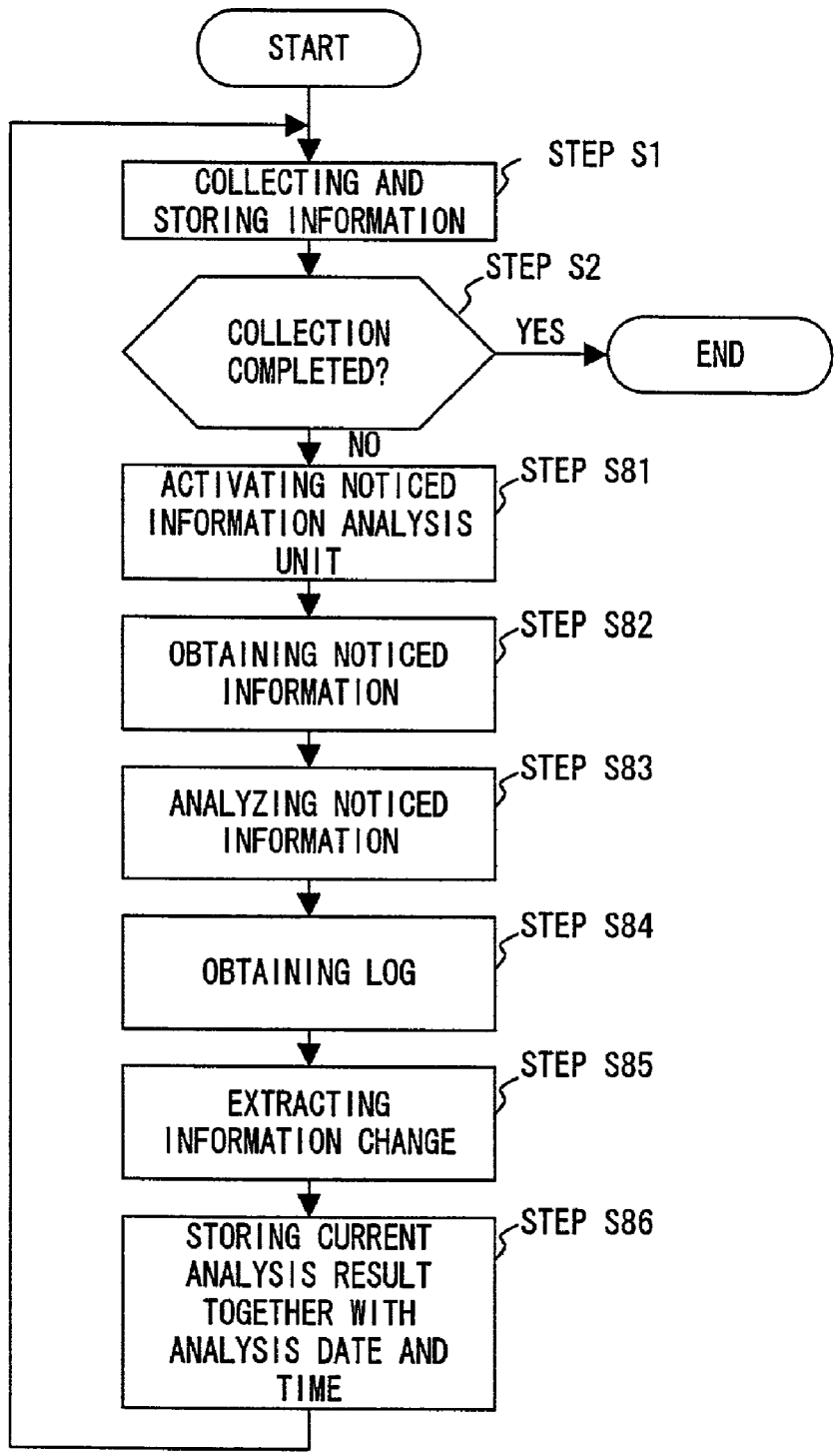
FIG. 28 is a flowchart of the hot topic extraction process performed by the hot topic extraction apparatus according to the thirteenth embodiment of the present invention.

The process performed by the hot topic extraction apparatus 113 according to the thirteenth embodiment is described below by referring to FIG. 28. First, noticed information description is stored in advance in the noticed information analysis unit 61 (not shown in the attached drawings). Then, as in steps S1 and S2 shown in FIG. 3, a document is collected from an information source, and stores it in the information storage unit 30. Then, at predetermined timing, the schedule management unit 53 activates the noticed information analysis unit 61 (step S81) The noticed information analysis unit 61 obtains noticed information from the noticed information description storage unit 33 through the information retrieval unit 20 (step S82). For example, when a domain name is described in the noticed information description, the document having the domain name is obtained as noticed information.

The noticed information analysis unit 61 counts the word frequency and the document frequency of a word by analyzing the obtained noticed information, and output the count result to the information change extraction unit 62 (step S83). Since this process is the same as the process performed by the topical word analysis unit 42, the detailed explanation is omitted here. The information change extraction unit 62 obtains the previous or past analysis results based on the analysis date and time from the analysis result log storage unit 63 (step S84).

The information change extraction unit 62 extracts a change in information based on the obtained previous or past analysis results and the current analysis result (step S85). For example, the information change extraction unit 62 computes the transition of the word frequency and the document frequency for an analysis date and time, an the transition of change rates of the frequencies for each word extracted from the noticed information. Then, the information change extraction unit 62 stores the current analysis result together with the analysis date and time in the analysis result log storage unit 63 (step S86).

Thus, the noticed information is retrieved from an optionally collected document group, and the analysis result of the noticed information is compared with the analysis result of the past.

Figure 29:
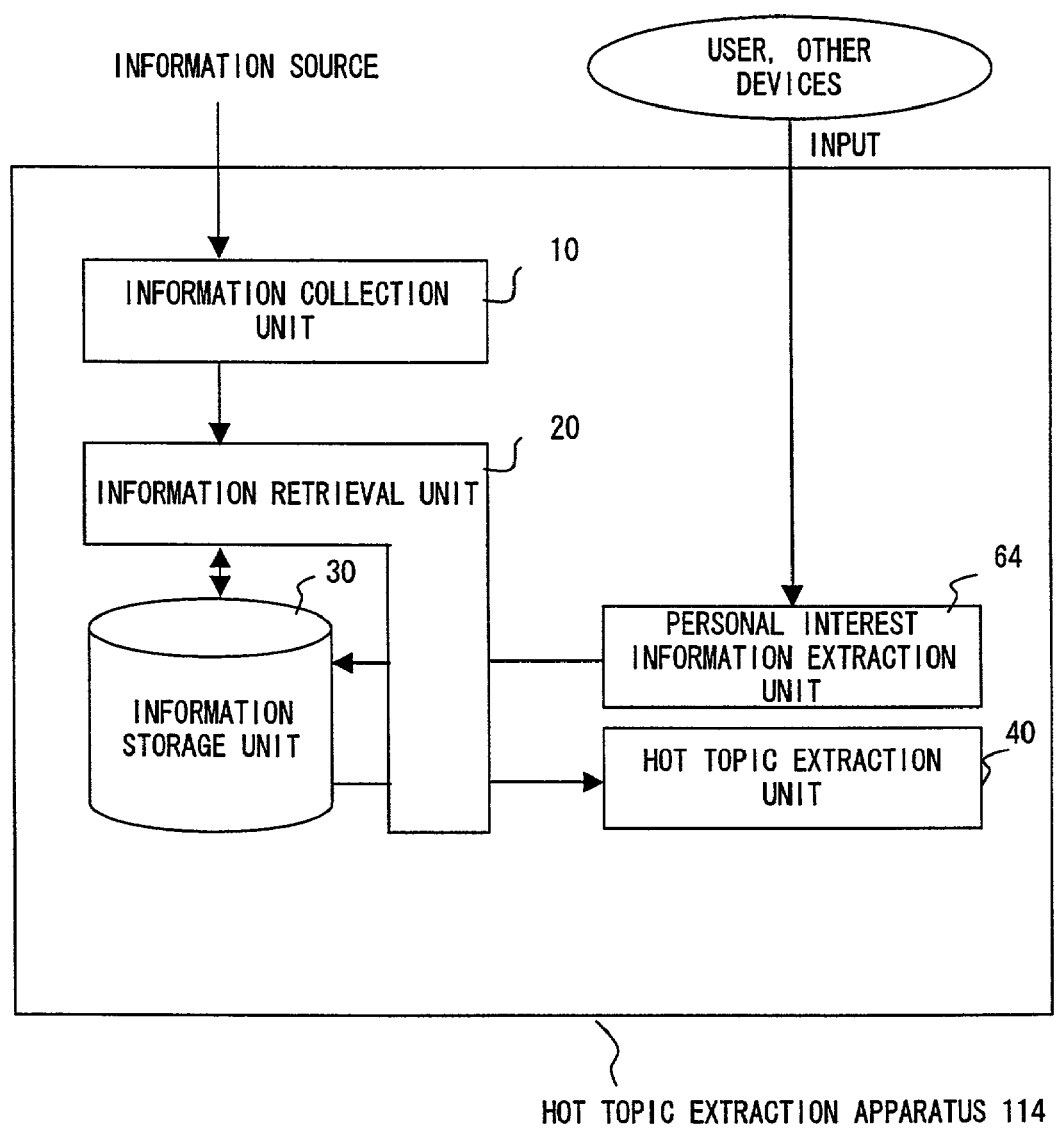
FIG. 29 shows the configuration of the hot topic extraction apparatus according to the fourteenth embodiment of the present invention.

Described below is a hot topic extraction apparatus 114 according to the fourteenth embodiment of the present invention. The hot topic extraction apparatus 114 according to the fourteenth embodiment extracts a hot topic from a document in which a person or a group is interested according to the information input by a user or other devices. FIG. 29 shows the configuration of the hot topic extraction apparatus 114 according to the fourteenth embodiment. As shown in FIG. 29, the hot topic extraction apparatus 114 according to the fourteenth embodiment further comprises a personal interest information extraction unit 64 in addition to the configuration of the hot topic extraction apparatus 101 according to the first embodiment.

The personal interest information extraction unit 64 extracts interesting document specific information for specifying a document considered to interest a person, a group, etc. from the information input by a user or other devices. For example, the personal interest information extraction unit 64 analyzes the history of a browser of a device, and extracts the location information about a document read by the user of the device as the interesting document specific information. In addition, for example, in a server/client system, the personal interest information extraction unit 64 analyzes an access log, and extracts the location information about the document accessed by a client through the server as interesting document specific information. Additionally, in the case of a network site, the information change extraction unit 62 analyzes the access log of the site, and extracts the location information about the document accessed through the server having a domain name as interesting document specific information.

The information retrieval unit 20 retrieves a document from the information storage unit 30 according to the extracted interesting document specific information, and the hot topic extraction unit 40 extracts a hot topic from a document obtained as a retrieval result. A document accessed by a person or a group is considered to be the information interesting the person or the group. Therefore, when the person or the group extracts a hot topic from the accessed document, the hot topic extraction apparatus 114 can extract a hot topic interesting the person or the group.

Figure 30:
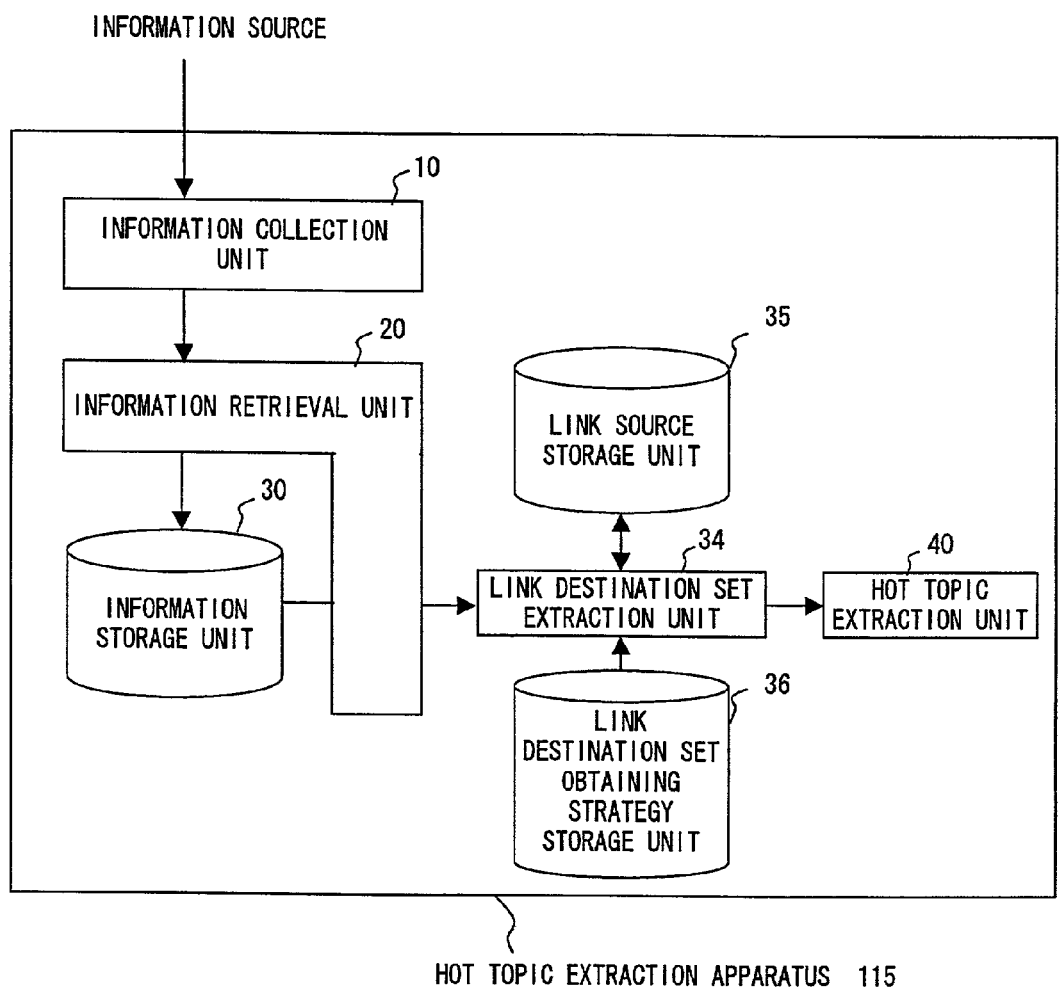
FIG. 30 shows the configuration of the hot topic extraction apparatus according to the fifteenth embodiment of the present invention.

Described below is a hot topic extraction apparatus 115 according to the fifteenth embodiment of the present invention. The hot topic extraction apparatus 115 according to the fifteenth embodiment extracts a hot topic from a link destination document of a document. FIG. 30 shows the configuration of the hot topic extraction apparatus 115 according to the fifteenth embodiment. As shown in FIG. 30, the hot topic extraction apparatus 115 according to the fifteenth embodiment further comprises, in addition to the configuration of the hot topic extraction apparatus 101 according to the first embodiment, a link destination set extraction unit 34, a link source storage unit 35, and a link destination set obtaining strategy storage unit 36.

The link destination set extraction unit 34 retrieves a document from the information storage unit 30 through the information retrieval unit 20 according to the link source specific information stored in the link source storage unit 35. Then, based on the link destination set obtaining strategy rules stored in the link destination set obtaining strategy storage unit 36, it extracts the link destination set which is a set of link destination documents from the obtained document, and outputs it to the hot topic extraction unit 40. The hot topic extraction unit 40 extracts a hot topic from the link destination set.

The link source storage unit 35 stores the link source specific information. The link source specific information is, for example, the information specifying a set or the site of location information about a link source document. The site specific information can be a domain name, a server name, etc. described as, for example, '.xxx.com'. Additionally, for example, when a document stored in the information storage unit 30 is sorted by category, a set of location information about documents belonging to a category such as 'government offices', etc. can be stored as link source specific information. The link destination set obtaining strategy storage unit 36** stores the link destination set obtaining strategy rules corresponding to the link source specific information. The link destination set obtaining strategy rules indicate to what extent the link destination document is to be extracted from the link source document, for example, the level of the depth of search.

Figure 31:
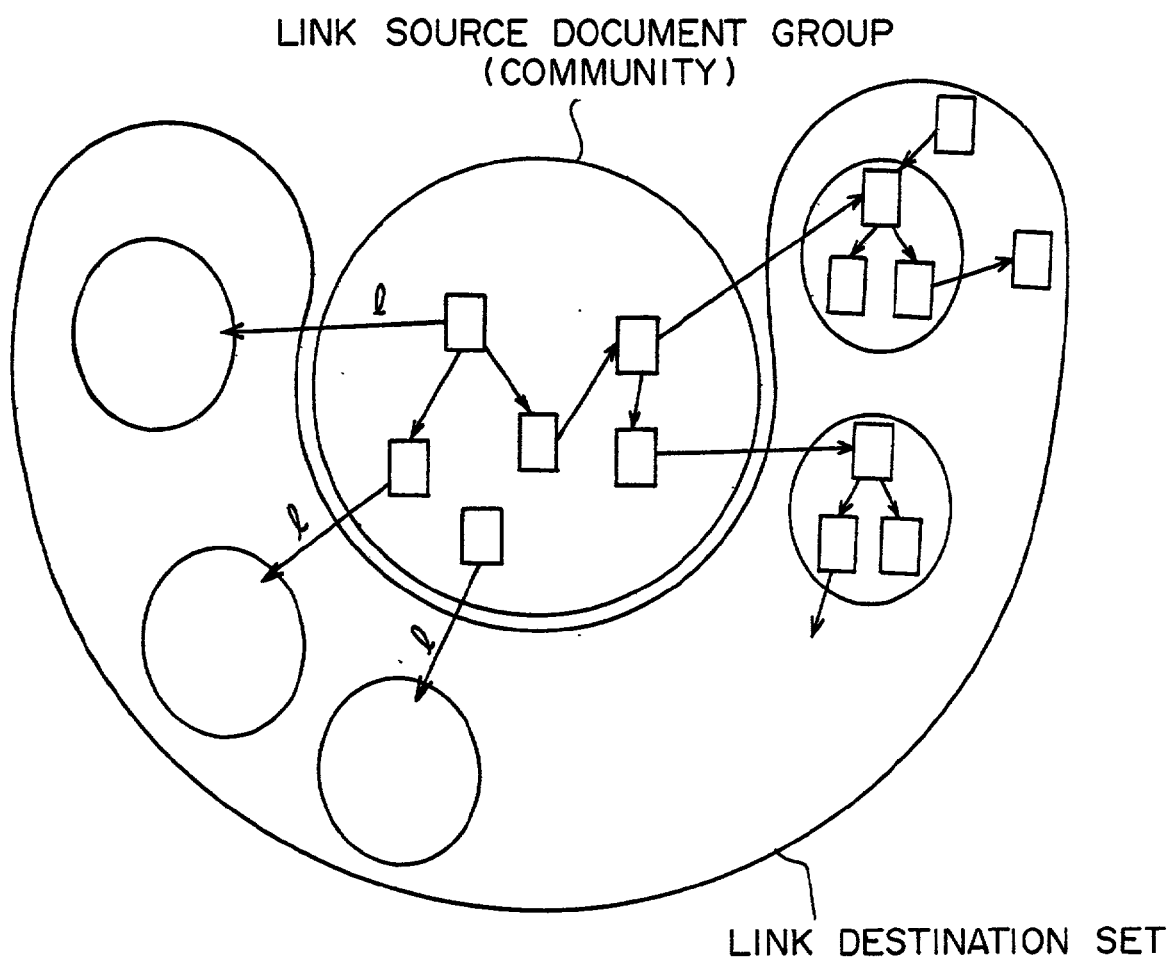
FIG. 31 shows the relationship between a link source document and a link destination document.

The relationship between a link source document and a link destination document is described below by referring to FIG. 31. In FIG. 31, a document contained in the community (site) in a network forms part of a group of link source documents. A link is embedded from the group of link source documents to other documents inside or outside the community. The link destination set extraction unit 34 extracts a link destination set outside the community by tracing the link to a document outside the community until the level of the depth of search indicated by the link destination set obtaining strategy rules is reached. Thus, in FIG. 31, a link destination set in an area encompassing the community can be obtained.

A link destination document is a document which a link source document takes interest in or has relation to. Therefore, by extracting a hot topic from the thus obtained link destination set, a hot topic interesting or relating to the community, etc. can be extracted. As a result, the hot topic extraction apparatus 115 can extract a hot topic useful to the community, etc. which is a link source.

An extracted hot topic can be ranked based on its weight (topical level) by combining the fifteenth embodiment with the fifth embodiment.

Figure 32:
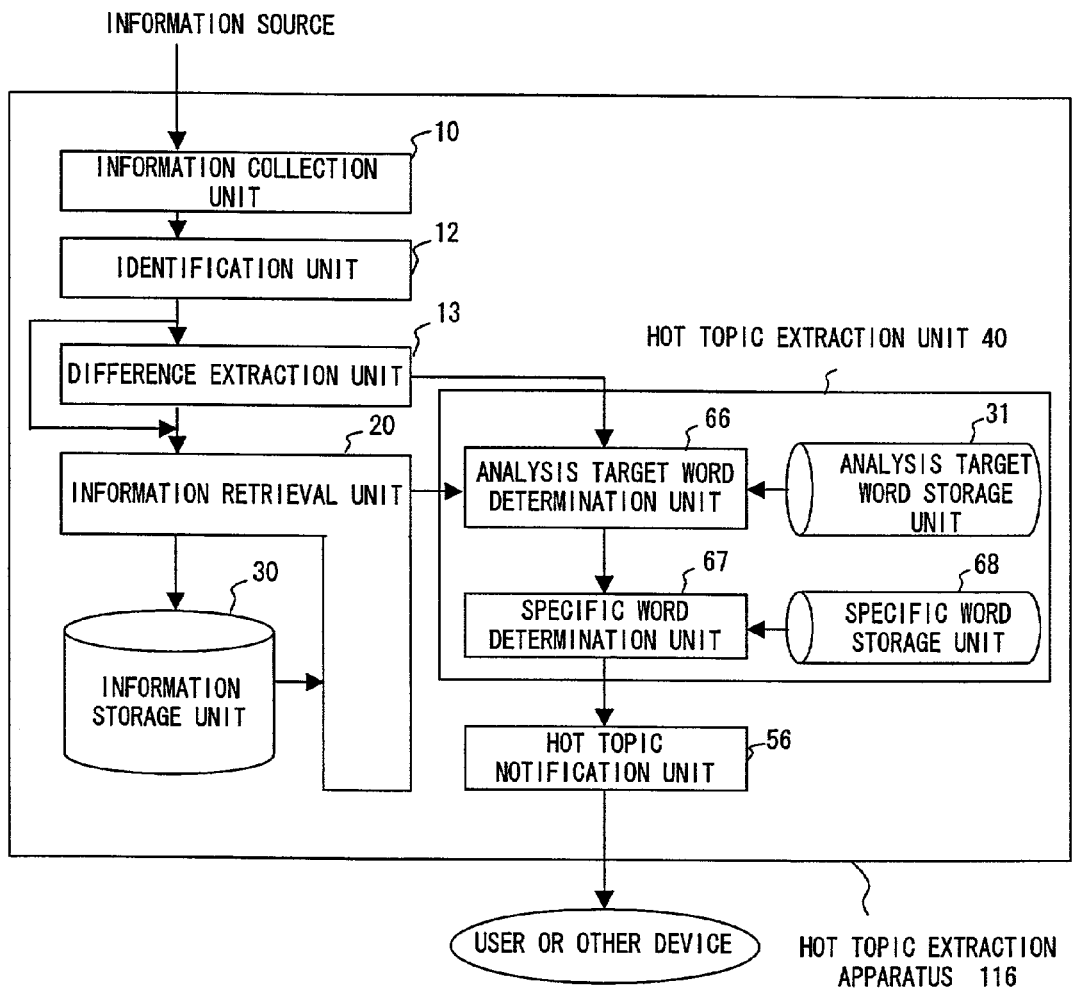
FIG. 32 shows the configuration of the hot topic extraction apparatus according to the sixteenth embodiment of the present invention.

Described below is a hot topic extraction apparatus 116 according to the sixteenth embodiment of the present invention. The hot topic extraction apparatus 116 extracts a document containing a word of a specific type from a document containing an analysis target word. FIG. 32 shows the configuration of the hot topic extraction apparatus 116 according to the sixteenth embodiment. As shown in FIG. 32, the hot topic extraction apparatus 116 further comprises, in addition to the configuration of the hot topic extraction apparatus 108 according to the eighth embodiment, the analysis target word storage unit 31, an analysis target word determination unit 66, a specific word determination unit 67, a specific word storage unit 68, and the hot topic notification unit 56 instead of the hot topic extraction unit 40. The analysis target word storage unit 31 and the hot topic notification unit 56 have already been described above.

The analysis target word determination unit 66 retrieves a document containing an analysis target word stored in the analysis target word storage unit 31 from the information storage unit 30 through the information retrieval unit 20. Otherwise, it retrieves a difference containing the analysis target word from among the differences output by the difference extraction unit 13. Then, the analysis target word determination unit 66 outputs the retrieved document or difference to the specific word determination unit 67. The specific word determination unit 67 extracts a document or a difference containing a specific word stored in the specific word storage unit 68 from the document or the difference input by the analysis target word determination unit 66, and outputs the result to the hot topic notification unit 56.

The specific word storage unit 68 stores a set or a sort code of a specific word contained in a specific category. A specific word can be, for example, an abusive and slanderous word, a applausive word, etc. The hot topic notification unit 56 notifies a user or other devices of the document or the difference input by the specific word determination unit 67. Thus, a document containing a specific word about the analysis target word such as the name of a person, or an organization, etc. is retrieved from the information storage unit 30, and the document can be notified to the user or the other devices. For example, the hot topic extraction apparatus 116 can also be used to determine the information about a person or a group such as abuse, slander, etc. before it is spread widely among people.

Described below is a hot topic extraction apparatus 117 according to the seventeenth embodiment of the present invention. The hot topic extraction apparatus 117 of the seventeenth embodiment extracts a change in link relation of a document as a hot topic instead of a word, a phrase, etc. FIG. 33 shows the configuration of the hot topic extraction apparatus 117 according to the seventeenth embodiment. As shown in FIG. 33, the hot topic extraction apparatus 117 further comprise, in addition to the configuration of the hot topic extraction apparatus 101 according to the first embodiment, the link destination set extraction unit 34 and a link relation analysis unit 69 in the hot topic extraction unit 40. The link destination set extraction unit 34 has already been described above. A link relation analysis unit 69 analyzes the transition with time of a link relation. To be more specific, the transition with time of a link relation between a document in each site and other documents is analyzed. Otherwise, when the hot topic extraction apparatus 117 comprises the information type determination unit 14 between the link destination set extraction unit 34 and the link relation analysis unit 69, the link relation analysis unit 69 can also analyze the change with time of the link relation between a document of each information type and a specific document.

Figure 34A:
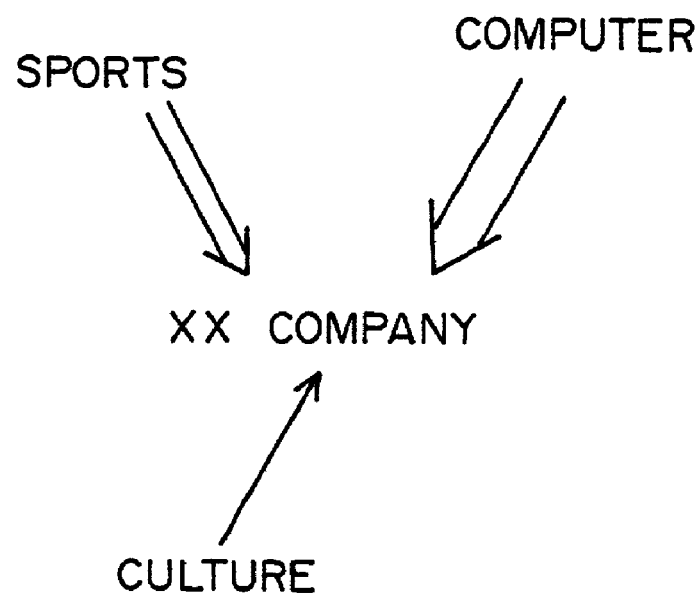
FIG. 34A shows a result of counting documents according to their category, the documents link to documents in a site of xx company at one point of time.
Figure 34B:
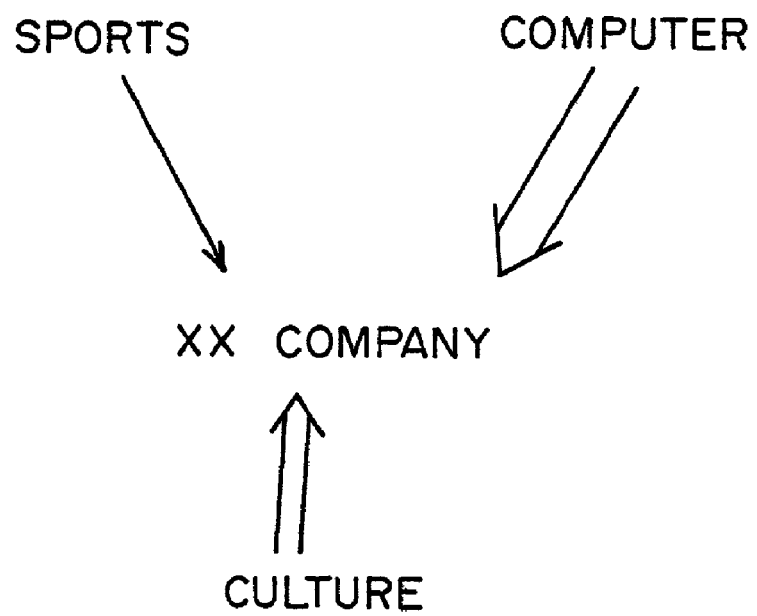
FIG. 34B shows a result of counting documents linking to documents in a site of xx company according to their category, after a period elapses from the point when the result shown in FIG. 34A was obtained.

For example, assume that the link relation analysis unit 69 has analyzed a change with time of the number of links when the number of documents linking to a document (number of link source documents) in the site of XX Company is counted by category, and that the result shown in link destination set extraction unit 34 has been obtained. FIG. 34A shows the analysis result of the document in the site of XX Company at a time point. FIG. 34B shows the analysis result after the passage of a period from a time point when the result of the process shown in FIG. 34A is obtained. In FIG. 34, the end of the arrow indicates a link source, the point of the arrow indicates a link destination, and the thickness of the arrow indicates the number of links.

As shown in FIG. 34A, the document in the site of XX Company is linked from the largest number of documents belonging to the 'computer' by category, and from the second largest number of documents belonging to the 'sports'. On the other hand, it is linked from the small number of documents belonging to the 'culture'. As shown in FIG. 34B, as compared with FIG. 34A, the documents in the site of XX Company indicate a small change in the number of links from the documents belonging to the 'computer', but the number of links from the documents belonging to the 'sports' has decrease, and the number of links from the documents belonging to the 'culture' has increased. Therefore, there are the largest number of documents belonging to the 'computer' in the site of XX Company, and the number of documents relating to the 'culture' is increasing while the number of documents relating to the 'sports' is decreasing. Thus, it can be predicted that XX Company currently notices the 'culture' rather than the 'sports'. As described above, by analyzing a change with time of the relationship between a document (in this example, the document in the site of XX Company) and a link source document of the document, the information about the change in interest the collection source (in this example, XX Company) of the document can be obtained as a hot topic.

Described below is a hot topic extraction apparatus 118 according to the eighteenth embodiment of the present invention. The hot topic extraction apparatus 118 according to the eighteenth embodiment extracts a hot topic from the vicinity of the portion into which a link is embedded. The hot topic extraction apparatus 118 further comprises, in addition to the configuration of the hot topic extraction apparatus 117 according to the seventeenth embodiment, an anchor peripheral information analysis unit 70 instead of the link relation analysis unit 69.

In the eighteenth embodiment, the link destination set extraction unit 34 only extracts the portion where a link is embedded from a document, and does not extracts a link destination document.

The anchor peripheral information analysis unit 70 extracts the information in the vicinity of the portion where a link is embedded, and analyzes a hot topic of the information in the vicinity. The process of analyzing a hot topic has already been described above. In the HTML, since the link is embedded using an anchor tag, the information in the vicinity of the portion where the link is embedded is hereinafter referred to as anchor tag peripheral information. The process of analyzing a hot topic is the same as the process by the topical word analysis unit 52. For example, the anchor peripheral information analysis unit 70 extracts a portion enclosed by the tags as the anchor tag peripheral information.

The anchor tag peripheral information is described below by referring to FIG. 35. FIG. 35 shows an example of the source around the anchor tag when a document is described in the HTML (hyper text markup language).

In FIG. 35, a link is embedded in a document by enclosing the character string 'Fujitsu' by anchor tags. In the case shown in FIG. 35, the anchor peripheral information analysis unit 70 extracts a portion enclosed by the tags before and after the portion into which a link is embedded, that is, the portion (paragraph) enclosed by the tags <p> and </p> in FIG. 35, as anchor tag peripheral information, and extracts a hot topic from the extracted anchor tag peripheral information. The anchor peripheral information analysis unit 70 can also extract a predetermined number of characters as anchor tag peripheral information from the preceding and subsequent portions to the portion where a link is embedded.

It is considered that a character string enclosed by anchor tags, that is, the character string used as an anchor, is closely associated with the information described around the anchor tags. Therefore, by extracting a hot topic from anchor tag peripheral information, a hot topic closely related to the character string used as an anchor can be efficiently extracted.

The above described hot topic extraction apparatuses can be configured using a computer (information processing device) as shown in FIG. 36. A computer 200 shown in FIG. 36 comprises a CPU 201, memory 202, an input device 203, an output device 204, an external storage device 205, a medium drive device 206, and a network connection device 207. A bus 208 interconnects them.

The memory 202 includes, for example, ROM (read only memory), RAM (random access memory), etc., and stores a program and data used in a process. The CPU 201 realizes the functions of each unit other than the storage unit configuring each hot topic extraction apparatus according to each embodiment.

Each unit other than the storage unit in the above mentioned hot topic extraction apparatus is stored as a program in a specific program code segment in the memory 202. Each storage unit of each hot topic extraction apparatus is stored in the external storage device 205 or the memory 202. The input device 203 can be, for example, a keyboard, a pointing device, a touch panel, etc. for use in inputting an instruction and information from a user. The output device 204 can be, for example, a display, a printer, etc. for use in outputting an inquiry to a user of the computer 200, a process output, etc.

The external storage device 205 can be, for example, a magnetic disk device, an optical disk device, a magneto-optic disk device, etc. The external storage device 205 stores the above mentioned program and data, and loads them into the memory 202 as necessary.

The medium drive device 206 drives the portable storage medium 209 to access the stored contents. The portable storage medium 209 can be any computer-readable storage medium such as a memory card, a memory stick, a floppy disk, CD-ROM (compact disk read only memory), an optical disk, a magneto-optic disk, a DVD (digital versatile disk), etc. A portable storage medium 209 can store the above mentioned program and data, and load them into the memory 202 as necessary.

The network connection device 207 communicates with an external device through any network (circuit) such as a LAN, WAN, etc., and converts data for communications. Furthermore, it receives the above mentioned program and data from an external device as necessary to load them into the memory 202.

Figure 37:
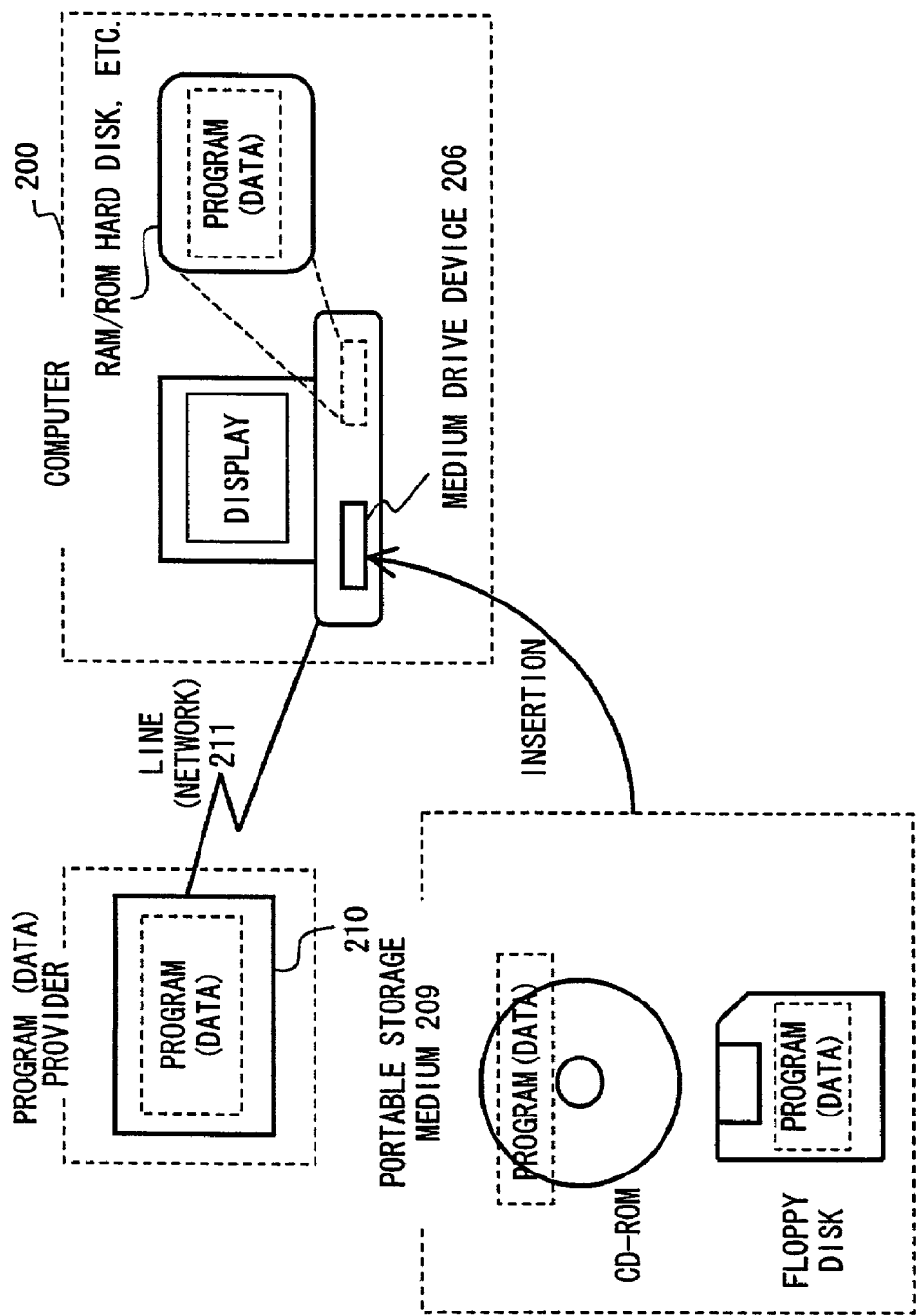
FIG. 37 shows the loading of a program and data into a computer.

FIG. 37 shows the process of loading a program and data into the computer 200 shown in FIG. 36. The present invention can also be configured as a program used with a computer to direct the computer to perform the functions similar to those realized by each configuration according to each embodiment of the present invention. The present invention can also be configured as a computer-readable storage medium storing the program. In addition, it can be configured as a computer data signal embodied in a carrier wave and representing the program.

To allow a computer to perform the functions realized by each configuration of an embodiment of the present invention, the above mentioned program is temporarily stored in the memory 202 and the external storage device 205 of the computer 200 through the input device 203, and the CPU 201 of the computer 200 is allowed to read and execute the stored program. As shown in FIG. 36, the program can be read by the computer 200 from the portable storage medium 209, and temporarily stored in the memory 202 of the computer 200 and the external storage device 205. Additionally, the above mentioned program can also be stored in the memory 202 of the computer 200 and the external storage device 205 by transmitting a computer data signal from a database 210 provided by a program (data) provider through a line (network) 211 (transmission medium).

The embodiments of the present invention have been described above. However, the present invention is not limited to the above mentioned embodiments, but can be used in various variations. For example, by appropriately combining the embodiments, a necessary hot topic extraction apparatus can be configured.

Furthermore, each unit and storage unit configuring the hot topic extraction apparatus realize a series of processes by cooperating with one another. These units and storage units can be provided for the same computer, or in different computers to cooperate one another through a network.

As described above, according to the present invention does not extract a hot topic from a given document. According to the present invention, step of collecting documents from an information source, step of storing the collected documents in a storage unit, step of retrieving documents from the storage unit, and step of extracting a topic from the retrieved documents. Thus, information about topical words and concepts can be obtained in the world or in a specific community.

While the invention has been described with reference to the preferred embodiments thereof, various modifications and changes may be made to those skilled in the art without departing from the true spirit and scope of the invention as defined by the claims thereof.

What is claimed is:

1. A hot topic extracting method for extracting a trend, a fashion, a noticed word, or a concept as a hot topic from a plurality of documents which exist in a wide-ranging information source on a network, the method comprising:

collecting a plurality of documents, each collected document having corresponding location information indicating a location from which the respective, collected document was found;

storing the collected documents in a storage unit with date and time information indicating a collection date and time added to the collected documents;

assigning weights to stored documents according to the date and time information;

collecting a new document from an information source, the newly collected document having corresponding location information indicating a location from which the newly collected document was found;

retrieving from the storage unit, a stored document having corresponding location information that matches the location information of the newly collected document;

extracting, from the retrieved document, words or a phrase and counting a frequency of the occurrences of the extracted words or phrase, and obtaining a broader concept word of an extracted word and counting a frequency of the occurrences of the broader concept word, based on the assigned weights; and extracting said words or phrase, and said broader concept word, having occurrence frequency and document frequency equal to or higher than an average and an expected value, as the hot topic.

2. A hot topic extracting method for extracting a trend, a fashion, a noticed word, or a concept as a hot topic from a plurality of documents which exist in a wide-ranging information source on a network, the method comprising:

collecting a plurality of documents, each collected document having corresponding location information indicating a location from which the respective, collected document was found;

storing the collected documents in a storage unit with date and time information indicating a collection date and time added to the collected documents;

assigning weights to stored documents according to the date and time information;

collecting a new document from an information source, the newly collected document having corresponding location information indicating a location from which the newly collected document was found;

setting an analysis target word;

retrieving a stored document containing the analysis target word from the storage unit and having location information that matches the location information of the newly collected document;

extracting, from the retrieved document, words or a phrase and counting a frequency of the occurrences of the extracted words or phrase, and obtaining a broader concept word of an extracted word and counting a frequency of the occurrences of the broader concept word, based on the assigned weights; and extracting said words or phrase, and said broader concept word, having occurrence frequency and document frequency equal to or higher than an average and an expected value, as the hot topic.

3. A hot topic extracting method for extracting a trend, a fashion, a noticed word, or a concept as a hot topic from a plurality of documents which exist in a wide-ranging information source on a network, the method comprising:

defining a method of storing each document in a storage unit corresponding to an information type based on an issuer of the document, each stored document having corresponding location information indicating a location from which the respective document was found before being stored in the storage unit, and each stored document stored with date and time information indicating a collection date and time added to the collected document;

assigning weights to the stored documents according to the date and time information;

collecting a new document from an information source, the newly collected document having corresponding location information indicating a location from which the newly collected document was found;

determining an information type of the newly collected document based on a collection source from which the newly collected document was collected;

storing the newly collected document in the storage unit based on the said defined method in accordance with the determined information type of the newly collected document;

retrieving a stored document from the storage unit having corresponding location information that matches the location information of the newly collected document;

extracting, from the retrieved document, words or a phrase and counting a frequency of the occurrences of the extracted words or phrase, and obtaining a broader concept word of an extracted word and counting a frequency of the occurrences of the broader concept word, based on the assigned weights; and extracting said words or phrase, and said broader concept word, having occurrence frequency and document frequency are equal to or higher than an average and an expected value, as the hot topic.

4. A hot topic extracting method for extracting a trend, a fashion, a noticed word, or a concept as a hot topic from a plurality of documents which exist in a wide-ranging information source on a network, the method comprising:

collecting a plurality of documents, each collected document having corresponding location information indicating a location from which the respective, collected document was found;

storing the collected documents in a storage unit with date and time information indicating a collection date and time added to the collected documents;

assigning weights to stored documents according to the date and time information;

collecting a new document from an information source, the newly collected document having corresponding location information indicating a location from which the newly collected document was found;

setting an analysis target word;

retrieving stored documents from the storage unit containing the analysis target word and having corresponding location information that matches the location information of the newly collected document;

extracting, from the retrieved documents, words or a phrase and counting a frequency of the occurrences of the extracted words or phrase, and obtaining a broader concept word of an extracted word and counting a frequency of the occurrences of the broader concept word, based on the assigned weights; and extracting said words or phrase, and said broader concept word, having occurrence frequency and document frequency equal to or higher than an average and an expected value, as the hot topic.

5. A hot topic extracting method for extracting a trend, a fashion, a noticed word, or a concept as a hot topic from a plurality of documents which exist in a wide-ranging information source on a network, the method comprising:

collecting a plurality of documents, each collected document having corresponding location information indicating a location from which the respective, collected document was found;

storing the collected documents in a storage unit with date and time information indicating a collection date and time added to the collected documents;

assigning weights to stored documents according to the date and time information;

collecting a new document from an information source, the newly collected document having corresponding location information indicating a location from which the newly collected document was found;

retrieving a stored document from the storage unit and having corresponding location information that matches the location information of the newly collected document;

extracting, from the retrieved document, words or a phrase and counting a frequency of the occurrences of the extracted words or phrase, and obtaining a broader concept word of an extracted word and counting a frequency of the occurrences of the broader concept word, based on the assigned weights; and extracting said words or phrase, and said broader concept word, having occurrence frequency and document frequency equal to or higher than an average and an expected value, as the hot topic;

accumulating a result of repeatedly extracting the hot topic from the retrieved document; and extracting a change with time of the result of repeatedly extracting the hot topic.

6. A hot topic extracting method for extracting a trend, a fashion, a noticed word, or a concept as a hot topic from a plurality of documents which exist in a wide-ranging information source on a network, the method comprising:

collecting a plurality of documents, each collected document having corresponding location information indicating a location from which the respective, collected document was found;

storing the collected documents in a storage unit with date and time information indicating a collection date and time added to the collected documents;

assigning weights to stored documents according to the date and time information;

collecting a new document from an information source, the newly collected document having corresponding location information indicating a location from which the newly collected document was found;

setting an analysis target word;

setting a specific word belonging to a specific category;

retrieving a stored document containing the analysis target word and having corresponding location information that matches the location information of the newly collected document, from the storage unit;

extracting, from the retrieved document, words or a phrase and counting a frequency of the occurrences of the extracted words or phrase, and obtaining a broader concept word of an extracted word and counting a frequency of the occurrences of the broader concept word, based on the assigned weights; and extracting said words or phrase, and said broader concept word, having occurrence frequency and document frequency equal to or higher than an average and an expected value, as the hot topic.

7. A computer-readable storage medium storing a computer program used to direct a computer to control a process for extracting a trend, a fashion, a noticed word, or a concept as a hot topic from a plurality of documents which exist in a wide-ranging information source on a network, the process comprising:

collecting a plurality of documents, each collected document having corresponding location information indicating a location from which the respective, collected document was found;

storing the collected documents in a storage unit with date and time information indicating a collection date and time added to the collected documents;

assigning weights to stored documents according to the date and time information;

collecting a new document from an information source, the newly collected document having corresponding location information indicating a location from which the newly collected document was found;

setting an analysis target word;

retrieving from the storage unit a stored document containing the analysis target word and having location information that matches the location information of the newly collected document;

extracting, from the retrieved document, words or a phrase and counting a frequency of the occurrences of the extracted words or phrase, and obtaining a broader concept word of an extracted word and counting a frequency of the occurrences of the broader concept word, based on the assigned weights; and extracting said words or phrase, and said broader concept word, having occurrence frequency and document frequency equal to or higher than an average and an expected value, as the hot topic.

8. A hot topic extracting method for extracting a trend, a fashion, a noticed word, or a concept as a hot topic from a plurality of documents which exist in a wide-ranging information source on a network, the method comprising:

collecting a plurality of documents, each collected document having corresponding location information indicating a location from which the respective, collected document was found;

storing the collected documents in a storage unit with date and time information indicating a collection date and time added to the collected documents;

assigning weights to stored documents according to the date and time information;

collecting a new document based on information collection strategy rules describing a method of collecting the new document from an information source, the newly collected document having corresponding location information indicating a location from which the newly collected document was found;

retrieving a document from the storage unit having corresponding location information that matches the location information of the newly collected document;

extracting, from the retrieved document, words or a phrase and counting a frequency of the occurrences of the extracted words or phrase, and obtaining a broader concept word of an extracted word and counting a frequency of the occurrences of the broader concept word, based on the assigned weights;

extracting said words or phrase, said broader concept word, having occurrence frequency and document frequency equal to or higher than an average and an expected value, as the hot topic; and providing a notification indicating whether the extracted hot topic satisfies a condition of a desired topic.

9. A computer-implemented hot topic extraction apparatus for extracting a trend, a fashion, a noticed word, or a concept as a hot topic from a plurality of documents which exist in a wide-ranging information source on a network, the apparatus comprising:
- a collector collecting a plurality of documents, each collected document having corresponding location information indicating a location from which the respective, collected document was found;
- a storage unit storing the collected documents with date and time information indicating a collection date and time added to the collected documents;
- an assigning device assigning weights to stored documents according to the date and time information;
- an information collection unit collecting a new document from an information source, the newly collected document having corresponding location information indicating a location from which the collected document was found; and
- a hot topic extraction unit retrieving from the storage unit a stored document having corresponding location information that matches the location information of the newly collected document, in parallel to a process of said information collection unit collecting the new document, and extracting a hot topic, wherein said extracting the hot topic includes:
  - extracting, from the retrieved document, words or a phrase and counting a frequency of the occurrences of the extracted words or phrase, and obtaining a broader concept word of an extracted word and counting a frequency of the occurrences of the broader concept word, based on the assigned weights; and
  - extracting said words or phrase, and said broader concept word, having occurrence frequency and document frequency are equal to or higher than an average and an expected value, as the hot topic.

10. A computer-readable storage medium storing a program used to direct a computer to perform a process for extracting a trend, a fashion, a noticed word, or a concept as a hot topic from a plurality of documents which exist in a wide-ranging information source on a network, the process comprising:
- collecting a plurality of documents, each collected document having corresponding location information indicating a location from which the respective, collected document was found;
- storing the collected documents in a storage unit with date and time information indicating a collection date and time added to the collected documents;
- assigning weights to stored documents according to the date and time information;
- collecting a new document from an information source, the newly collected document having corresponding location information indicating a location from which the newly collected document was found;
- retrieving from the storage unit a stored document having corresponding location information that matches the location information of the newly collected document;
- extracting, from the retrieved document, words or a phrase and counting a frequency of the occurrences of the extracted words or phrase, and obtaining a broader concept word of an extracted word and counting a frequency of the occurrences of the broader concept word, based on the assigned weights; and
- extracting said words or phrase, and said broader concept word, having occurrence frequency and document frequency are equal to or higher than an average and an expected value, as the hot topic.

11. A method for extracting a trend, a fashion, a noticed word, or a concept as a hot topic from a plurality of documents which exist in a wide-ranging information source on a network, the method comprising:
- collecting a plurality of documents;
- storing the collected documents in a storage unit with date and time information indicating a collection date and time added to the collected documents;
- assigning weights to stored documents according to the date and time information;
- collecting a new document from an information source;
- retrieving from the storage unit a stored document that satisfies a predetermined condition with respect to the newly collected document;
- extracting, from the retrieved document, words or a phrase and counting a frequency of the occurrences of the extracted words or phrase, and obtaining a broader concept word of an extracted word and counting a frequency of the occurrences of the broader concept word, based on the assigned weights; and
- extracting said words or phrase, and said broader concept word, having occurrence frequency and document frequency equal to or higher than an average and an expected value, as the hot topic.

12. An apparatus for extracting a trend, a fashion, a noticed word, or a concept as a hot topic from a plurality of documents which exist in a wide-ranging information source on a network, the apparatus comprising:
- means for collecting a plurality of documents;
- means for storing the collected documents with date and time information indicating a collection date and time added to the collected documents,
- means for assigning weights to the stored documents according to the date and time information;
- means for collecting a new document from an information source;
- means for retrieving a stored document that satisfies a predetermined condition with respect to the newly collected document;
- means for extracting, from the retrieved document, words or a phrase and counting a frequency of the occurrences of the extracted words or phrase, and obtaining a broader concept word of an extracted word and counting a frequency of the occurrences of the broader concept word, based on the assigned weights; and
- means for extracting said words or phrase, and said broader concept word, having occurrence frequency and document frequency are equal to or higher than an average and an expected value, as the hot topic.

* * * * *